United States Patent
Kamoto et al.

(10) Patent No.: US 7,139,642 B2
(45) Date of Patent: Nov. 21, 2006

(54) ROBOT SYSTEM AND ROBOT APPARATUS CONTROL METHOD

(75) Inventors: Satoru Kamoto, Kanagawa (JP); Susumu Oikawa, Kanagawa (JP); Kazuyuki Iijima, Tokyo (JP); Kazuo Ishii, Tokyo (JP); Yuko Iijima, Kanagawa (JP); Noriyuki Fukushima, Tokyo (JP); Seiichi Takamura, Tokyo (JP); Jun Hiroi, Tokyo (JP); Nozomu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 10/250,587

(22) PCT Filed: Nov. 7, 2002

(86) PCT No.: PCT/JP02/11603

§ 371 (c)(1), (2), (4) Date: Jul. 2, 2003

(87) PCT Pub. No.: WO03/039818

PCT Pub. Date: May 15, 2003

(65) Prior Publication Data
US 2004/0153211 A1 Aug. 5, 2004

(30) Foreign Application Priority Data
Nov. 7, 2001 (JP) .............................. 2001-342459
May 10, 2002 (JP) .............................. 2002-136327

(51) Int. Cl.
*G06F 19/00* (2006.01)
*G05B 19/418* (2006.01)
*G05B 19/04* (2006.01)

(52) U.S. Cl. ...................... 700/248; 700/245; 700/246; 901/1; 901/50

(58) Field of Classification Search ................ 700/248, 700/250, 246, 86, 245; 706/10, 11, 4; 446/7, 446/454, 456; 901/1, 50
See application file for complete search history.

(56) References Cited

U.S. PATENT DOCUMENTS

| | | | | |
|---|---|---|---|---|
| 5,966,526 A | * | 10/1999 | Yokoi | 703/11 |
| 6,438,456 B1 | * | 8/2002 | Feddema et al. | 700/245 |
| 6,449,518 B1 | * | 9/2002 | Yokoo et al. | 700/86 |
| 6,507,773 B1 | * | 1/2003 | Parker et al. | 700/258 |
| 6,542,788 B1 | * | 4/2003 | Hosonuma et al. | 700/245 |
| 6,609,968 B1 | * | 8/2003 | Okada et al. | 463/1 |
| 6,684,127 B1 | * | 1/2004 | Fujita et al. | 700/245 |
| 6,901,390 B1 | * | 5/2005 | Mizokawa | 706/14 |
| 6,970,096 B1 | * | 11/2005 | Nagata et al. | 340/825.22 |
| 2002/0095239 A1 | * | 7/2002 | Wallach et al. | 700/245 |

(Continued)

FOREIGN PATENT DOCUMENTS

JP 11-143849 5/1999

(Continued)

*Primary Examiner*—Thomas Black
*Assistant Examiner*—Christine M. Behncke
(74) *Attorney, Agent, or Firm*—Frommer Lawrence & Haug LLP; William S. Frommer; Thomas F. Presson

(57) ABSTRACT

The present invention aims to provide an improved entertainment property. In a robot system where a plurality of robot apparatus act autonomously, each robot apparatus has wireless communication means, and when the robot apparatus make conversation between themselves, the contents of the conversation are transmitted to and received by the robot apparatus as a command and/or a semantics through the wireless communication means of both.

12 Claims, 47 Drawing Sheets

U.S. PATENT DOCUMENTS

2003/0074107 A1* 4/2003 Noma et al. .................. 700/245
2004/0093118 A1* 5/2004 Sabe et al. .................. 700/245

FOREIGN PATENT DOCUMENTS

| JP | 2001-188787 | | 7/2001 |
| JP | 2001-212782 | | 8/2001 |
| JP | 2001-224867 | * | 8/2001 |
| JP | 2001-306048 | | 11/2001 |
| JP | 2002-963 | | 1/2002 |

* cited by examiner

FIG. 9

| | INPUT EVENT NAME | DATA NAME | DATA RANGE | PROBABILITY OF TRANSITION TO OTHER NODE | | | | | |
|---|---|---|---|---|---|---|---|---|---|
| | | | | A | B | C | D | ~ | n |
| node 100 | | | | | | | | | |
| TRANSITION TARGET NODE | | | | node 120 | node120 | node 1000 | | | node 600 |
| OUTPUT ACTION | | | | ACTION 1 | ACTION 2 | ACTION 3 | | | ACTION 4 |
| 1 | BALL | SIZE | 0,1000 | 30% | | | | | |
| 2 | PAT | | | | | | | | |
| 3 | HIT | | | | 40% | | | | |
| 4 | SOUND | | | | | | | | |
| 5 | OBSTACLE | DISTANCE | 0,100 | | | 20% | | | |
| 6 | | JOY | 50,100 | | | | | | |
| 7 | | SUPRISE | 50,100 | | | | | | |
| 8 | | SADNESS | 50,100 | | | | | | 50% |

76

(FORMAT) COMMAND, CONVERSATION TEXT

L_CONTACT. M_FLEFT. S_HOLD. B, "PLEASE SHAKE HANDS"
L_CONTACT. M_FLEFT. S_HOLD. B, "LET'S SHAKE HANDS"
L_CONTACT. M_FLEFT. S_HOLD. B, "LET'S HAND-SHAKE"
L_CHGPOS. M_LIE. S_NORMAL. B, "ALLEY-OOH"

(FORMAT) situationID, subID, TEXT, ttmindex

-----
RECOVERY FROM FALL (0x0041)
-----
0x00410001, 1, "I FELL DOWN"
0x00410001, 2, "HELP ME"
0x00410001, 3, "OOPS"
0x00410001, 4, "I STUMBLE OVER"
0x00410001, 5, "I LOOKED AWAY"
0x00410001, 6, "I HAD A SCARE"
0x00410001, 7, "I CAN'T WALK"
0x00410001, 8, "I FELL OVER"
0x00410001, 9, "I SLIPPED"
0x00410001, 10, "I GOT A CLAM"

(B)

(FORMAT) situationID, subID, TEXT, ttmindex

-----
RESPONSE (0x0070)
-----
0x00700010, 1, "I'M FINE", 10

FIG. 11

(FORMAT) NODE NUMBER, CONDITIONAL EXPRESSION, MOTION MODE OF COMMUNICATOR, TEXT, MOTION COMMAND, FOLLOWING TRANSITION NODE NUMBER 0, (%VIEWERI:NAME%=="" &&%HOUR%<5), TERMINAL:"GOOD EVENING!", GREETINGS, 100

FIG. 12

0x000,%RANDOM%<30,DIALOG:"<aml lang="ja" charset="Shift_JIS"><head><title>HOW OLD ARE YOU?</title></head><body>NEW BORN ROBOT<body><form><div align="center"><input name="SubmitOK" value="OK" type="submit"/></br></div></form></body></aml>".INNER 0x1001 0,-1

(A) 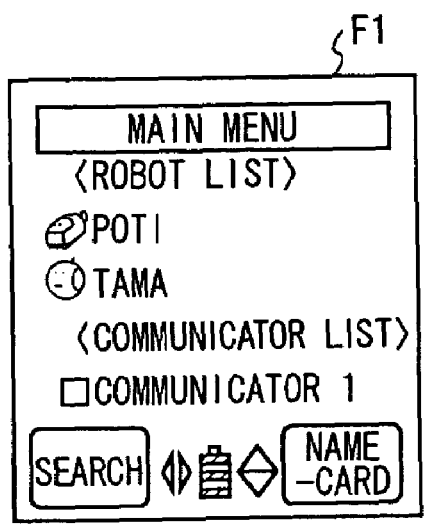
(B) 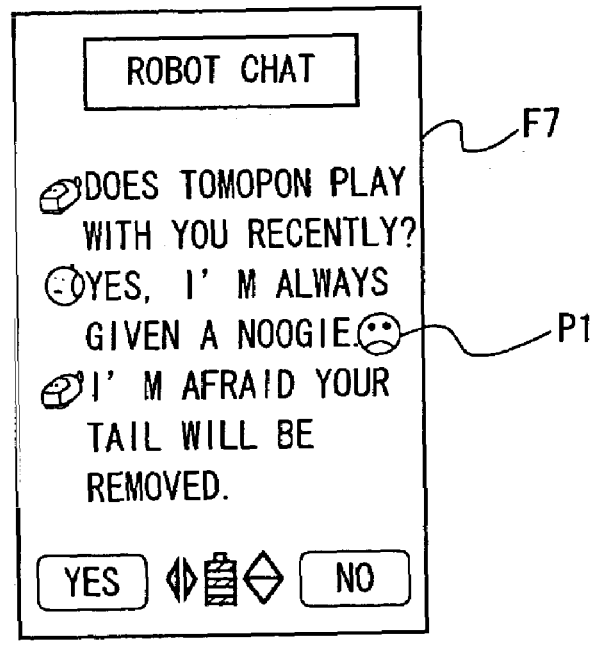
FIG. 41

ROBOT SYSTEM AND ROBOT APPARATUS CONTROL METHOD

TECHNICAL FIELD

The present invention relates to a robot system, robot apparatus, and a control method for robot apparatus and is suitably applied to, for example, a robot system, robot apparatus, and a control method for robot apparatus, capable of wirelessly and remotely controlling a robot.

BACKGROUND ART

In recent years, the present applicant has developed and commercialized a quadrupedal robot. The robot has the appearance and form modeled after dogs and cats kept at home as pets, and acts autonomously in accordance with a command from a user and surrounding circumstances.

On the other hand, robot systems capable of remotely controlling mobile robots by wireless and the like have been widely seen. And among these robot systems, such robot systems are desirable that not only remotely control a robot using a remote-control terminal with a remote-control software installed, but also allow a robot to establish conversation between robots 1 and make the motion and the action patterns synchronized between robots 1.

DESCRIPTION OF THE INVENTION

The present invention has been made in considering the above problems and is proposing a robot system, robot apparatus, and a control method for robot apparatus which provide an improved entertainment property.

To solve such problems in the present invention, in a robot system where a plurality of robot apparatus autonomously act, each robot apparatus is provided with wireless communication means, and transmits and receives the contents of the conversation as a command and/or a semantics through the wireless communication means of both when making conversation between robot apparatus.

Accordingly, in this robot system, communication between the robot apparatus just like human relations can be realized by exchanging the contents of the conversation as a command and/or a semandics between the robot apparatus.

Furthermore, in the present invention, a robot system is provided with a remote-control device for remotely controlling the robot apparatus selected out of a plurality of robot apparatus by wireless communication, and the remote-control device displays the contents of the conversation transmitted from each robot apparatus being control target.

Accordingly, in this robot system, a user can visually recognize the contents of the conversation between the robot apparatus, so that meaningful communication can be realized between the robot apparatus with a user.

Furthermore, in the present invention, in a control method for robot apparatus autonomously acting, the contents of the conversation are transmitted and received as a command and/or a semantics through wireless communication between both robot apparatus when conversation between the robot apparatus is made.

Accordingly, in this control method for robot apparatus, communication between the robot apparatus just like human relations can be realized by exchanging the contents of the conversation as a command and/or a semandics between the robot apparatus.

Furthermore, in the present invention, the contents of the conversation transmitted from the robot apparatus are displayed on a remote-control device for remotely controlling the robot apparatus by wireless communication.

Accordingly, in this control method for a robot, a user can visually recognize the contents of the conversation between the robot apparatus, so that meaningful communication can be realized between the robot apparatus with a user.

Furthermore, in the present invention, in a robot system where a plurality robot apparatus autonomously expressing actions make wireless communication between themselves based on the wireless communication standard, each robot apparatus is provided with terminal means for making wireless communication based on the wireless communication standard, the terminal means of either robot apparatus transmits a connection request at a prescribed timing, and when the terminal means of the other robot apparatus which received the connection request returns a response, the terminal means of both robot apparatus transmit and receive unique name-card information each other after the connection establishment of the wireless communication. In addition, when a wireless terminal device having terminal means for making wireless communication based on the wireless communication standard is provided, the terminal means of the wireless terminal device transmits the name-card information unique to the wireless terminal device to the terminal means of the robot apparatus after the connection establishment of the wireless communication, while the terminal means of the robot apparatus transmits the name-card information unique to the robot apparatus to the terminal means of the wireless terminal device.

Accordingly, in this robot system, as for between the robot apparatus in the area of communication and between robot apparatus and wireless terminal devices, name-card information can be exchanged easily and naturally without user operation.

Furthermore, in the present invention, in a robot system where robot apparatus autonomously expressing an action and a wireless terminal device make wireless communication based on the wireless communication standard, the robot apparatus is provided with terminal means for making wireless communication based on the wireless communication standard and utterance output means for outputting character data representing the contents of the utterance through the terminal means, and the wireless terminal device is provided with terminal means for making wireless communication based on the wireless communication standard and display means for displaying the contents of the utterance of the robot apparatus based on the character data obtained through the terminal means.

Accordingly, in this robot system, a user using the wireless terminal device can easily communicate with the robot apparatus, so as to strengthen a sense of community.

Furthermore, in the present invention, robot apparatus is provided with sensor means for detecting a user in the external circumstances, and utterance output means outputs character data representing the contents of the utterance through terminal means when a user is detected during the connection establishment of wireless communication between the terminal means of the wireless terminal device and the terminal means of the robot apparatus.

Accordingly, in this robot system, a user can enjoy surprise and amusement as if a man/woman is talking to the user, and the interaction between the user and the robot apparatus can be increased.

Furthermore, in the present invention, robot apparatus is provided with control means for controlling disconnection or reconnection of the wireless communication by the terminal means based on the detection result of the sensor means, and the control means repeats disconnection or reconnection of the wireless communication at prescribed intervals when the sensor means does not detect a user within prescribed time during the connection establishment of the wireless communication between the terminal means of the wireless terminal device and the terminal means of the robot apparatus.

Accordingly, in this robot system, battery consumption can be minimized while the user's intention is regarded.

Furthermore, in the present invention, robot apparatus is provided with motion expression means for expressing physical, optical, and/or acoustic motion, and the motion expression means expresses the motion in accordance with the contents of the utterance based on the character data output by the utterance output means.

Accordingly, in this robot system, a user using the wireless terminal device can, not only see the displayed contents of the utterance, but also experience the motion of the robot apparatus so that a sense of satisfaction and a sense of community can be given to the robot apparatus all the more.

Furthermore, in the present invention, utterance output means of robot apparatus sets the contents of the utterance based on the character data in accordance with action decision information comprised of regulations for deciding the following output action corresponding to the action condition of the robot apparatus generated according to the external or internal circumstances.

Accordingly, in this robot system, the robot apparatus can be expressed as a lifelike thing all the more by the contents of the utterance being fitted to the action of the robot apparatus, so that a sense of satisfaction can be given to the user.

Furthermore, in the present invention, in a robot system where a plurality robot apparatus autonomously expressing actions make wireless communication between themselves based on the wireless communication standard, each robot apparatus is provided with terminal means for making wireless communication based on the wireless communication standard and utterance output means for outputting character data representing the contents of the utterance through the terminal means, a wireless terminal device is provided with terminal means for making wireless communication based on the wireless communication standard and display means for displaying the contents of the utterance of the robot apparatus based on the character data obtained through the terminal means, and the display means of the wireless terminal device displays the contents of the utterance based on the character data output from the utterance output means of both robot apparatus during the connection establishment of the wireless communication between the terminal means of the robot apparatus.

Accordingly, in this robot system, a user using the wireless terminal device can enjoy giving a glimpse into the world of robot apparatus.

Furthermore, in the present invention, in a robot system where robot apparatus autonomously expressing an action and a wireless terminal device make wireless communication based on the wireless communication standard, a wireless terminal device is registered with physical influence on the robot apparatus.

Accordingly, in this robot system, operational security and easy connection of the wireless communication can be ensured as for the wireless terminal device.

Furthermore, in the present invention, in robot apparatus autonomously expressing an action and making wireless communication between a wireless terminal device based on the wireless communication standard, terminal means for making wireless communication based on the wireless communication standard and utterance output means for outputting character data representing the contents of the utterance through the terminal device are provided.

Accordingly, in this robot apparatus, a user using the wireless terminal device can strengthen a sense of community by easily communicating with the robot apparatus.

Furthermore, in the present invention, sensor means for detecting a user in the external circumstances is provided, and utterance output means outputs character data representing the contents of the utterance through the terminal means when a user is detected during the connection establishment of wireless communication between the terminal means of the wireless terminal device and the terminal means of the robot apparatus.

Accordingly, in this robot apparatus, a user can enjoy surprise and amusement as if a man/woman is talking to the user, and the interaction between the user and the robot apparatus can be increased.

Furthermore, in the present invention, control means for controlling disconnection or reconnection of the wireless communication by the terminal means based on the detection result of the sensor means is provided, and the control means repeats the disconnection or reconnection of the wireless communication at prescribed intervals when the sensor means does not detect a user within prescribed time during the connection establishment of the wireless communication between the terminal means of the wireless terminal device and the terminal means of the robot apparatus.

Accordingly, in this robot apparatus, battery consumption can be minimized while the user's intention is regarded.

Furthermore, in the present invention, motion expression means for expressing physical, optical, and/or acoustic motion is provided, and the motion expression means expresses the motion in accordance with the contents of the utterance based on the character data output by the utterance output means.

Accordingly, in this robot apparatus, a user using the wireless terminal device can not only see the displayed contents of the utterance, but also experience the motion of the robot apparatus, so that a sense of satisfaction and a sense of community can be given to the robot apparatus all the more.

Furthermore, in the present invention, the contents of the utterance based on the character data are set in accordance with action decision information comprised of regulations for deciding the following output action corresponding to the action condition of the robot apparatus generated according to the external or internal circumstances.

Accordingly, in this robot apparatus, the robot apparatus can be expressed as a lifelike thing all the more by the contents of the utterance being fitted to the action of the robot apparatus, so that a sense of satisfaction can be given to the user.

Furthermore, in the present invention, in robot apparatus which autonomously expresses an action and makes wireless communication with a wireless terminal device based on the wireless communication standard, sensor means for detecting the external circumstances and utterance output means for outputting character data representing the detection request of the sensor means are provided, and a wireless terminal device is registered based on the detection result of the sensor means.

Accordingly, in this robot apparatus, operational security and easy connection of the wireless communication can be ensured as for the wireless terminal device.

Furthermore, in the present invention, in a control method for robot apparatus where a plurality robot apparatus autonomously expressing actions make wireless communication between themselves based on the wireless communication standard, either robot apparatus transmits a connection request at a prescribed timing, and when the other robot apparatus which received the connection request returns-a response, both robot apparatus transmit and receive unique name-card information each other after the connection establishment of the wireless communication. In addition, a wireless terminal device transmits the name-card information unique to the wireless terminal device to the robot apparatus after the connection establishment of the wireless communication, while the robot apparatus transmits the name-card information unique to the robot apparatus to the wireless terminal device.

Accordingly, in this control method for a robot, as for between robot apparatus in the area of communication and between robot apparatus and wireless terminal devices, name-card information can be exchanged easily and naturally without user operation.

Furthermore, in the present invention, in a control method for robot apparatus where robot apparatus autonomously expressing an action and a wireless terminal device make wireless communication based on the wireless communication standard, the robot apparatus is provided with a first step of transmitting character data representing the contents of the utterance, and the wireless terminal device is provided with a second step of displaying the contents of the utterance of the robot apparatus based on the character data obtained from the robot apparatus.

Accordingly, in this control method for a robot, a user using the wireless terminal device can easily communicate with the robot apparatus, so as to strengthen a sense of community.

Furthermore, in the present invention, when robot apparatus detects a user during the connection establishment of wireless communication between the wireless terminal device and the robot apparatus, the robot apparatus transmits character data representing the contents of the utterance to the wireless terminal device.

Accordingly, in this control method for a robot, a user can enjoy surprise and amusement as if a man/woman is talking to the user, and the interaction between the user and the robot apparatus can be increased.

Furthermore, in the present invention, robot apparatus repeats disconnection or reconnection of the wireless communication to a wireless terminal device at prescribed intervals when the robot apparatus does not detect a user within prescribed time during the connection establishment of the wireless communication between the wireless terminal device and the robot apparatus.

Accordingly, in this control method for a robot, battery consumption can be minimized while the user's intention is regarded.

Furthermore, in the present invention, robot apparatus expresses physical, optical, and/or acoustic motion fitted to the contents of the utterance based on the character data.

Accordingly, in this control method for a robot, a user using the wireless terminal device can not only see the displayed contents of the utterance, but also experience the motion of the robot apparatus, so that a sense of satisfaction and a sense of community can be given to the robot apparatus all the more.

Furthermore, in the present invention, robot apparatus sets the contents of the utterance based on the character data in accordance with action decision information comprised of regulations for deciding the following output action corresponding to the action condition of the robot apparatus generated according to the external or internal circumstances.

Accordingly, in this control method for a robot, the robot apparatus can be expressed as a lifelike thing all the more by the contents of the utterance being fitted to the action of the robot apparatus, so that a sense of satisfaction can be given to the user.

Furthermore, in the present invention, in a control method for robot apparatus where a plurality robot apparatus autonomously expressing actions make wireless communication between themselves based on the wireless communication standard, a wireless terminal device displays the contents of the utterance based on the character data output from both robot apparatus.

Accordingly, in this control method for a robot, a user using the wireless terminal device can enjoy giving a glimpse into the world of robot apparatus.

Furthermore, in the present invention, in a control method for robot apparatus where robot apparatus autonomously expressing an action and a wireless terminal device make wireless communication based on the wireless communication standard, a wireless terminal device is registered with physical influence on the robot apparatus.

Accordingly, in this control method for a robot, operational security and easy connection of the wireless communication can be ensured as for the wireless terminal device.

BRIEF DESCRIPTION OF THE DRAWINGS

FIG. 9 is a conceptual diagram showing the state transition table.

FIG. 10 is a schematic diagram applying the explanation of the command format of the soliloquy utterance.

FIG. 11 is a schematic diagram applying the explanation of the command format of the sentence utterance.

FIG. 12 is a schematic diagram applying the explanation of the command format of the scenario utterance.

FIG. 41 is a schematic diagram applying the explanation of the relation between the emotion and instinct, and the display contents.

BEST MODE FOR CARRYING OUT THE INVENTION

With reference to the accompanying figures one embodiment of the present invention is described in more detail.

(1) Construction of Robot 1

Figure 1:
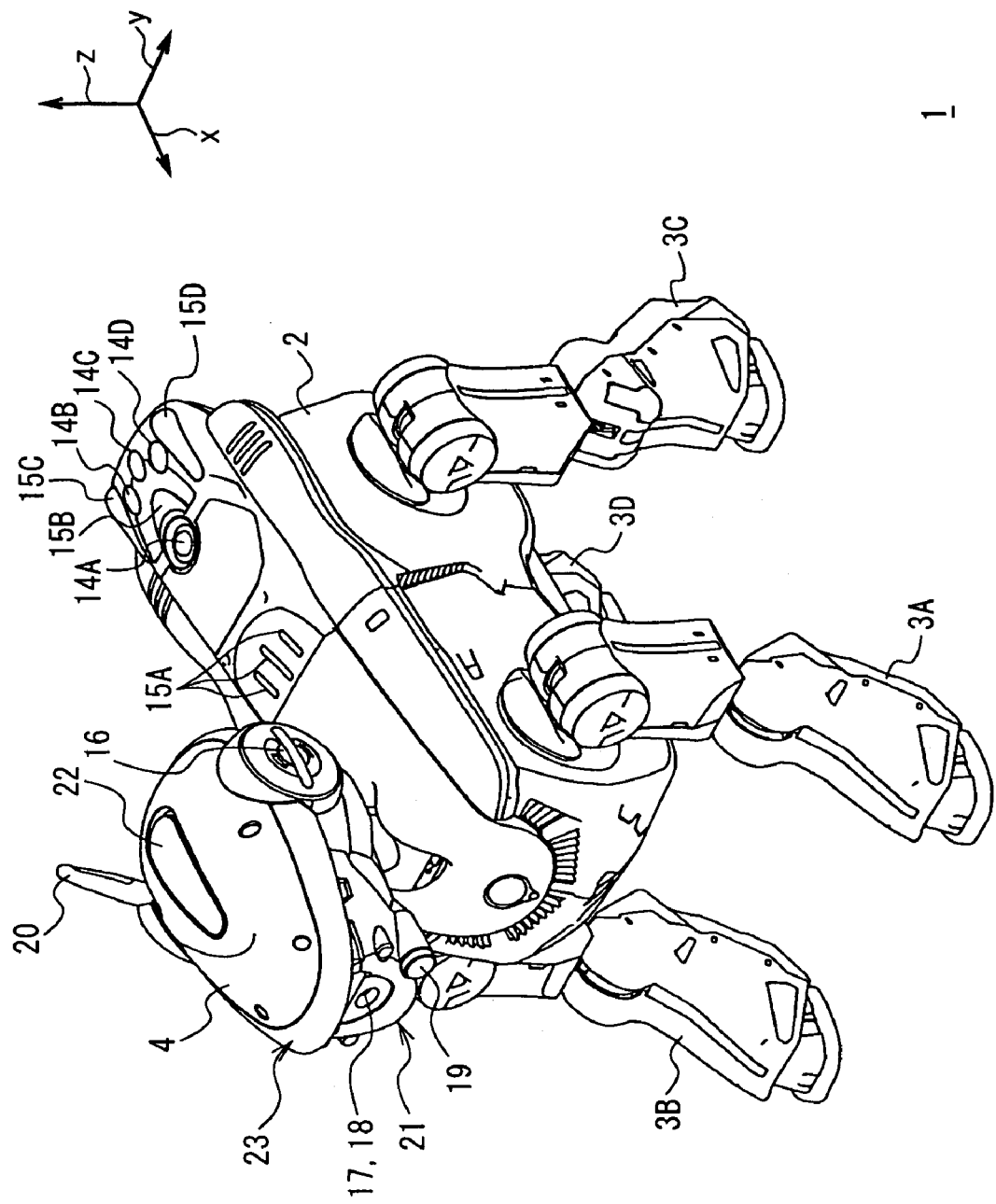
FIG. 1 is an oblique perspective view showing the construction of the robot according to the present embodiment.

In FIG. 1, the reference numeral 1, as a whole, shows a robot of the embodiment of this invention, leg units 3A–3D are connected accordingly on back and forth and right and left of a body unit 2, and a head unit 4 is connected at the front end of the body unit 2.

Here, the body unit 2 is stored of a controller 10 controlling whole motion of the robot 1, a battery 11 as a power source of the robot 1, and variety of sensors such as a battery sensor 12 and an acceleration sensor 13, and is provided with some touch sensors 14 (14A–14D) and Light Emitting Diode (LED) 15 (15A–15D), each slot (not shown in Figs.) for a dedicated memory card and a personal computer (PC) card at prescribed positions of the body unit 2.

The head unit 4 is provided with a microphone 16 representing "a ear", charge coupled device (CCD) camera 17 representing "an eye" of the robot 1, variety of sensors such as a distance sensor 18, a face touch sensor 19, and a head touch sensor 20, and a speaker 21 representing "a mouth" at prescribed positions, as well as is provided with a free-popped-and-stored retractable headlight 22 at the top and a plurality of LED 23 around the middle-level at a regular interval.

Furthermore, knee joints of each of the leg units 3A–3D, shoulder joint connecting of each of the leg units 3A–3D and the body unit 2 respectively, a neck joint connecting the head unit 4 and the body unit 2, and an open-close driving part of the retractable headlight are provided with actuators $24_1$–$24_n$ of degree of freedom and number as appropriate, and potentiometers $25_1$–$25_n$ coupled with those actuators $24_1$–$24_n$.

And, the microphone 16 of the head unit 4 collects audio inputs given from a user such as "Walk", "Lie down", or "Chase the ball", and other voices and various sounds, and transmits the collected audio signals S1 to the controller 10. The CCD camera 17 pictures the surroundings to transmit the obtained image signals S2 to the controller 10, and the distance sensor 18 measures the distance to an obstacle in front to transmit the measured result to the controller 10 as a distance measurement signal S3.

Furthermore, the face touch sensor 19 detects the press operation by a user and transmits the detection result to the controller 10 as an operation detection signal S4. The head touch sensor 20, as is obvious in FIG. 1, detects that a lever oscillating-freely provided on the right side of the head unit 4 is brought down back or forth (in the direction of the arrow x or in the opposite direction), and transmits the detection result to the controller 10 as the operation detection signal S4.

In addition, the battery sensor 12 of the body unit 2 detects the remaining energy amount of the battery 11, and transmits the detection result to the controller 10 as a battery remaining amount signal 5. The acceleration sensor 13 detects the acceleration in the direction of the arrow x, y, and z of the robot 1 in FIG. 1, and transmits the detection result to the controller 10 as an acceleration detection signal S6.

Furthermore, each of the touch sensors 14 (14A–14D) provided on the body unit 2 respectively detects press operation by a user, and transmits the detection result to the controller 10 as an operation detection signal S7.

Still further, each potentiometer $25_1$–$25_n$ detects the rotation angle of the output axis of the corresponding actuators $24_1$–$24_n$, and respectively transmits the detection result to the controller 10 as angle detection signals $S8_1$–$S8_n$.

The controller 10 is composed as a micro computer configuration comprising a central processing unit (CPU), a read only memory (ROM), and a random access memory (RAM), and controls the motion of the robot 1 in accordance with control data such as a control program previously installed in an external memory, after-mentioned various motion files, audio files, and LED files.

In practice, the controller 10, for example when an external memory 26 stored of control data for autonomous mode (hereinafter, this is referred as a memory for autonomous mode 26A) is installed, judges the external and internal condition and whether or not a command or a contact from a user based on the audio signal S1 from the microphone 16, the image signal S2 from the CCD camera 17, the distance measurement signal S3 from the distance sensor 18, the operation detection signals S4 from the face touch sensor 19 and the head touch sensor 20 (hereafter, these are collectively referred as external information signals), and the battery remaining amount signal S5 from the battery sensor 12, the acceleration detection signal S6 from the acceleration sensor 13, and the angle detection signals $S8_1$–$S8_n$ (hereafter, these are collectively referred as internal information signals).

The controller 10 decides the following action based on the judged results and the control program stored in the memory card for autonomous mode 26A, reproduces the corresponding motion file in the motion files comprised of control data for various motion patterns stored in the memory card for autonomous mode 26A as appropriate based on the decision results, and makes various motions such as shaking the head unit 4 up and down and right and left, popping and lighting the retractable headlight 22, and making a step by driving the leg units 3A–3D, and makes a series of motions by transmitting driving signals $S9_1$–$S9_n$ based on the so obtained control data to the corresponding actuators $24_1$–$24_n$ to be driven.

At this time, the controller 10 reproduces the corresponding audio file in the various audio files stored in the memory card for autonomous mode 26A as appropriate, and outputs the voice based on the audio signal S10 by providing the audio signal S10 so obtained to the speaker 21. In the same manner, at this time, the controller reproduces the corresponding LED file in the LED files for each flash pattern of each LED 15 of the body unit 2 and each LED 23 of the head unit 4 stored in the memory card for autonomous mode 26A, and flashes the LED 15 and 23 based on the so obtained control data with the corresponding pattern.

Herein, in the robot 1, the motions and actions corresponding to the control program stored in the external memory card 26 and each of the various data files are conducted under the control of the controller 10.

In this robot 1, each leg units 3A–3D and the head unit 4 are physically and electrically connected through a connector having standardized shape (not shown) to the body unit 2 respectively, and each leg units 3A–3D and the head unit 4 is replaceable in unit with other unit having the same connect.

In this case, when the leg units 3A–3D and the head unit 4 are set replaceable, since the moment, the default value of the joint angle and the like are different for each shape of the leg units 3A–3D and the head unit 4, respective control is required in accordance with the shape corresponding to the shape of the leg units 3A–3D and the head unit 4 to realized the same motion to be expressed by the robot 1.

Here, in this embodiment of this invention, a memory (not shown) having recognition data indicating the shape of the leg units 3A–3D and the head unit 4 inside the leg units 3A–3D and the head unit 4, as well as adjustment data for each shape for realizing the controller 10 controlling corresponding to the shape is stored in the memory for autonomous mode 26A for each of the leg units 3A–3D and the head units corresponding to the recognition data.

With above arrangement, in the robot 1, the controller 10 can conduct an appropriate control in accordance with the present shape of the robot 1 based on the recognition data stored in the head unit 4 and the leg units 3A–3D and each adjustment data stored in the memory card for autonomous mode 26A regardless of the type of the head unit 4 and the leg units 3A–3D connected to the body unit 2.

(2) Construction of the Robot System of the Embodiment of This Invention

Figure 3:
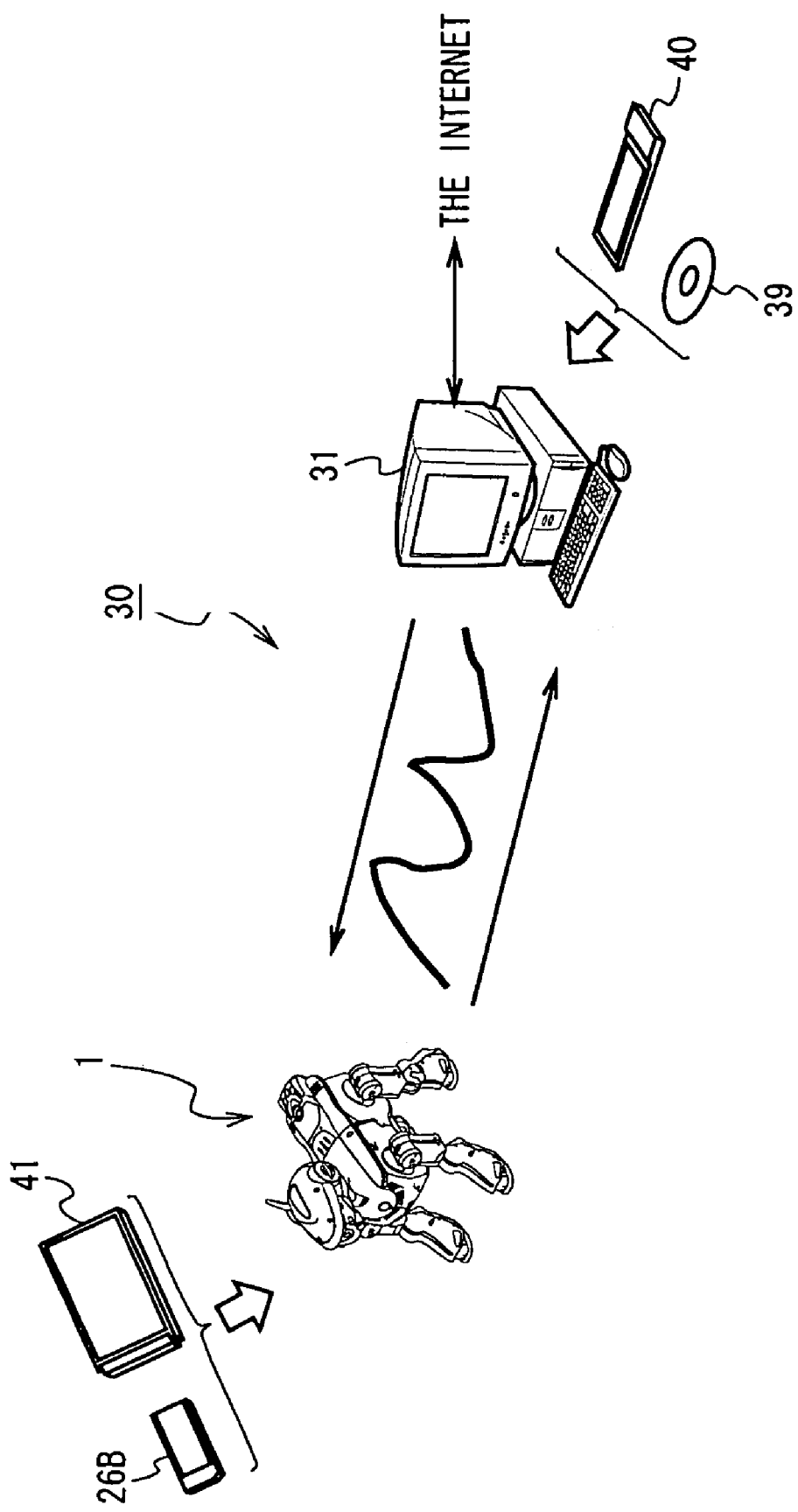
FIG. 3 is a schematic diagram showing the construction of the robot system according to the present embodiment.

FIG. 3 shows the above-mentioned robot 1 and a robot system 30 comprised of a personal computer 31 owned by a user of the robot 1 in the embodiment of the present invention, and the robot 1 can be wirelessly and remotely controlled by the personal computer 31.

Figure 4:
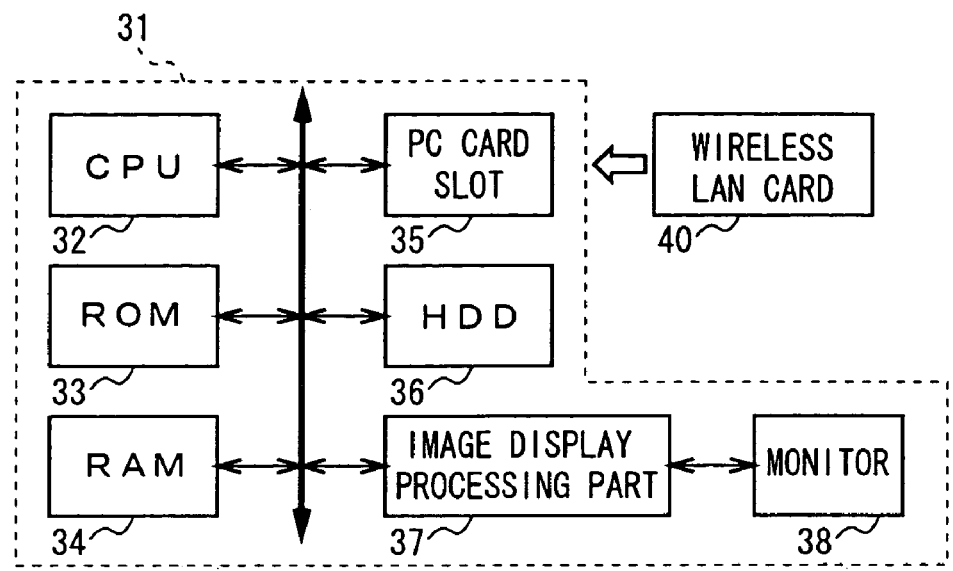
FIG. 4 is a block diagram briefly showing the construction of the personal computer.

In this case, as a personal computer 31, as shown in FIG. 4, a multipurpose computer comprised of a CPU 32, a ROM 33, a RAM 34, a PC card slot 35, a hard disk device 36, an image display processing part 37, a monitor 38 and the like.

In this personal computer 31, an application software (hereafter, this is referred as a remote-control software for PC), which is for example provided as recorded in a compact disc ROM (CD-ROM) 39 (FIG. 3), for controlling the robot system 30 as a whole to-play the functions is installed, as well as a wireless LAN card 40 corresponding to the prescribed wireless communication standard, such as Bluetooth, is loaded.

Furthermore, on the robot 1, a software for remote-control mode for making the robot 1 wirelessly and remotely controllable (hereafter, this is referred as a remote-control software for robot), control program for controlling the robot 1 to play a necessary action or motion, an external memory 26 in which various motion files such as an audio file and a LED file are stored (hereafter, this is referred as a memory for remote-control mode 26B), and a wireless LAN card 41 couple with the wireless LAN card 40 of the personal computer 31 are loaded.

Figure 2:
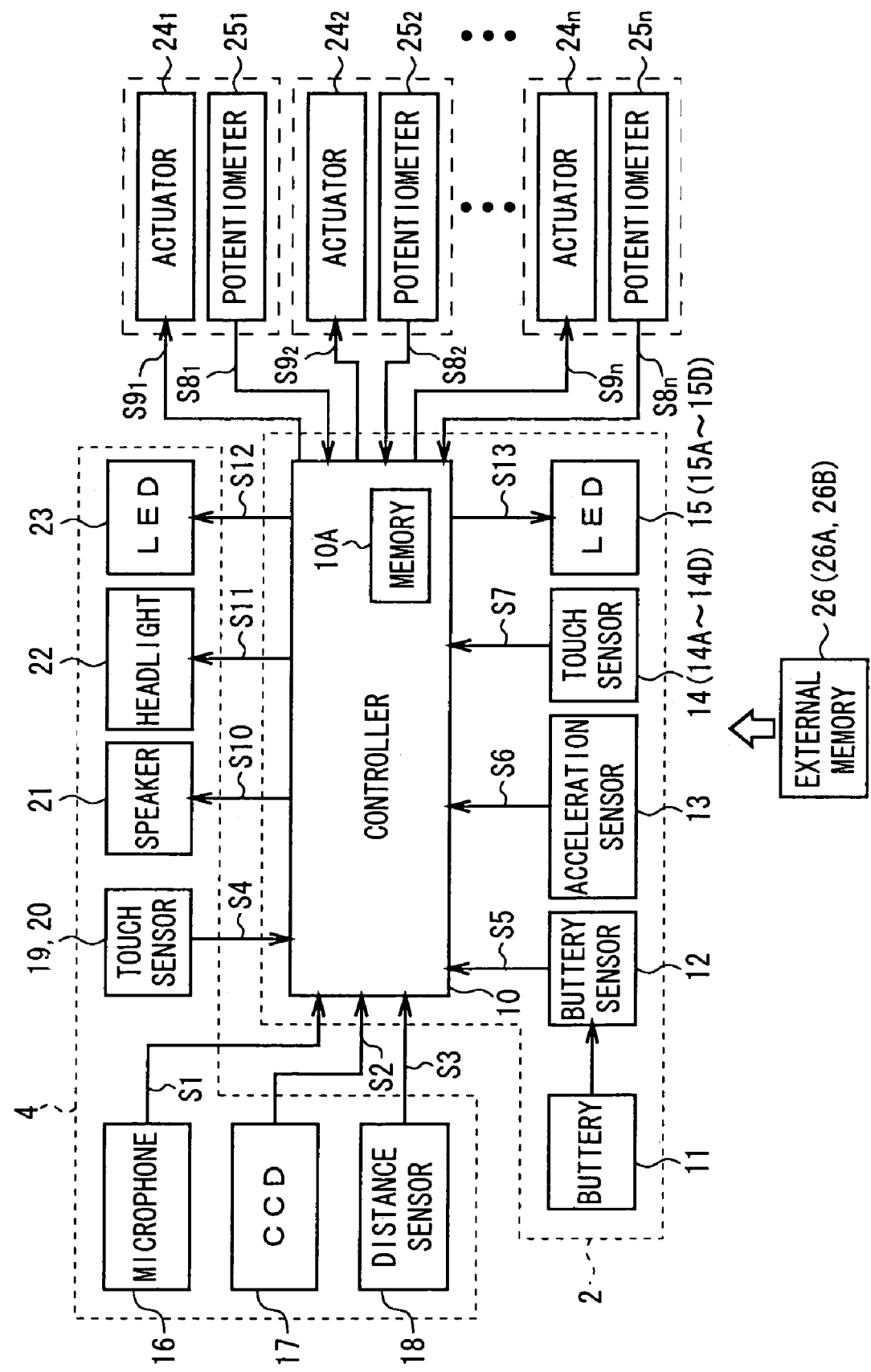
FIG. 2 is a block diagram showing the internal construction of the robot.

Then, the robot 1, when the power is turned on after the installation of the memory for remote-control mode 26B, reads the remote-control software for robot from the memory for remote-control mode 26B, and is started in the remote-control mode by expanding the software in an internal memory 10A (FIG. 2).

In this remote-control mode, the robot 1, through the wireless LAN card 41, sequentially transmits the recognition information requested from the personal computer 31 selected among the various recognition information recognized by the robot 1 at that time, in accordance with the external sensor information such as audio information based the audio signal S1 from the microphone 16 (FIG. 2), image information based on the image signal S2 from the CCD camera 17 (FIG. 2), distance measurement information based on the distance measurement signals S3 from the distance sensor 18 (FIG. 2), and operation detection information based on the operation detection signals S7 and S4 from the touch sensors 14 (14A–14D), 19, and 20 (FIG. 2), and the internal sensor information such as battery remaining information based on the battery remaining signal S5 from the battery sensor 12 (FIG. 2), acceleration detection information based on the acceleration detection signal S6 from the acceleration sensor 13 (FIG. 2), and angle detection information based on the angle detection signals $S8_1$–$S8_n$ from each of the potentiometer $S25_1$–$S25_n$ (FIG. 2), and both of the external sensor information and the internal sensor information (hereafter, these are referred as sensor information).

On the other hand, the personal computer 31, at the start of the remote-control software for PC, displays on the monitor 38 a control panel comprised of prescribed graphic user interface (GUI) based on the remote-control software for PC and the various information sequentially transmitted from the robot 1.

Herein, a user can designate the motion to be performed by the robot 1 by using this control panel to control a mouse, a keyboard, or a joystick.

The personal computer 31 transmits, through the wireless LAN card 40, the command corresponding to the operated button and the like on the control panel which are corresponding to the prescribed motion or action, to the robot 1.

Here, the robot 1, at the reception of the command and the like from the personal computer 31 through the wireless LAN card 41, expresses the motion corresponding to the command by reproducing a corresponding motion file, audio files or LED file as appropriate based on the remote-control software for robot.

As described above, in the robot system 30, a user can remotely control the robot 1 by using the personal computer 31, so that the improved entertainment property of the robot 1 is provided.

(3) Construction of Communicator 50

Figure 5:
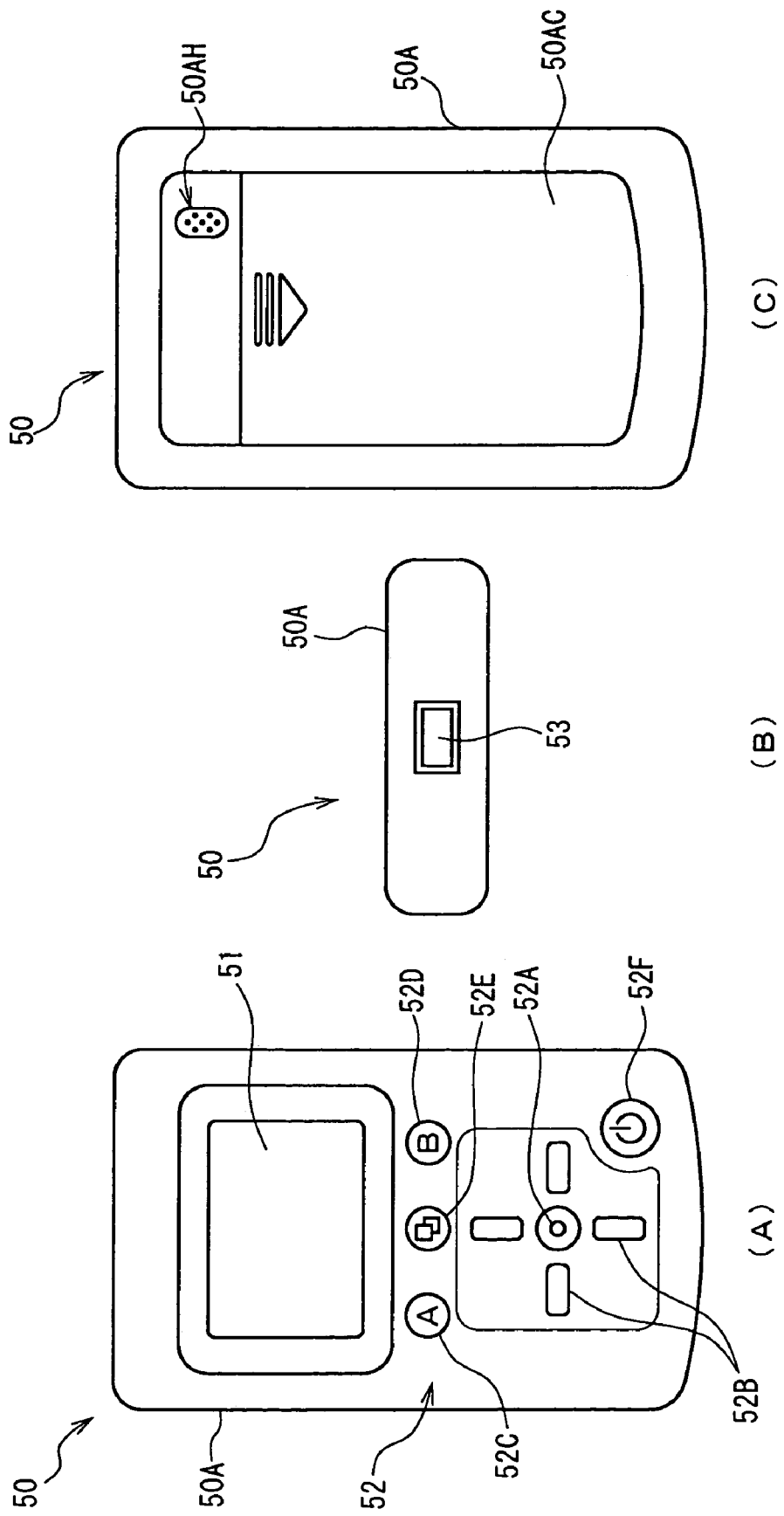
FIG. 5 is a schematic plane diagram showing the external construction of the communicator.

In addition to the above-mentioned construction, in the robot system shown in FIG. 3, the robot 1 can be wirelessly and remotely controlled not only by using the personal computer 31, but also by using a mobile communicator (referred as a viewer as well) 50 shown in FIG. 5.

The communicator 50 is comprised of a main body unit 50A, which is a rectangular solid with flat plates as a whole, which has a display part 51 for displaying image and characters on the upper side of the surface, and an operation part 52 comprised on a press-type button group assigned of each function under the display part 51.

In the operation part 52, as a button group, a decision key 52A for deciding various set states is disposed in the middle, and cursor keys 52B are independently disposed around the decision key 52A. On the right and left upper side of the cursor keys 52B, reserved keys 52C and 52D which are assigned of a prescribed function are disposed respectively, on the middle upper side of the cursor key 52B a switch key 52E for switching the main menu display and the previous display is disposed, and on the right lower side of the cursor key 52B a power key 52F for putting the power on or off is disposed.

In addition, on the lower edge surface of the main body unit 50A, a connector 53 for so-called universal serial bus (USB) is disposed, so that the personal computer 31 (FIG. 3) can be connected through a USB cable (not shown).

Furthermore, on the back of the main body unit 50A, an opening 50AH for speaker's sound emission is formed, as well as a battery cover 50AC is detachably put on for battery installation or un-installation.

FIG. 9 shows the internal construction of the communicator 50. The communicator 50 is comprised of the display part 51 having a liquid crystal display, a flash memory 56 connected to the display part 51 through a bus 55, a ROM and a ROM for program 57, the CPU 58, a speaker 59, a transmitting and receiving unit 60, and a USB driver 61, and a battery 62 comprised of for example a button-type buttery is built-in as a driving source.

The CPU 58, corresponding to the data input from the robot 1 or the personal computer 31, or input operation by the operation part 52, reads the corresponding program from various programs stored in the flash memory 56 and expands the program into the ROM and the RAM for program 57, then executes corresponding control processing based on the program.

The transmitting and receiving unit 60 is comprised of a LAN control part 60A for exchanging various data with wireless LAN system for example such as Bluetooth and an antenna terminal 60B for transmitting and receiving the data transmitted to the LAN control part 60A through bus under the control of the CPU 58.

(4) Processing of Controller 10

Next, specific processing of the controller 10 (FIG. 2) of the robot 1 will be explained.

Figure 7:
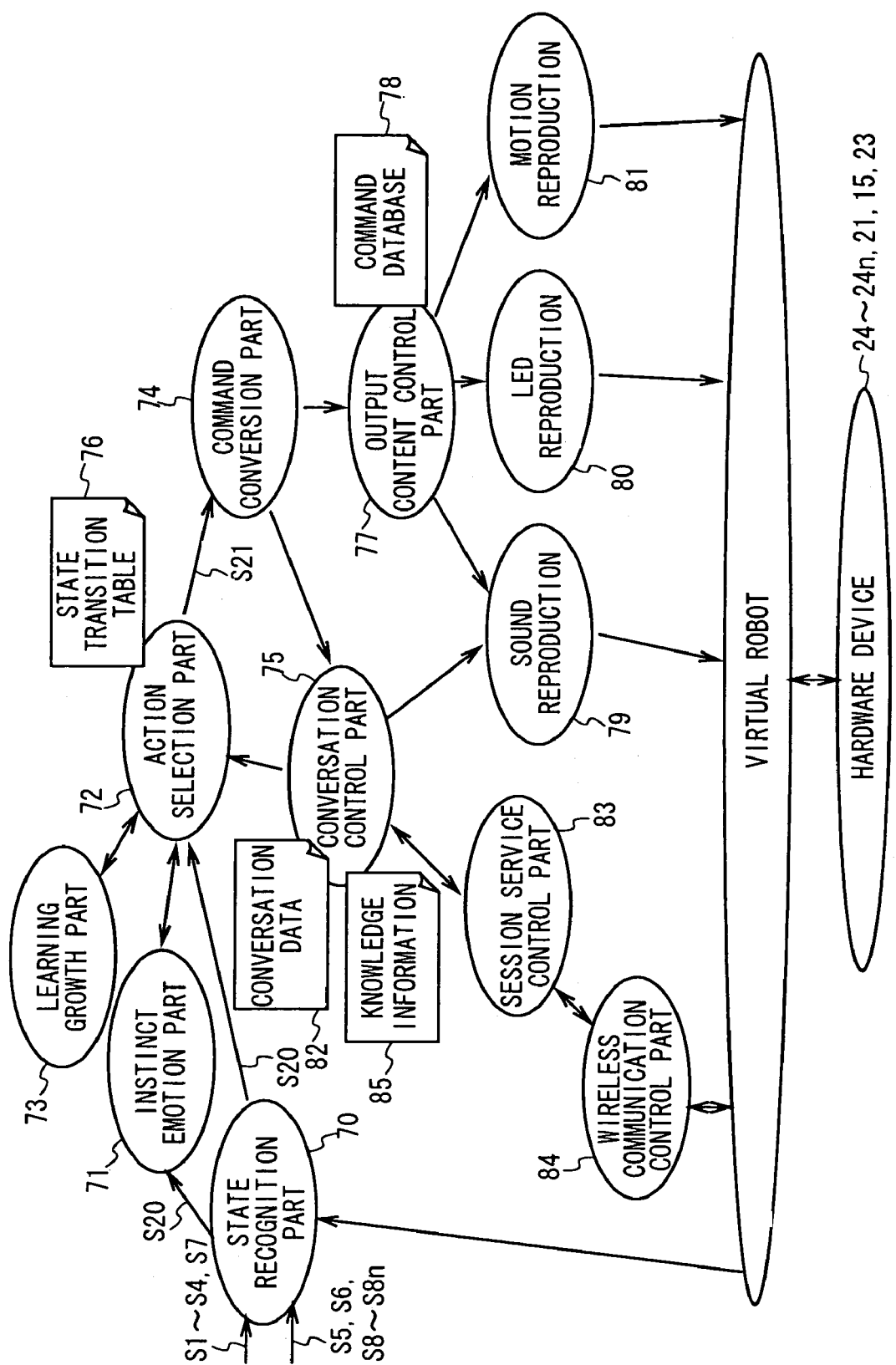
FIG. 7 is a block diagram applying the explanation of the controller processing.

The controller 10 executes above-mentioned various processing based on the control program stored in the memory 10A. The processing contents of the controller 10 can be functionary classified as shown in FIG. 7, to a condition recognition part 70 for recognizing the external and internal conditions, an instinct emotion part 71 for deciding the emotion and the instinct conditions based on the recognized result of the condition recognition part 70, an action selection part 72 for deciding the following action based on the recognized result of the condition recognition part 70 and the output of the instinct emotion part 71, a learning growth part 73 for increasing or decreasing the expression probability of various actions for the next based on the decided result of the action selection part 72, a command conversion part 74 for selecting the action corresponding to the decided result of the action selection part 72 and reflecting to the robot 1 and/or the communicator 50, and a conversation control part 75 for outputting the contents of conversation based on the output of the command conversion part 74 and the condition recognition part 70.

Hereafter, the condition recognition part 70, the instinct emotion part 71, the action selection part 72, the learning growth part 73, the command conversion part 74, and the conversation control part 75 will be explained in detail.

(4-1) Construction of Condition Recognition Part 70

The condition recognition part 70 recognizes the specific condition based on the above-mentioned external information signals S1–S4 and the internal information signals S5, S6, $S8_1$–$S8_n$ in FIG. 2, and notifies the recognized results to the instinct emotion part 71 and the action selection part 72 as condition recognition information S20.

In actually, the condition recognition part 70 always monitors the image signal S2 provided from the CCD camera 17 (FIG. 2), and recognizes for example "there is a ball" or "there is a wall" with the detection of "something red and round" or "a vertical flat surface" in the image based on the image signal S2 then notifies the recognized results to the instinct emotion part 71 and the action selection part 72.

In addition, the condition recognition part 70 always monitors the audio signal S1 provided from the microphone 16 (FIG. 2) and notifies the recognized results to the instinct emotion part 71 and the action selection part 72 as well as the conversation control part 75 with a detection of input of a command sound such as "Walk", "Lie down", and "Chase the ball".

Furthermore, the condition recognition part 70 always monitors the operation detection signals S4 and S7 provided from the face touch sensor 19, the head touch sensor 20, and each of the touch sensors 14 (14A–14D) (FIG. 2), and recognized a press having the threshold value or more and short (for example less than two seconds) as "I'm hit (I'm scold)" and recognizes a press having less than the threshold value and long (for example two seconds or more) as "I'm pat (I'm praised)", then notifies the recognized results to the instinct emotion part 71 and the action selection part 72.

(4-2) Construction of Instinct Emotion Part 71

The instinct emotion part 71 stores parameters for each emotion representing the strength of the emotion of total six types "Joy", "Sadness", "Surprise", "Fear", "Dislike", and "Anger". The instinct emotion part 71 sequentially updates these parameter values of each emotion based on the specific recognized results such as "I'm hit" and "I'm pat" provided from the condition recognition part 70 as the condition recognition information S20, after-mentioned action decision information S21 representing the decided output action provided from the action selection part 72, and the elapsed time.

In specific, the instinct emotion part 71, computes, at prescribed intervals, the parameter value E[t+1] for the next period with the following expression $$E[t+1]=E[t]+k_e \times \Delta[t] \qquad (1)$$

provided $\Delta E[t]$ is the emotion variation computed by a prescribed expression based on the degree (previously set) with which the recognized results obtained based on the condition recognition information S20 and the output action based on the action decision information S21 make influence to the emotion, the degree of the control and the stimulation received from other emotion, and the elapsed time, E[t] is the parameter value of the present emotion, and $k_e$ is the factor representing the ratio with which the emotion is changed based on the recognized result and the like.

Then the instinct emotion part 71 makes update the parameter values of the emotion by replacing the parameter value E[t] of the present emotion with the computed result. It is predetermined which emotion's parameter value is updated for each recognized result and each output action. For example, when the recognized result "I'm hit" is provided, the parameter value of emotion "Anger" is increased as well as the parameter of emotion "Joy" is decreased, and when the recognized result "I'm pat" is provided, the parameter value of emotion "Joy" is increased as well as the parameter value of emotion "Sadness" is decreased.

In the same manner, the instinct emotion part 71 stores parameters representing the strength of four types of independent desire "Kinetic drive", "Desire for adoration", "Appetite", and "Curiosity". The instinct emotion part 71 sequentially updates the parameter values of these desire based on the recognized results from the condition recognition part 70, elapsed time and the notification from the action selection part 72.

In specific, as for "Kinetic drive", "Desire for adoration" and "Curiosity", the instinct emotion part 71 computes, at prescribed intervals, the parameter value for the next period I[k+1] with the following expression $$I[k+1]=I[k]+k_i \times \Delta I[k] \qquad (2)$$

provided that $\Delta I[k]$ is the variation computed with a prescribed expression based on the output action of the robot 1, elapsed time and the recognized results, I[k] is the parameter value of the present desire of the minus, and $k_i$ is the factor representing the sensitivity of the desire, then updates the parameter value of the desire by replacing the parameter value of the present desire I[k] with the computed results. It is predetermined which desire's parameter value is updated for each recognized result and each output action. For example, when the action selection part 72 notifies that an action is taken, the parameter of "Kinetic drive" is decreased.

In addition, as for "Appetite", the instinct emotion part 71 computes, at prescribed intervals, the parameter value of "Appetite" I[k+1] with the following expression $$I[k]=100+B_1 \qquad (3)$$

provided that $B_1$ is the battery remaining amount based on the battery remaining amount detection signal S5 (FIG. 2) provided through the condition recognition part 70, then updates the parameter value of "Appetite" by replacing the parameter value of the present parameter value of appetite I[k] with the computed result.

In this embodiment of this invention, the parameter values for each emotion and each desire are controlled to change between 0 and 100, and factors $k_e$, $k_i$ are individually set for each emotion and each desire.

(4-3) Construction of Action Selection Part 72

The action selection part 72 decides the following action based on the condition recognition information S20 provided from the condition recognition part 70, the parameter values of each emotion and each desire in the instinct emotion part 71, the action models previously stored in the memory 10A, and elapsed time, then outputs the decided results to the instinct emotion part 71, the learning growth part 73, and the command conversion part 74.

Figure 8:
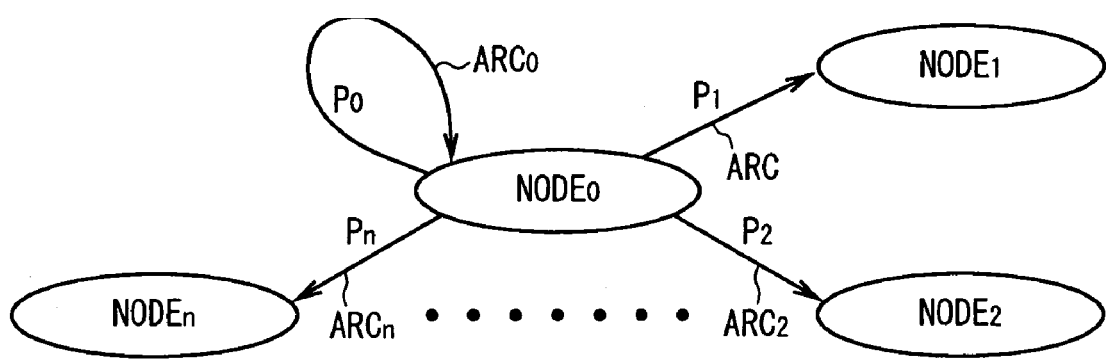
FIG. 8 is a conceptual diagram applying the explanation of the automan probability.

In this case, the action selection part 72 takes an algorithm called automan probability which decides, as a probability, to which NODE of $NODE_0$–$NODE_n$ a node $NODE_0$ (state) will transit based on the transition probability set for each of arc $ARC_0$–$ARC_n$ connecting each of $NODE_0$–$NODE_n$ as shown in FIG. 8.

More specifically, in the memory 10A, a state transition table 76 for each of $NODE_0$–$NODE_n$, as shown in FIG. 9, is stored as an action model, and the action selection part 72 is configured to decide the next action based on the state transition table 76.

Here, in the state transition table 76, an input event (the recognized result of the condition recognition part 70) taken as a transit condition in the $NODE_0$–$NODE_n$ is listed in the row "Input event", and additional conditions for the condition is described in the corresponding column of the row "Data Name" and "Data Range".

Accordingly, in $NODE_{100}$ defined in the state transition table 76 of FIG. 7, the fact that the "Size (SIZE)" of the ball provided with the recognized result "Ball Detected (BALL)" is in the rage of "o to 1000 range (0, 1000)", and the fact that the "distance (DISTANCE)" to the obstacle provided with the recognized result "Obstacle Detected (OBSTACLE)" is in the range of "0 to 1000 range (0, 1000)" are the conditions for transition to the self or other node.

In this node $NODE_{100}$, with no input of a recognized result, it can transit to self or other node when the parameter value of either emotion "Joy (JOY)", "Surprise (SURPRISE)", or "SADNESS (SUDNESS)" is between "50 to 100 range (50, 100)".

Furthermore, in the state transition table 76, in the column "transition target node" of "probability of transition to other node", node names capable of being a target transited from the node $NODE_0$–$NODE_n$ are listed, while the probability of transition to the $NODE_0$-$NODE_n$ with all conditions described in each of row "Input Event Name", "Data Value", and "Data Range" met is described in the row of the node $NODE_0$–$NODE_n$ of the column "probability of transition to other node", and the action or motion output at that time is described in row "Output Action". The sum of probability of transition described in each row of the column "probability of transition to other node" is 100%.

As a result, in this example node $NODE_{100}$, when the recognized results of "Ball Detected (BALL)" and the range of "0 to 1000 range (0, 1000)" for "Size (SIZE)" of the ball are provided, it can transit to "node $NODE_{120}$ (node 120)" with a probability of "30%" and the action or motion of "ACTION 1" is output.

The action model is constructed with connected number of nodes $NODE_0$–$NODE_n$ described as the state transition table 76.

Accordingly, the action selection part 72 decides the next action or motion (the action or motion described in row "Output Action") as a probability using the state transition table 76 of the corresponding node $NODE_0$–$NODE_n$ of the action model stored in the memory 10A when the condition recognition information S20 is provided from the condition recognition part 70 or prescribed time is elapsed after the last expression of action.

At that time, the action selection part 72, outputs the decided action or motion to the instinct emotion part 71 and the command conversion part 74 as an abstract command (hereafter, this is referred as a LMS command) classified into three classes, large, medium, and small to which means are provided respectively.

In this LMS command, when the action decided in the action selection part 72 is "Shake Hands", the upper class represents "Contact user", the middle class represents "Motion of Left foreleg", and the lower class represents "Hold at prescribed position", and utterance text representing at least one kind of contents of the utterance is additionally described corresponding to the action.

In practice, a plurality of patterns for each kinds of the multiple action or motion selectable in the action selection part 72 (hereafter, these are referred as action pattern) is set based on the above-mentioned state transition table 76 in the LMS command, and the action pattern is stored in the memory 10A of the controller 10 as a file. For example, in the case of the action "Shake Hands", which foreleg of right and left is to be put out is set as multiple action patterns.

In the state transition table 76, a situation ID is assigned for each of nodes $NODE_0$–$NODE_n$. The action selection part 72 is configured to transmit a command having the situation ID representing the present node, the utterance text representing at least one contents of the utterance corresponding to the situation ID, and the tone parameter number representing the tone set corresponding to the contents of the utterance (hereafter this is referred as a sentence command) to the command conversion part 74 together with the LMS command as appropriate.

Furthermore, when a scenario ID representing a conversation request is provided from the conversation control part 75, the action selection part 72, substituting to the above-mentioned sentence command, transmits a command having two node numbers of the present node and the next transition target node, and the description of "Output Action" representing the next action or motion (hereafter, this is referred as a scenario command) together with the LMS command to the command conversion part 74, as appropriate.

(4-4) Construction of Learning Growth Part 73

The learning growth part 73 inputs the recognized result of the teaching received as a contact from the user such as "I'm hit" or "I'm pat" based on the LMS command provided from the action selection part 72.

The learning growth part 73 is configured to then change the action or motion as if a real animal "grows up" corresponding to the recognized result, the history of communication between the communicator 50, the history of self action and motion, and the active elapsed days and accumulated active hours from the initial start-up to the present.

In specific, for example five "growth steps", "birth", "childhood", "boyhood", "adolescence" and "adulthood" are set, and in the memory 10A of the controller 10, action and motion models comprised of each control parameter and control program which are the base of the action or motion relating to four items "walking state", "motion", "action", and "sound (utterance, call)" for each of the "growth steps" are previously stored.

The learning growth part 73 selects one action and motion model among the each of the action and motion models for the next "growth step" based on the accumulated degree of multiple elements relating to the "growth", then transmits the changed result to the action selection part 72 as change command information S22 after changing the action and motion model to be used to the selected action and motion model.

As above described, the learning growth part 73 can change the "growth step" as appropriate, and can reflect the action and motion model selected in the "growth step" on the action decision in the action selection part 72.

(4-4) Processing in Command Conversion Part 74

In the multiple action patterns set for each of the multiple action or motion selectable in the above-mentioned action selection part 72, an ID (Identity) is assigned for each hardware (such as actuator $24_1$–$24_n$, speaker 21, and LED 15, 23) of the robot 1, and is mapped in the memory 10A.

For example, in this embodiment, the robot 1 is quadrupedal, and the actuators $24_1$–$24_n$ is driven depending on each of the leg units 3A–3D, however, in an automobile type robot, the actuator is rotatingly driven depending on the multiple tires, therefore, the command conversion part 74 designates the ID corresponding to the hardware of the robot 1 even when the action pattern selected in the action selection part 72 is the same, and transmits the same to an output contents control part 57.

The output contents control part 77 reads the various control data corresponding to the hardware of the robot 1 stored in a command database 78 based on a MW command ID provided from the command conversion part 74, then provides the same to a motion reproduction part 81, a sound reproduction part 80, and a LED reproduction part 79.

As described above, the motion reproduction part 81 drives the necessary actuator $24_1$–$24_n$ based on the driving signal $S9_1$–$S9_n$ to be a prescribed state, the sound reproduction part 80 outputs the voice based on the audio signal S10 from the speaker 21, and the LED reproduction part 79 flashes each of the LED 15 and 23 with a flashing patter based on the control data.

On the other hand, the command conversion part 74 transmits the LMS command received from the action selection part 72 to the conversation control part 75 as it is. When a sentence command or a scenario command is received with the LMS command, the command conversion part 74 transmits only the sentence command or the scenario command to the conversation control part 75.

(4-5) Processing in Conversation Control Part 75

When a LMS command is provided from the action selection part 72 through the command conversion part 74, the conversation control part 75 extracts the utterance text added to the LMS command and reads the text data corresponding to the contents of the utterance based on the utterance text from a conversation data part 82.

At this time, when there are multiple kinds of contents of the utterance based on the utterance text, the conversation control part 75 reads the text data corresponding to the contents of the utterance randomly selected from the conversation data part 82.

Then, the conversation control part 75 converts the text data corresponding to the utterance text through a session service part 83 and the following wireless communication control part 84 to a wireless data and transmits the wireless data to the communicator 50. As a result, the contents of the utterance based on the text data is displayed in accordance with the action of the robot 1 on the display of the communicator 50, for example with document data format such as extensible markup language (XML).

At this time, the conversation control part 75 has a time filter function, can prevent that multiple contents of utterance are displayed on the communicator 50 in five seconds by extracting the utterance text of the count-start (or count-end) from the LMS command when multiple LMS commands are provided in five seconds.

On the other hand, when a sentence command is received from the action selection part 72 through the command conversion part 74, the conversation control part 75 reads the text data based on the utterance text extracted from the sentence command, as well as generates musical instruments digital interface (MIDI) data file based on the tone parameter number and the data volume of the text data extracted from the sentence command.

Then, the conversation control part 75 transmits the wireless data based on the text data to the communicator 50, as well as transmits the MIDI data file to a sound reproduction part 79, so that the contents of the utterance based on the text data are displayed on the display of the communicator 50 in accordance with the action transition state of the robot 1 and an pronounced sound based on the MIDI data file is output from the robot 1, as a result, the user using the communicator 50 can be naturally on attention.

On the other hand, the conversation control part 75 transmits a scenario ID to the action selection part 72, and when a scenario command is received from the action selection part 72 through the command conversion part 74, the conversation control part 75 generates a scenario data including specific contents of utterance based on the scenario command or the recognized result using a knowledge information part 85, then displays the scenario based on the scenario data on the display of the communicator 50.

The conversation control part 75 can display the menu based on the utterance data for menu on the display part 51 of the communicator 50 by transmitting the data of utterance for menu to be displayed on the display part 51 of the communicator 50 with the same document data format as the scenario data (for example XML) to the communicator 50. As described above, the interactionable scenario utterance and the selection of menu are in the same document data format, so that the control of scenario data can be easy.

(5) Conversation with Robot 1 Using Communicator 50

In practice, in the communicator 50, the conversation control part 75 shown in FIG. 7 receives the LMS command, sentence command, or scenario command from the action selection part 72 in the above-mentioned processing of the controller 10 of the robot 1, so that three types of contents of utterance "soliloquy utterance", "sentence utterance", and "scenario utterance" can be displayed on the display part 51.

(5-1) Soliloquy Utterance

Soliloquy utterance is the utterance explaining the condition where the robot 1 autonomously acts, and displays, in accordance with the action of the robot 1, the contents of utterance set corresponding to the action on the display part of the communicator 50.

In specific, the above-mentioned LMS command is in the format comprised of a command and utterance text as shown in FIG. 10, and is displayed for example starting from the initial character "L", followed by "CONTACT (contact user)", "FLEFT(motion of left foreleg)", "HOLD (hold at prescribed position)", and the last character "B" when the action of the robot 1 is "Shake Hands", and the utterance text is displayed as "Please Shake Hands" following the command.

Here, when multiple utterance text, such as "Let's Shake Hands" and "Let's hand-shake", are added to one command, one of the utterance text is randomly selected, so that different contents of utterance can be provided to the communicator 50 even when the robot 1 repeats the same action, as a result, there can be a benefit that the user is not made to lose interest or be bored.

Other than above, for example, when the action of the robot 1 is "Lie down", the command is displayed starting from the initial character "L", followed by "CHGPOS (change position), "LIE (lie down)", "NORMAL (normal position)", and the last character "B", and the utterance text is displayed as "alley-oop" following the command.

As described above, when multiple utterance text are provided in five seconds, the soliloquy can prevent that multiple contents of utterance are displayed on the communicator 50 in five seconds and make the user difficult to see by displaying only the utterance text of the count-start (or at count-end) on the display part 51 of the communicator 50.

(5-2) Sentence Utterance

The sentence utterance generates and displays the utterance corresponding to the state of the state transition table 76 on the display part 51 of the communicator 50 with embedding the utterance into the state transition table 76 shown in FIG. 9 as a command.

In specific, the above-mentioned sentence command, as shown in FIG. 11, is in the format comprised of a situation ID, a sub ID, text and tone parameter number (ttm-index).

As shown in FIG. 11(A), when the action of the robot 1 is "Recovery from Fall", the situation ID is "0x00410001", the sub ID is "1", and the text is displayed as "I'm fell down".

Here, where multiple sub Ids "2"–"10" are added to one situation ID "0x00410001", the text are displayed as "Help me", "Oops", "I stumble over", "I looked away", "I had a scare", "I can't walk", "I fell over", "I slipped", and "I got a clam" respectively, and when the sub ID is directly designated, the corresponding text is displayed, however, when only the situation ID is designated, the text corresponding to one sub ID is selected randomly, so that different contents of utterance can be provided to the communicator even when the same action of the robot 1 is repeated, as a result, there can be a benefit that the user is not made to lose interest or be bored.

In addition, as shown in FIG. 11(B), when the action of the robot 1 is "Response", the situation ID is "0x00700010", sub ID is "1", and the text is displayed as "I'm fine", and when following these, the tone parameter number is displayed as "10", the tenth tone of multiple tone previously set is selected, and the robot 1 utters the pronounced sound corresponding to the selected tone.

The tone parameter number is the tone number with which the sound is reproduced as if it is in accordance with the utterance, and which is set in accordance with the growth stage and emotion level, and is "0" without designation.

(5-3) Scenario Utterance

Scenario utterance is used for executing a scenario previously set among the robots 1 when a multiple series of utterance as a scenario is required, and displays the utterance corresponding to the scenario on the display part of the communicator 50.

In specific, the scenario data generated based on the above-mentioned scenario command or the condition recognized result in the knowledge information part 85 (FIG. 7) is, as shown in FIG. 12, in the format comprised of a node number, a conditional expression, a motion mode of the communicator 50, text, a motion command, and a following transition node number.

In specific, the text data is displayed as , for example the node number "0", the conditional expression "if the present time is before five o'clock to communicator name", the motion mode of the communicator "terminal mode", the text "Good evening", the motion command "greetings", and the following transition node number "100". In the conditional expression, the items between the "%" mean a variable (knowledge information), and for example, "%HOUR%" represents the present time.

In other words, the scenario based on the scenario data provides the contents of utterance "Good evening" when meeting a user having communicator name "undefined" before five o'clock to the communicator 50 while the robot executes the motion corresponding to "greetings".

(5-4) Utterance for Menu

In addition to the above three types of contents of utterance, the utterance for menu to be displayed on the display part of the communicator 50 is transmitted in the same document data format as the scenario data (for example XML) to the communicator 50, so that there can be a benefit that the control of scenario data is easy.

Figure 13:
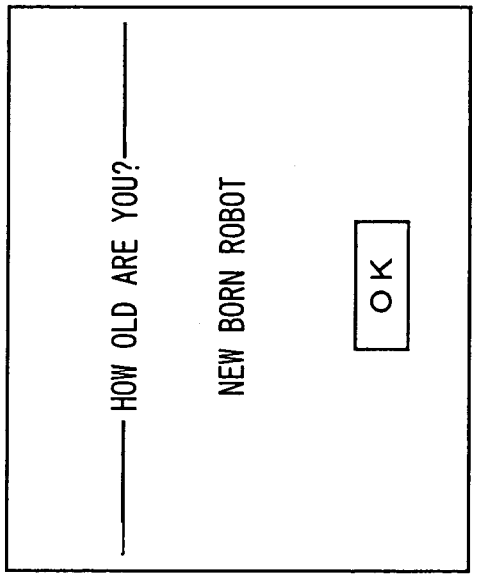
FIG. 13 is a schematic diagram applying the explanation of the command format of the utterance for menu.

For example, the utterance data in the document data format as described in FIG. 13(A) is displayed on the display part of the communicator 50 as shown in FIG. 13(B).

(6) Security Measures Realized by Communicator Registration

In the wireless communication between a plurality of robots 1 and a plurality of communicators 50, when one of the robot 1 is assigned as a master and all the other robots 1 and all the communicators are regarded as slaves, none of the slaves can communicate each other and each slave is required to make communication through the master.

At this time, there has been a problem that the communicator 50 cannot ensure the security on operation and easy connection of wireless communication when a specific communicator 50 is not registered in each robot 1.

Therefore, the communicator 50 can keep the security on operation and easy connection of wireless communication by the registration of the specific communicator 50 on the robot 1, where each robot 1 is couple with a specific communicator 50.

For example, when the robot 1 is operated, the robot 1 does not response at all to the operation on menu line by the communicator 50 which is not a registered communicator 50, so that the security on operation can be ensured.

In addition, when the robot 1 transmits the text data representing a soliloquy, only the registered communicator 50 can display the soliloquy based on the text data, so that the easy connection of wireless communication can be ensured.

(7) Transition State of Communicator 50

In actually, in the communicator 50, the display contents are read from the ROM and the RAM for program 57 or obtained from the corresponding robot 1 for variety set functions necessary for the communication between the robots 1 or the communication between the robot 1 and the communicator 50, and is displayed on the display part 51 with sequential transition of the display in accordance with each of the display contents.

Figure 14:
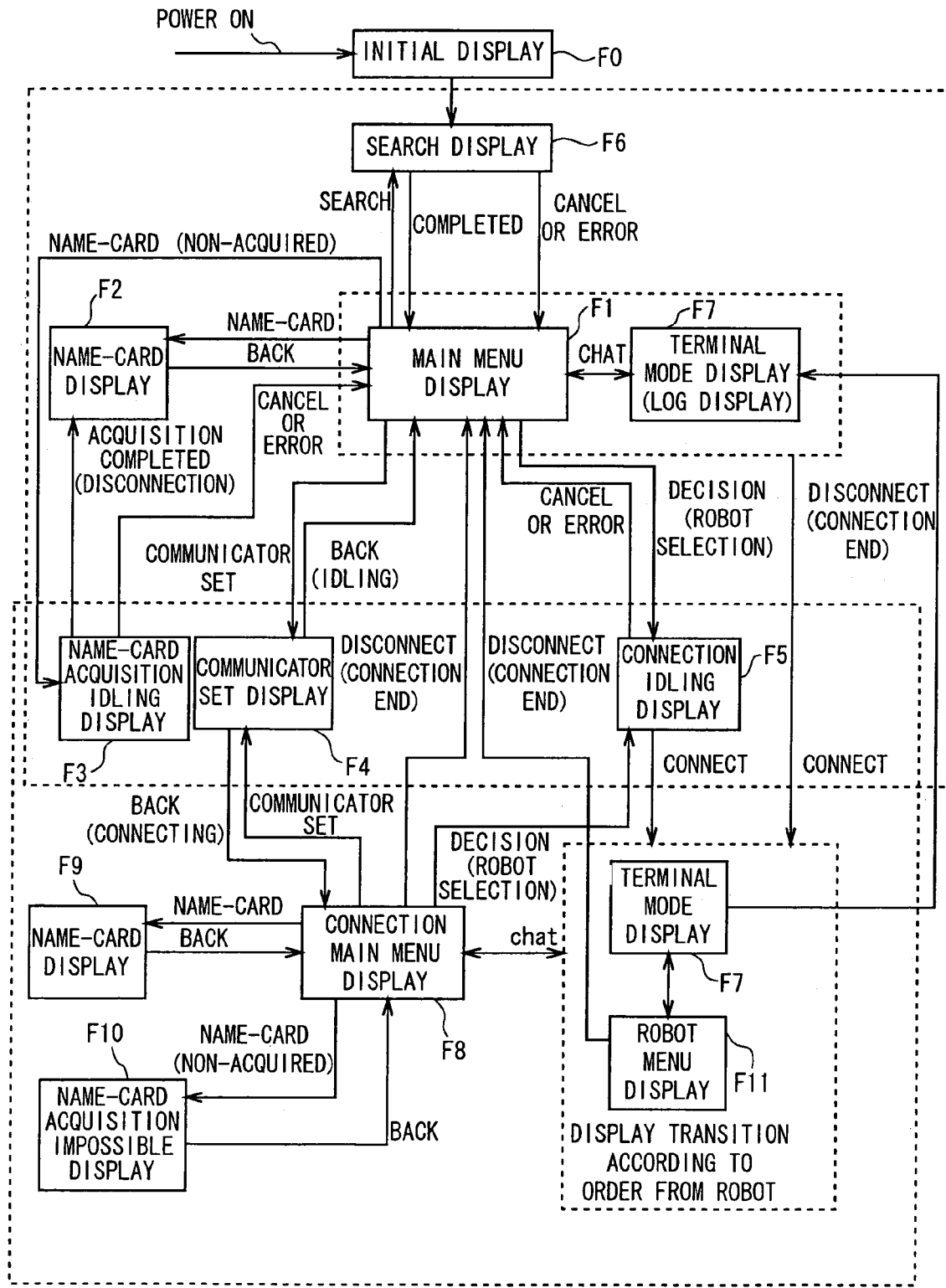
FIG. 14 is a block diagram applying the explanation of the transition state of the communicator display.

At this time, the communicator 50 has different types and contents of the display transiting on the display part 51 depending on whether the communication between the robots 1 is available or not. In other words, when the communicating state between the robots 1 is off-line state (idling state), the communicator 50 as shown in FIG. 14, is configure to transit from a main menu display F1 to a name-card display F2 for acquiring name-card information from the communicating robot 1, a name-card acquisition idling display F3 for acquiring name-card information from the robot 1 whose name-card information is not acquired, a communicator display F5 for displaying that the communicating robot 1 is being connected, and a search display F6 for searching a communicatable robot 1 as appropriate.

On the other hand, when the communicating state between the robots 1 is on-line state (connected state), the communicator 50 is configured to transit from the main menu display F1 to a terminal mode display F7 for real-time chatting with the robot 1 by connecting the communicating robot 1 via the connection idling display F5, then to transit to a main menu display F8 for connected state which is like the main menu display F1 (hereafter, this is called as a connection main menu display F8).

Then, the communicator 50 transits the display from the connection main menu display F8 to a name-card display F9 targeting the robot 1 whose name-card information is acquired and a name-card acquisition impossible display F10 for displaying that the name-card information cannot be acquired, as well as to the name-card acquisition idling display F3, the communicator set display F4, and the connection idling display F5 in the same manner as off-line state.

Furthermore, the communicator 50, in the terminal mode display F7 displayed during the execution of chat, transits the display to a robot menu display F11 in accordance with the application of the robot 1 side, and the display contents of the terminal mode display F7 can be displayed as a log (a historical record of the system) even during off-line state.

(7-1) Main Menu Display F1

Figure 15:
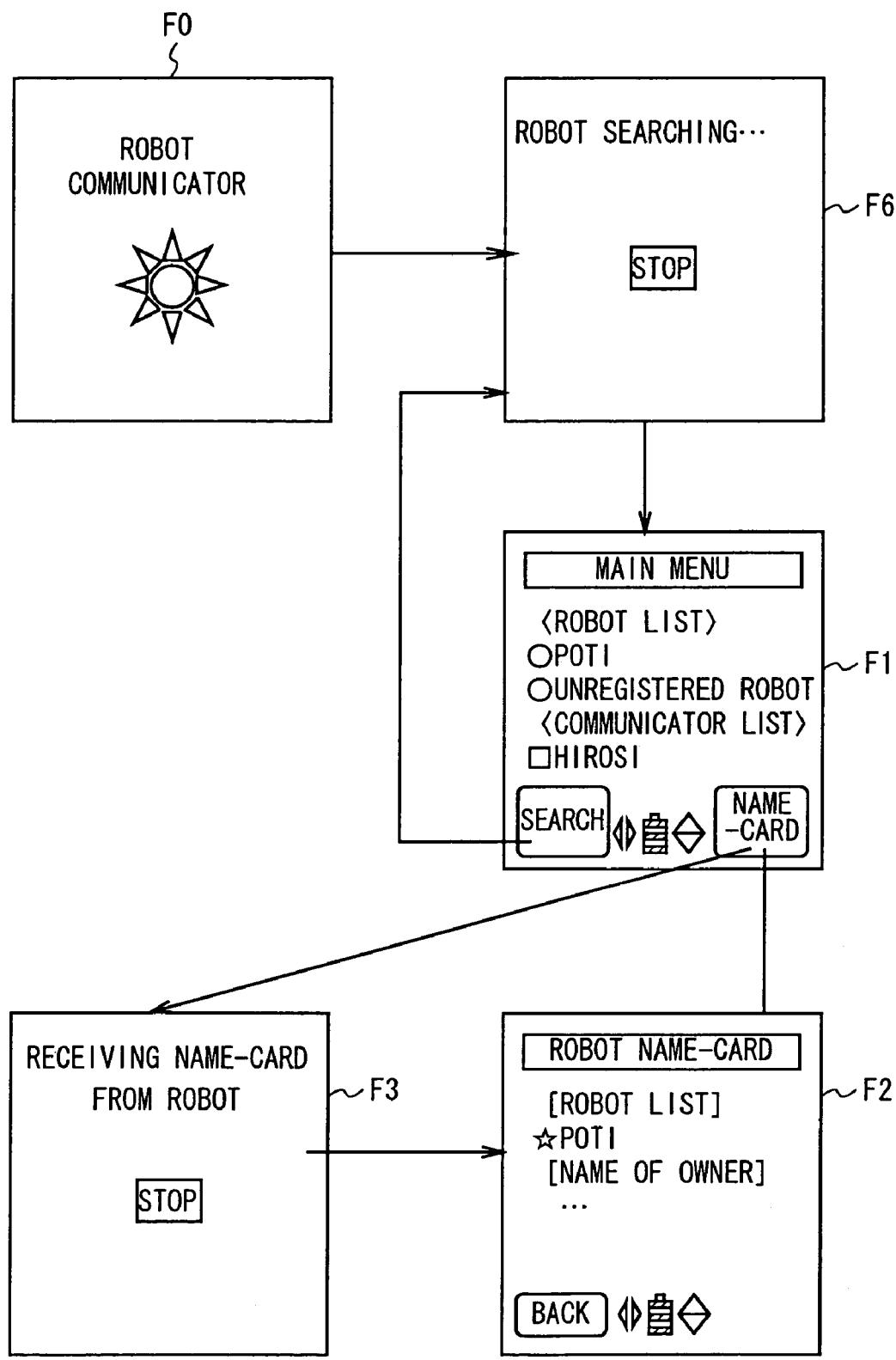
FIG. 15 is a plane diagram applying the explanation of the transition state to the name-card display.

When the power is on with press operation of the power key 52F (FIG. 5) of the operation part 52, the communicator 50, as shown in FIG. 15, displays at first the after-mentioned search display F6 via an initial display F0 on the display part 51, and searches for a robot 1 communicatable in the neighborhood of the own robot 1 with the search display F6 displayed. Then, with the searched result after prescribed time passed, the communicator 50 transits the display from the search display F6 to the main menu display F1.

Figure 16:
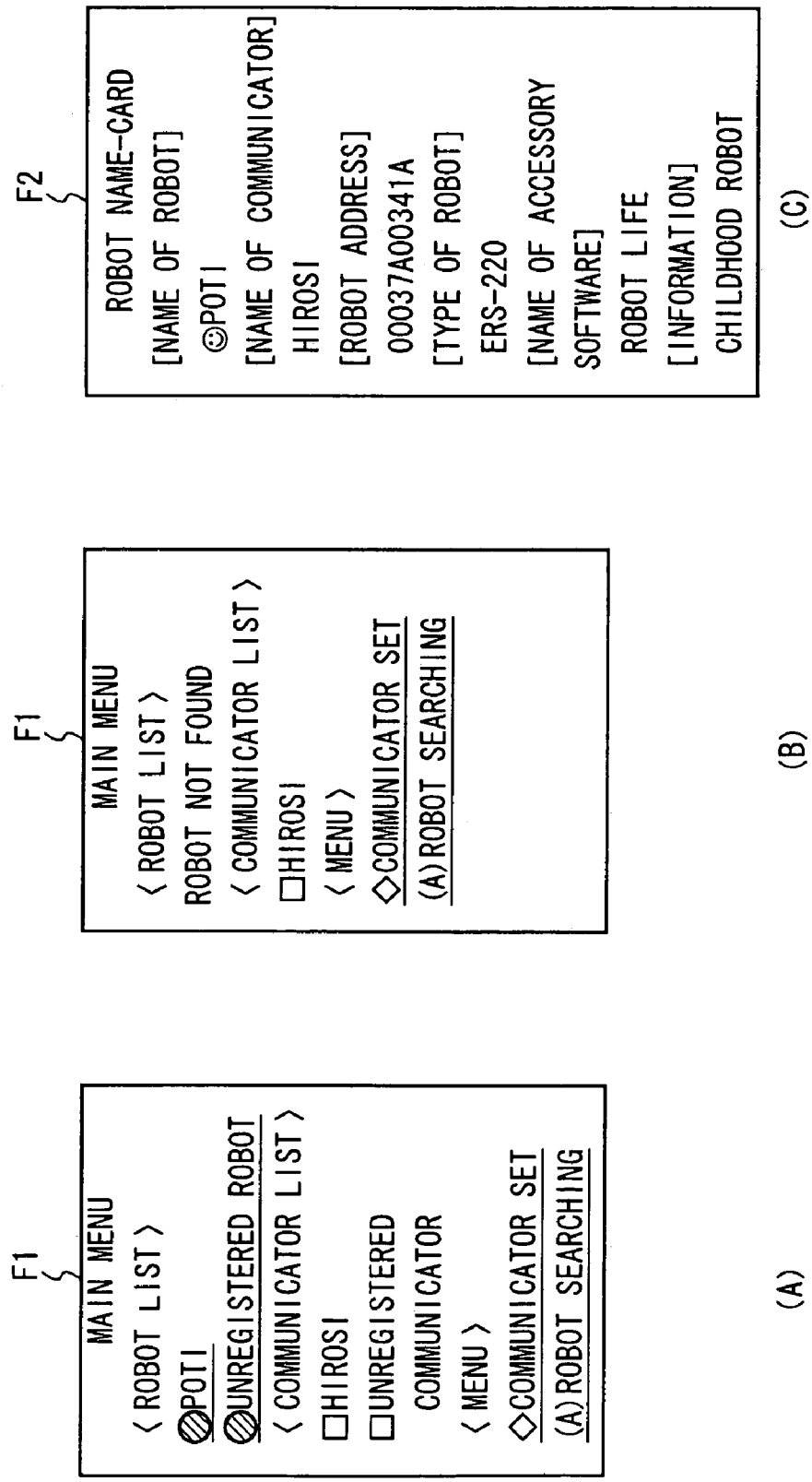
FIG. 16 is a schematic plane diagram showing the scrollable range of each display.

In the main menu display F1, as shown in FIG. 16(A), "Main Menu" is displayed as a title bar, and "Robot List", "Communicator List", and "Menu" are listed in line as menu items.

At the last line of the main menu display F1, marks showing "Search" and "Name-Card" to which the above-mentioned reserved keys 53C and 53D are assigned are displayed on the right and left, and between the marks a mark showing the connection or the disconnection of the communication, an indicator showing the remaining battery amount, and a scroll button are displayed as GUI.

Among those menu items, "Robot List" has different display contents corresponding to the searched result of the robot 1, and when communicating robots 1 are searched, the names of the robots 1 are listed for the robots 1 whose name-card information is acquired, while "Unregistered Robot" is displayed for the robots 1 whose name-card information is not acquired. On the other hand, when no communicatable robot 1 is searched, a message such as "Robot not found" is displayed as shown FIG. 16(B).

In the "Communicator List", the names of communicators 50 coupled with the robots 1 are displayed. When communicatable robots 1 are searched, the names are listed as the names of the communicators 50 for the robots 1 whose name-card information are acquired, and "Unregistered Communicator" is displayed for the robots 1 whose name-card information are not required as the names of the communicator 50.

Further, in the "Menu", "Communicator Set" for changing the set of various contents of the communicator 50, and "(A) Robot 1 Searching" for executing the same function as the reserved key 52C corresponding to the "Search" at the left bottom are listed and displayed.

In the main menu display F1, for the transition of the display to the display corresponding to the list items by designating the desired list item, the user is required to operate to press the cursor key 52B of the operation part 52 to adjust the position of the cursor on the desired list item, then operate to press the decision key 52A.

(7-1-1) Name-Card Display

In the communicator 50, when the main menu display F1 is displayed, and the desired robot name of the "Robot List" is selected by the cursor, and then the reserved key 52D corresponding to the "Name-Card" is operated and pressed, the display is transited from the main menu display F1 to the name-card display F2 in case that the name-card information of the robot name is already acquired.

At the left bottom of the name-card display F2, a mark showing "Back" is displayed in the place of the mark showing "Search" while the mark showing "Name-Card" at the right is deleted, and the reserved key 52C corresponding to the mark showing "Back" is assigned of the function for transmitting the display from the name-card display F2 to the main menu display F1.

On the other hand, when the name-card information of the designated robot name is not acquired, the display is transited from the main menu display F1 to the name-card acquisition idling display F3 where the message "Receiving Name-Card from Robot" is displayed. With displaying the name-card acquisition idling display F3, the communicator 50 transits the display to the former name-card display F2 at the completion of the acquiring the name-card information from the robot 1.

Here, at lower part of the message display of the name-card acquisition idling display F3, a mark showing "Stop" to which the above-mentioned decision key 52A is assigned, and the operation of acquiring the name-card information is stopped when the decision key 52A is operated and pressed.

(7-1-2) Search Display F6

In the communicator 50, not only when the display is transited from the initial display F0 to the main menu display F1 with the power on, but also when the reserved key 52C corresponding to the "Search" at the left bottom is operated and pressed by a user with the main menu display F1, displayed as shown in FIG. 15, the display is transited to the search display F6 where a message "Robot Searching" is displayed.

With the search display F6 displayed, the, communicator 50 searches a communicatable robot in the neighborhood of the self robot 1 and transits the display to the main menu display F1 at the reception of the searched result after prescribed time passed.

Here, in the middle of the search display F6, a mark showing "Stop" corresponding to the decision key 52A is displayed, and the operation of searching the robot 1 is stopped with the decision key 52A operated and pressed.

(7-1-3) Terminal Mode Display F7

Further in the communicator 50, when the desired robot name in the "Robot List" is selected by the cursor with the main menu display F1 displayed followed by the decision key 52A operated and pressed, the display is transited from the main menu display F1 to the connection idling display F5 where the message "Robot Connecting" is displayed.

With the connection idling display F5 displayed, the communicator 50 transits the display to the terminal mode display F7 at the time when the robot 1 corresponding to the designated robot name is communication connected and is in the connection state.

Here, at the lower part of the message display of the connection idling display F5, a mark showing "Stop" to which the above-mentioned decision key 52A is assigned is displayed, and stops the operation of connecting the robot 1 with the decision key 52A operated and pressed.

Figure 17:
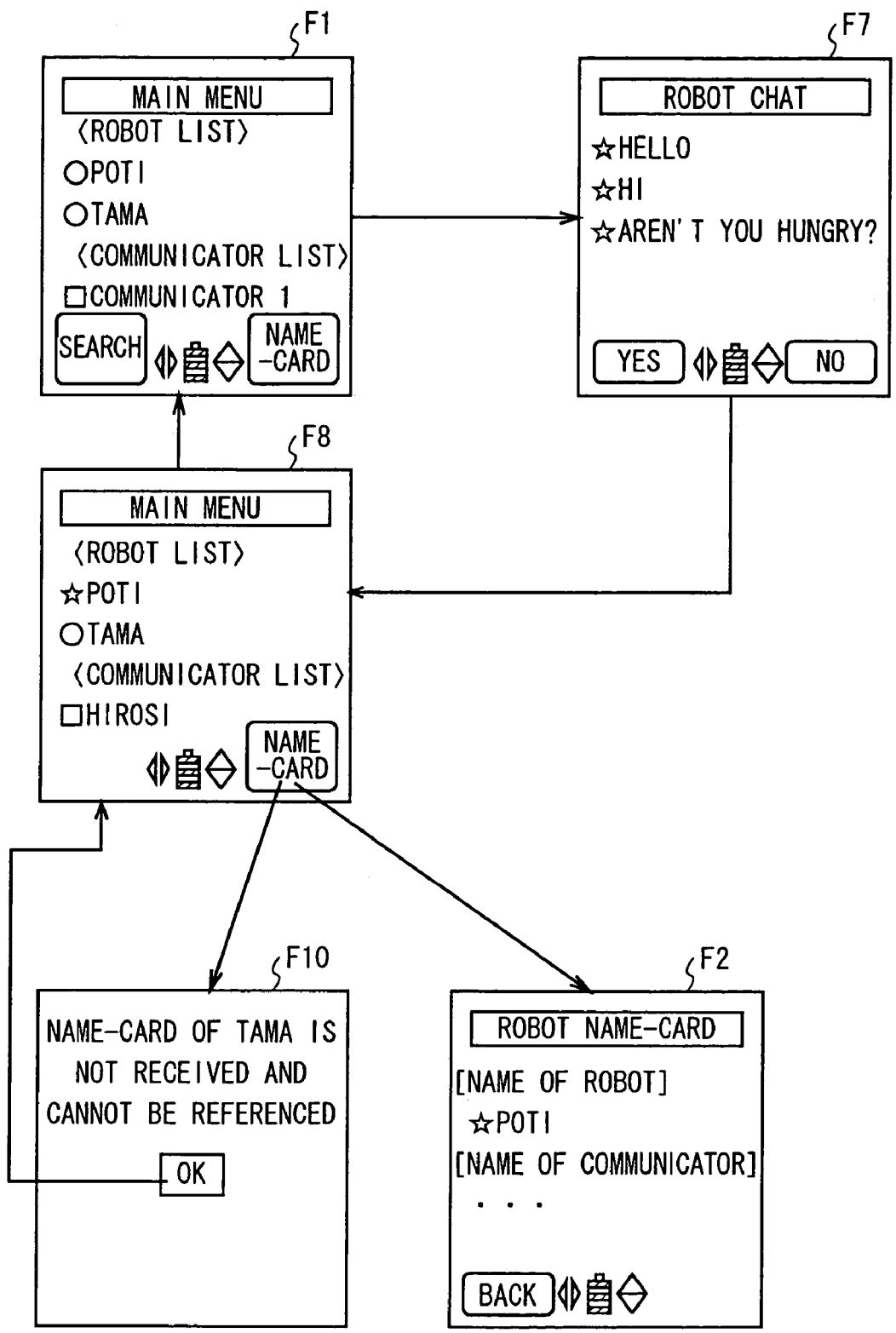
FIG. 17 is a plane diagram applying the explanation of the transition state to the terminal mode display.

In FIG. 17, the terminal mode display F7 is the display for establishing the conversation between each robot 1 including the self robot 1 by exchanging the messages sequentially and on real time, and is configured to display the display contents depending on the application for the robot 1 which is in the connection state.

In the terminal mode display F7, "Robot Chat" is displayed as a title bar, and chat sentences are displayed sequentially obtained from each robot 1 with an icon added for recognition on the head.

At the right and left bottom of the terminal mode display F7, marks showing "Yes" and "No" are displayed in the place of the marks showing "Search" and "Name-Card" of the main menu display F1, and the functions for providing the recognized result corresponding to "Praise" and "Scold" are assigned to the corresponding reserved keys 52C and 52D.

On the other hand, in the communicator 50, the display is transited from the main menu display F1 to the terminal mode display F7 when the instruction contents from the robot 1 under communication connection is provided including the case where the decision key 52A is operated and pressed as above-mentioned.

When the switch key 52E is operated and pressed with the terminal mode display F7 displayed, the display is transited from the above-mentioned main menu display F1 for off-line state to the connection main menu display F8 for on-line state.

The connection main menu display F8 is different from the main menu display F1 for off line state in the points that the mark at the left bottom showing "Search" is deleted and the icons same as the icons displayed on the terminal display F7 for recognition are displayed on the head of the names listed and displayed in "Robot List".

In other words, in the connection main menu display F8, the pictographic characters for recognition are displayed only on the head of the robot names of the robots joining chat among the robot names listed in "Robot List".

When the desired robot name in "Robot List" is selected by a cursor with the connection main menu display F8 displayed followed by the reserved key 52D corresponding to "Name-Card" operated and pressed, the communicator 50 transits the display from the connection main menu display F8 to the name-card display F2 when the name-card information corresponding to the robot name is acquired.

On the other hand, when the name-card information corresponding the designated robot name is not acquired, the display is transited from the connection main menu display F8 to the name-card acquisition impossible display F10 where the message "Name-card of Tama is not received and cannot be referred" is displayed.

Under the message display of the name-card acquisition impossible display F10, the mark showing "OK" to which the above-mentioned decision key 52A is assigned, and the display is transited to the former connection main menu display F8, when the decision key 52A is operated and pressed, regarding it as the completion of the confirming that the name-card information acquisition by the user is impossible.

Furthermore, the communicator 50 is configured to transit the display from the terminal mode display F7 to the after-mentioned robot menu display F11 when the instruction contents from the self robot 1 are provided with the terminal mode display F7 displayed.

Furthermore, the communicator 50 is configured to display the log result of the chat sentences at the completion of the communication with the communicating robot 1 by the instruction from the robot 1, so that the contents of the conversation with the robot 1 can be visually recognized even in off-line state if necessary.

(7-1-4) Communicator Set Display F4

Figure 18:
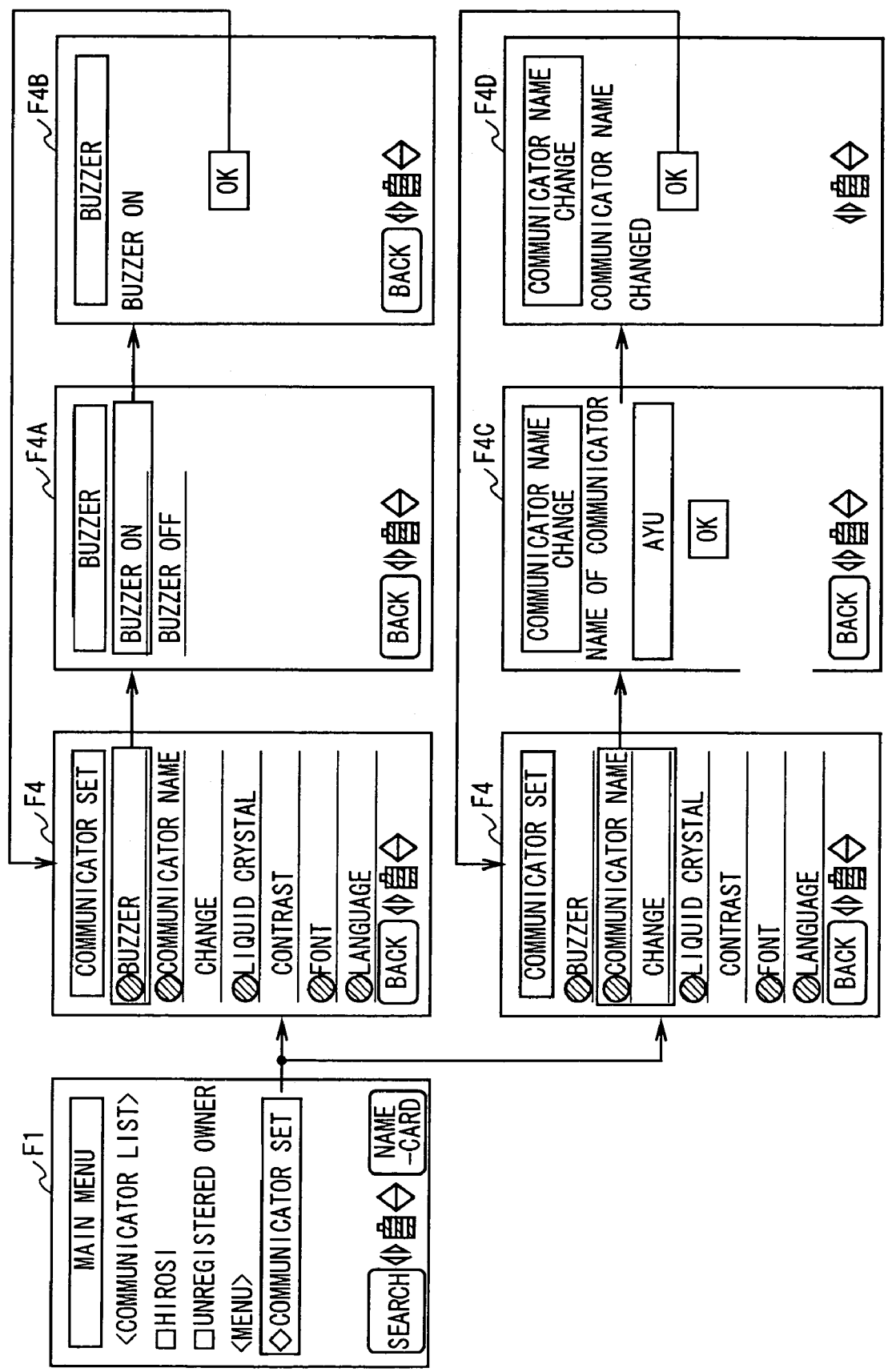
FIG. 18 is a plane diagram applying the explanation of the transition state to the communicator set display.

Still further, in the communicator 50, when "Communicator Set" among the menu items in "Menu" is selected with the main menu display F1 for off-line displayed or the connection main menu display F8 for on-line displayed, as shown in FIG. 18, the display is transited from the main menu display F1 or the connection main menu display F8 to the communicator set display F4.

In the communicator set display F4, as shown in FIG. 19(A), "Communicator Set" is displayed as a title bar, and "Buzzer", "Communicator Name Change", "Liquid Crystal Contrast", "Font", "Language", "Bluetooth Information", "Version Information", and "Reset" are listed and displayed in sequential as menu items.

At the left bottom of the communicator set display F4, a mark showing "Back" is newly displayed in the place of the mark showing "Search" as well as the mark showing "Name-Card" at the right is deleted, and the function for transiting the display from the communicator set display F4 to the main menu display F1 or the connection-main menu display F8 is assigned to the reserved key 52C corresponding to the mark showing "Back".

The contents of the menu items of the communicator set display F4 will be described. First of all, with the selection of "Buzzer" in the menu items of the communicator set display F4, the display is transited from the communicator set display F4 to the Buzzer set display F4A.

In the buzzer set display F4A, "Buzzer" is displayed as a title bar, and two options, "Buzzer On" and "Buzzer Off" representing whether the beep sound generates or not, are displayed as menu items. The display contents at the bottom of the buzzer set display F4A are the same as those of the communicator set display F4.

In the buzzer set display F4A, for example "Buzzer On" is selected, a message "Buzzer On" is displayed as well as the mark showing "OK" to which the decision key 52A is assigned is displayed, while the mark at the lower part showing "Back" is deleted (a buzzer set display F4B). Also, the beep sound set is changed to ON in the communicator 50.

As described above, in the buzzer set display F4B, when the decision key 52A corresponding to "OK" is operated and pressed after the beep sound On or Off setting by the user selection, the display is transited from the buzzer set display F4B to the former communicator set display F4.

In actually, when the beep sound is set On in the communicator 50, the communicator 50 itself is configured to output various beep sounds through the speaker 21 (FIG. 2) with events at undecided timing, attention attracting to users, and input confirmations as well as with the request from the robot 1.

As types of the beep sounds output from the speaker 21 of the communicator 50, for example, "Info" representing common beep sound (pii), "Warning" representing warning sound "pipi" for telling the reach to the input limit, "Error" representing error sound "pi-pi-pi", "Alarm" representing the alarm sound "pi pi pi pi", "Click" representing the decision sound "pi", and the "Melody" representing sound ringing at the timing of the robot 1's designation.

When "Communicator Name Change" is selected among the menu items in the communicator set display F4, the display is transited from the communicator set display F4 to a communicator name change display F4C.

In the communicator name change display F4C, "Communicator Name Change" is displayed as a title bar, and input field for inputting the character in "name of communicator 50" and a mark showing "Decision" to which the decision key is assigned are displayed under the title bar. The display contents at the bottom of the communicator name change display F4C are the same as those of the communicator set display F4.

Figure 20:
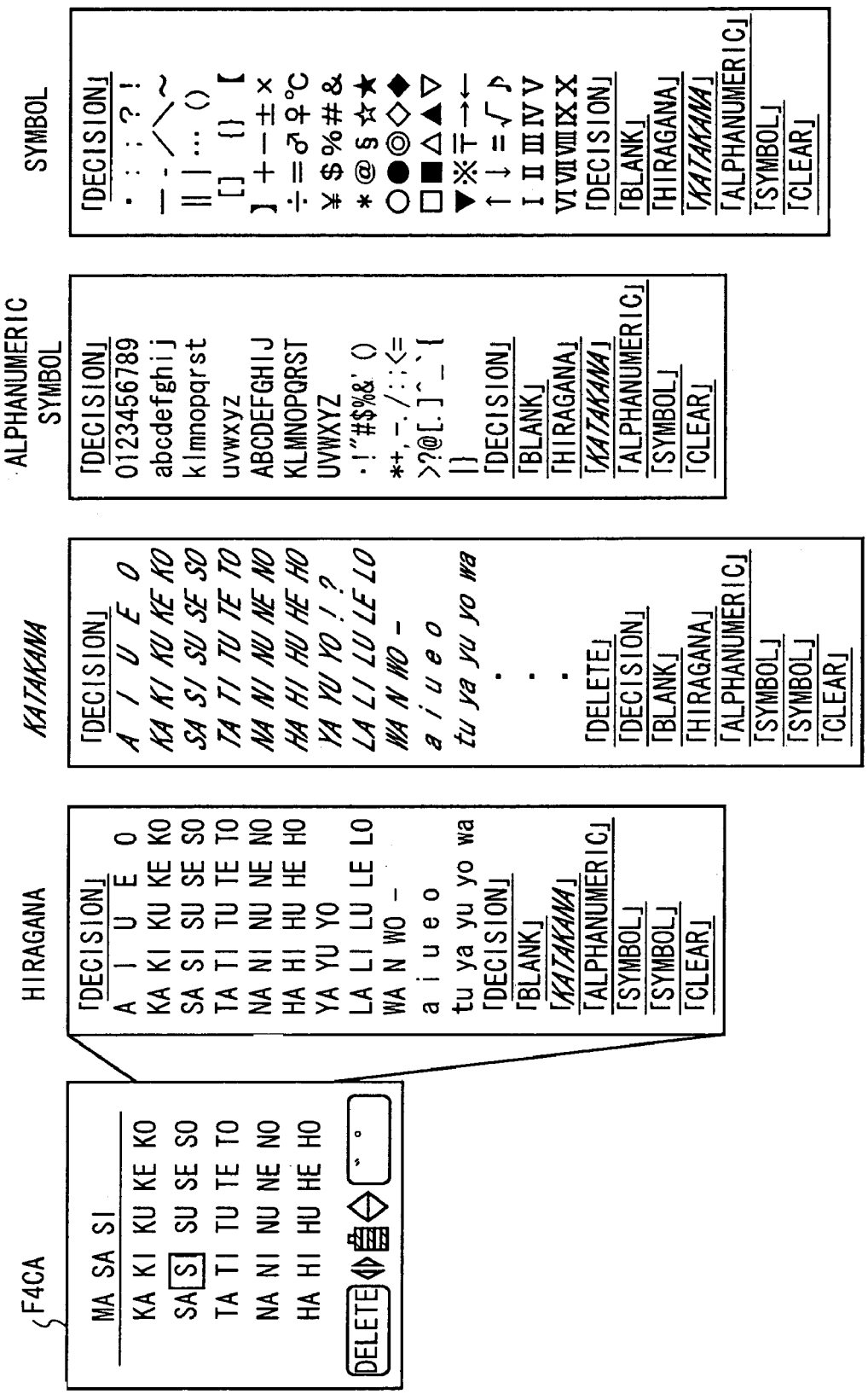
FIG. 20 is a schematic plane diagram applying the explanation of the character-input display.

In this input field, desired characters can be input with the language selected by the user's operation, and the display is transited from the communicator change display F4C to a character-input display F4CA as shown in FIG. 20 when the cursor is put on the head position of the input field.

In the character-input display F4CA, as for Japanese input, the input field is displayed at the upper part, a character group corresponding to the four types of input mode, "HIRAGANA", "KATAKANA", "ALPHANUMERIC SYMBOL", and "SYMBOL" (hereafter, this is referred as input character group) are displayed in the middle part in a scroll-able condition and selectively, a mark showing "Delete" is displayed in the place of the mark showing "Back" in the left lower part, and a mark showing "dot mark of dull sound, dot mark of semi-dull sound" is newly displayed in the right lower part.

This input character group, for example when "HIRAGANA" is selected as an input mode, a character group such as the Japanese 50-character kana syrabary is displayed in a prescribed sequence pattern, "Decision" is listed and displayed on the upper side and lower side sandwiching the sequence pattern, and "Blank", "KATAKANA", "ALPHANUMERIC SYMBOL", "SYMBOL", and "Clear" are sequentially listed and displayed under the "Decision" on the lower side.

A function for moving the cursor to the desired direction on the sequence pattern of the character group and for moving each of the list items up and down is assigned in the cursor key 52B of the communicator 50, and a function for selecting and inputting the character to which the cursor is put on is assigned in the decision key 52A. In addition, in the character-input display, a function for deleting a character is assigned in the reserved key 52C corresponding to the mark showing "Delete" and a function for switching the character among resonant sound, dull sound and semi-dull sound is assigned to the reserved key 52D corresponding to the mark showing "dot mark of dull sound, dot mark of semi-dull sound", respectively.

Each of the list items displayed in the above-mentioned character-input display F4CA is configured to execute the function assigned to the keys by the user's pointing the cursor on the key followed by the decision key 52A operated and pressed.

"Decision" on the upper and lower side among above, are the list items for deciding the character selected by the decision key 52A in the character group, and "Blank" is the list item for inputting blank between characters. "KATAKANA", "ALPHANUMERIC SYMBOL", and "SYMBOL" are the list items for transiting the current input mode "HIRAGANA" to other input modes, in other words, the list items for transiting the display to the character-input display F4AC corresponding to the selected input mode.

Furthermore, "Clear" is the list item for transiting the display from the character-input display F4CA to the former communicator name change display F4C.

When one of "KATAKANA", "ALPHANUMERIC SYMBOL" and "SYMBOL" is selected as an input mode, the input character group is displayed in the sequential patter shown in FIG. 20 respectively with characters and/or symbols, and other display contents are almost the same as that of "HIRAGANA".

When the decision key 52A is operated and pressed after the decision of the name of the communicator 50 in the character-input display F4CA wit the former communicator name change display F4C displayed, a message "Communicator Name Changed" and a mark showing "OK" are displayed in the place of input field and the mark showing "Decision" in the middle, as well as the mark showing "Back" in the lower part is deleted.

As described above, when the decision key corresponding to "OK" is operated and pressed after the change of the name of the communicator 50 by user's operation in the communicator name change display F4C, the display is transited from the communicator name change display F4C to the former communicator set display F4.

Figure 21:
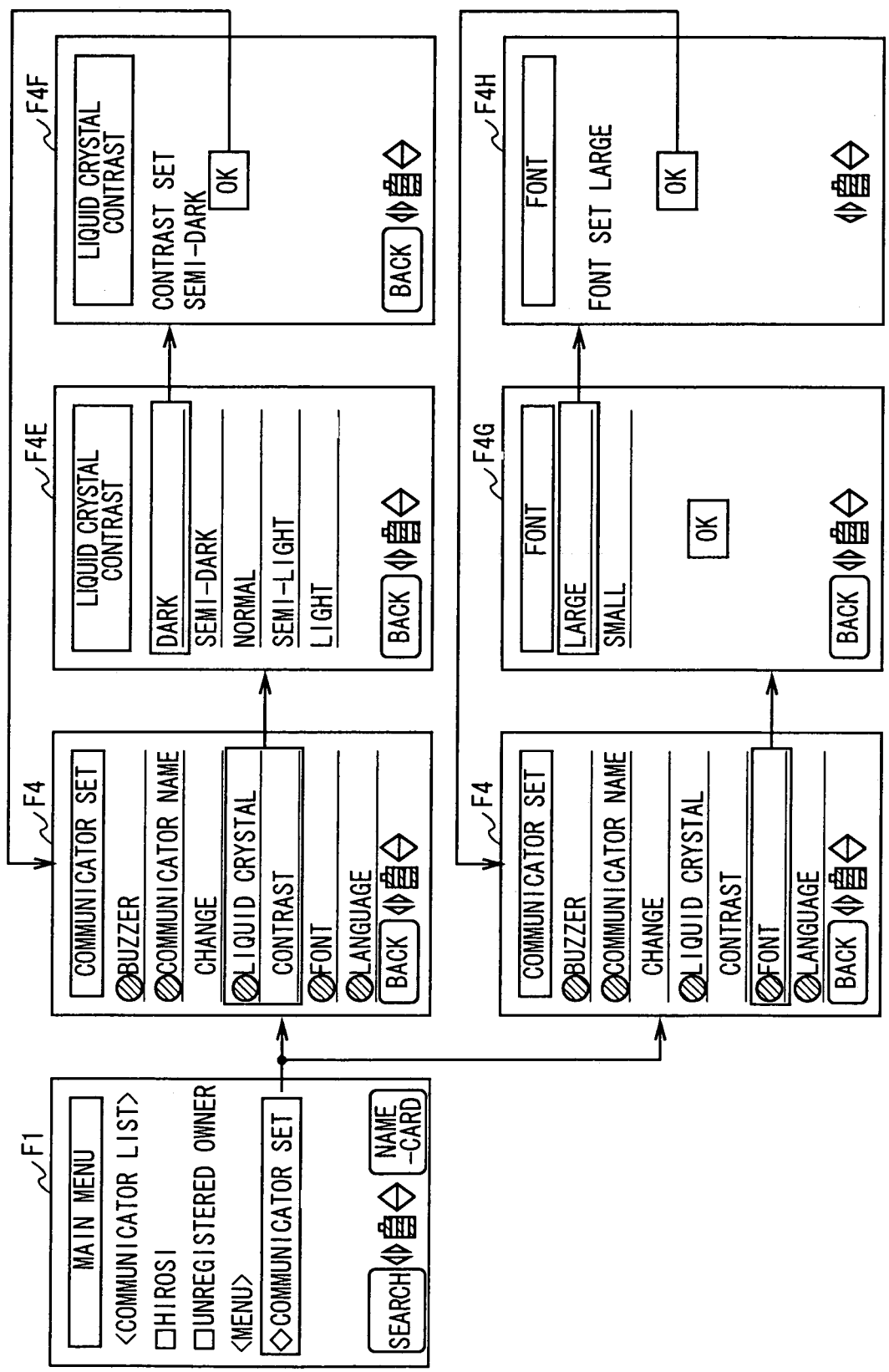
FIG. 21 is a plane diagram applying the explanation of the transition state to the communicator set display.

Furthermore, when "Liquid Crystal Contrast" among the menu items of the communicator set display F4 is selected, as shown in FIG. 21, the display is transited from the communicator set display F4 to a liquid crystal contrast adjust display F4E.

In the liquid crystal contrast adjust display F4E, as shown in FIG. 19(B), "Liquid Crystal Contrast" is displayed as a title bar, and four levels "Dark", "Semi-Dark", "Normal", and "Semi-Light" are listed and displayed as a set level in the middle. The display contents at the bottom of the liquid crystal contrast adjust display F4E are the same as those of the communicator set display F4.

In the liquid crystal contrast adjust display F4E, for example "Semi-Dark" is selected, a message "Contrast set semi-dark" is displayed in addition to the list items in the middle as well as under the message the mark showing "OK", to which the decision key is assigned, is displayed, while the mark showing "Back" in the lower part is deleted (a liquid crystal contrast adjust display F4F). At the same time, the contrast is set to the set level corresponding to "Semi-Dark" in the display part 51 of the communicator 50.

As described above, in the liquid crystal contrast adjust display F4E, when the decision key 52A corresponding to "OK" is operated and pressed after the adjustment of the liquid crystal contrast to the desired set level by the user's selection, the display is transited from the liquid crystal contrast adjust display F4E to the former communicator set display F4.

Furthermore, when "Font" is selected among the menu items of the communicator set display F4, the display is transited from the communicator set display F4 to a font set display F4G.

In the font set display F4G, "Font" is displayed as a title bar, and two options representing the font size, "Large" and "Small", are displayed in the middle. The display contents at the bottom of the font set display F4G are the same that of the communicator set display F4.

In the font set display F4G, for example "Large" is selected, a message "Font set Large" is displayed as well as under the message the mark showing "OK", to which the decision key 52A is assigned, is displayed, while the mark showing "Back" in the lower part is deleted (a font set display F4H). At the same time, the font set is changed to the display size corresponding to "Large" in the display part 51 of the communicator 50.

As described above, in the font set display F4F, the decision key corresponding to "OK" is operated and pressed after the set of the font to the desired display size by user's selection, the display is transited from the font set display to the former communicator set display.

Figure 22:
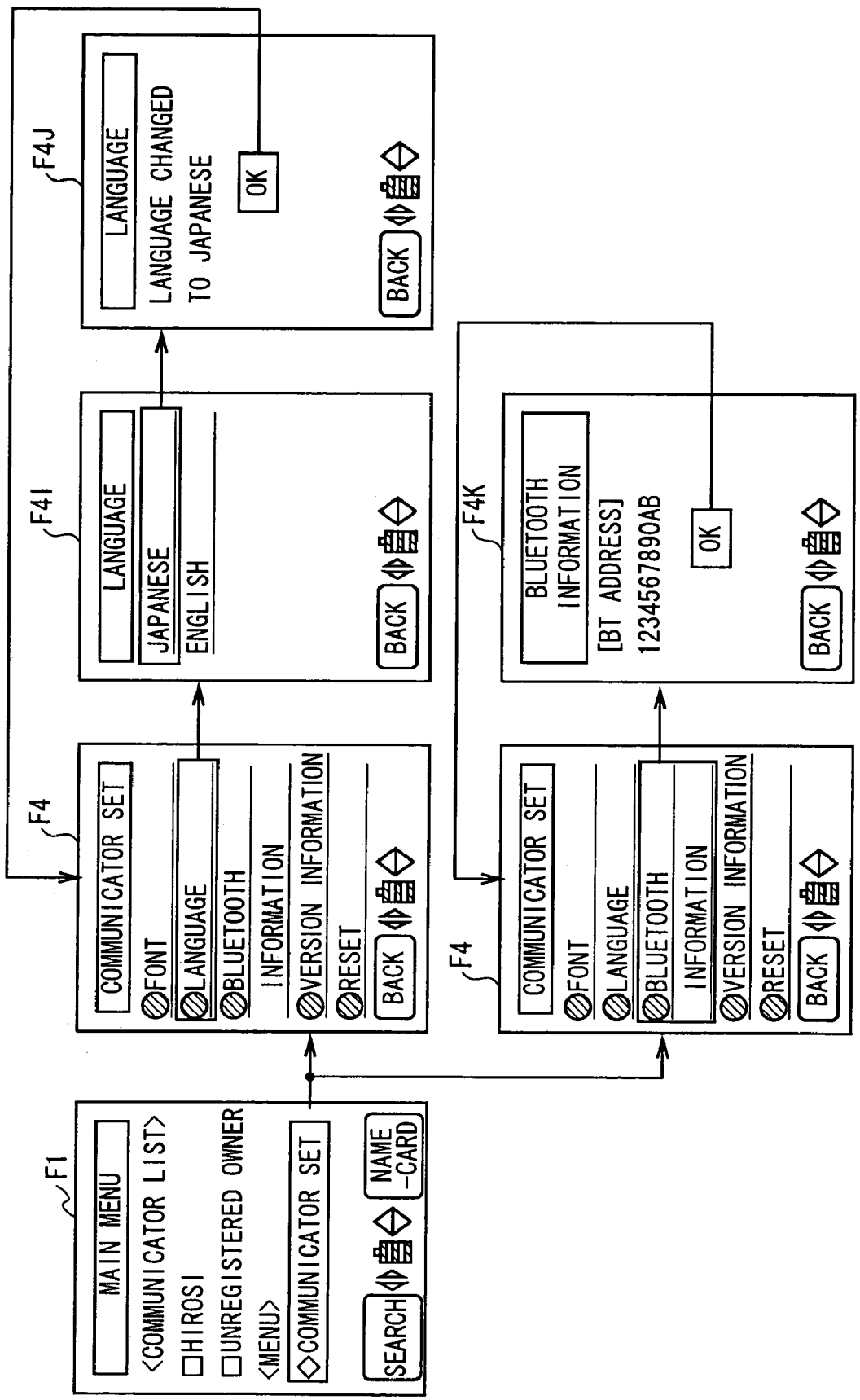
FIG. 22 is a plane diagram applying the explanation of the transition state to the communicator set display.

Furthermore, when "Language" is selected among the menu items of the communicator set display F4, as shown in FIG. 22, the display is transited from the communicator set display F4 to a language change display F4I.

In the language change display F4I, "Language" is displayed as a title bar, and two options representing the kind of the language, "Japanese" and "English" are displayed in the middle. The display contents at the bottom of the language change display F4I are the same as those of the communicator set display F4.

In the language change display F4I, for example when "Japanese" is selected, a message "Language changed to Japanese" is displayed as well as a mark showing "OK" to which the decision key 52A is assigned is displayed under the message, while the mark showing "Back" in the lower part is deleted (a language change display F4J). At the same time, the set is change to the display contents corresponding to "Japanese" in the display part 51 of the communicator 50.

As described above, in the language change display F4J, when the decision key 52A corresponding to "OK" is operated and pressed after the display contents are changed to the desired language by user's selection, the display is transited from the language change display F4J to the former communicator set display.

Still further, when "Bluetooth information" is selected among the menu items in the communicator set display F4, the display is transited from the communicator set display F4 to a Bluetooth information display F4K.

In the Bluetooth information display F4K, "Bluetooth" is displayed as a title bar, the address number of the Bluetooth showing "BT Address" such as "1234567890AB" is displayed in the middle, and under that number a mark showing "OK" to which the decision key 52A is assigned is displayed. The display contents at the bottom of the Bluetooth information display F4K are the same that of the communicator set display F4.

As described above, in the Bluetooth information display F4K, when the decision key corresponding to "OK" is operated and pressed after the display of the Bluetooth information by user's operation, the display is transited from the Bluetooth information display F4K to the former communicator set display F4.

Figure 23:
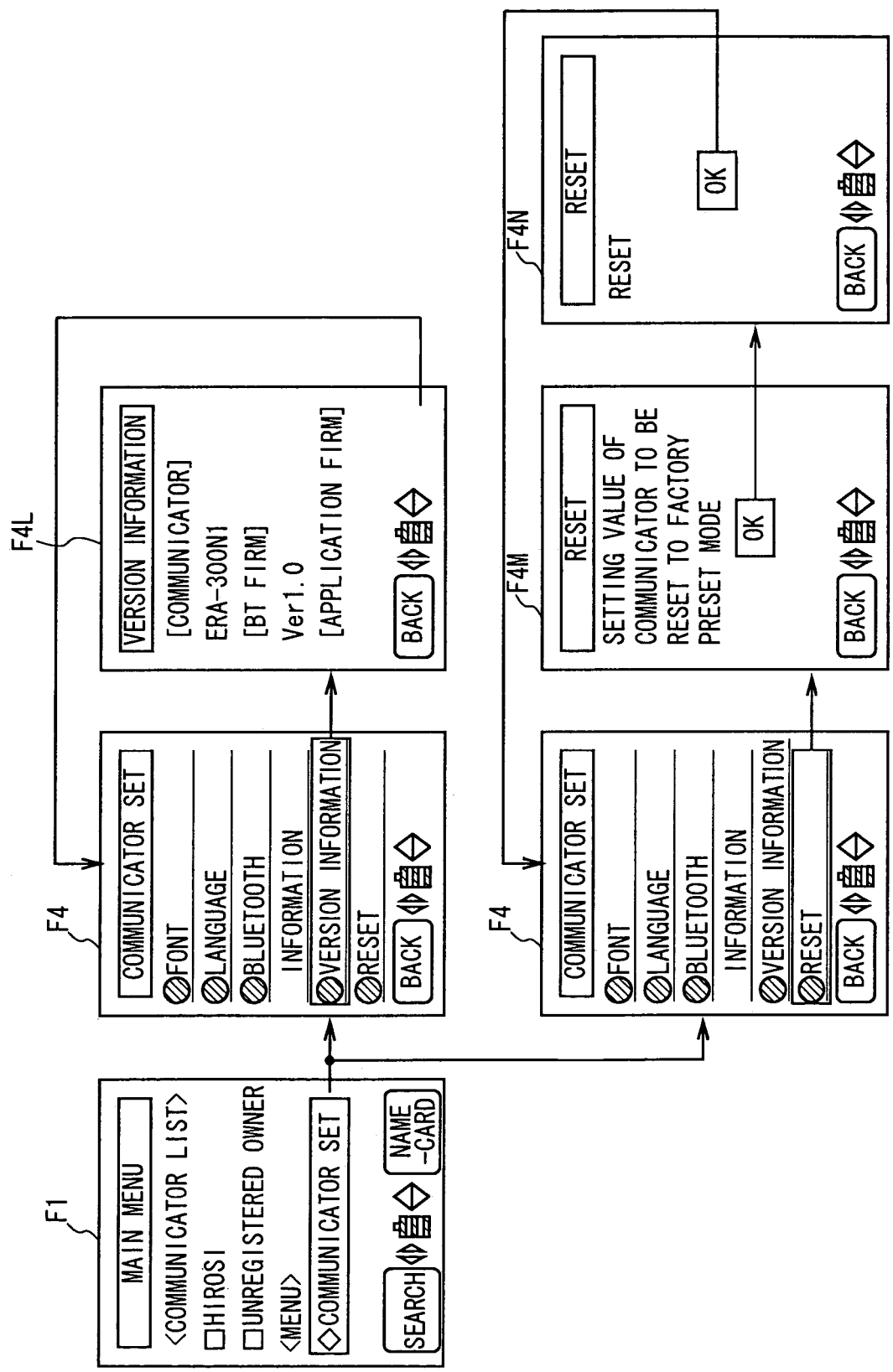
FIG. 23 is a plane diagram applying the explanation of the transition state to the communicator set display.

Furthermore, when "Version Information" is selected among the menu items in the communicator set display F4, as shown in FIG. 23, the display is transited from the communicator set display F4 to a version information display F4L.

Figure 19:
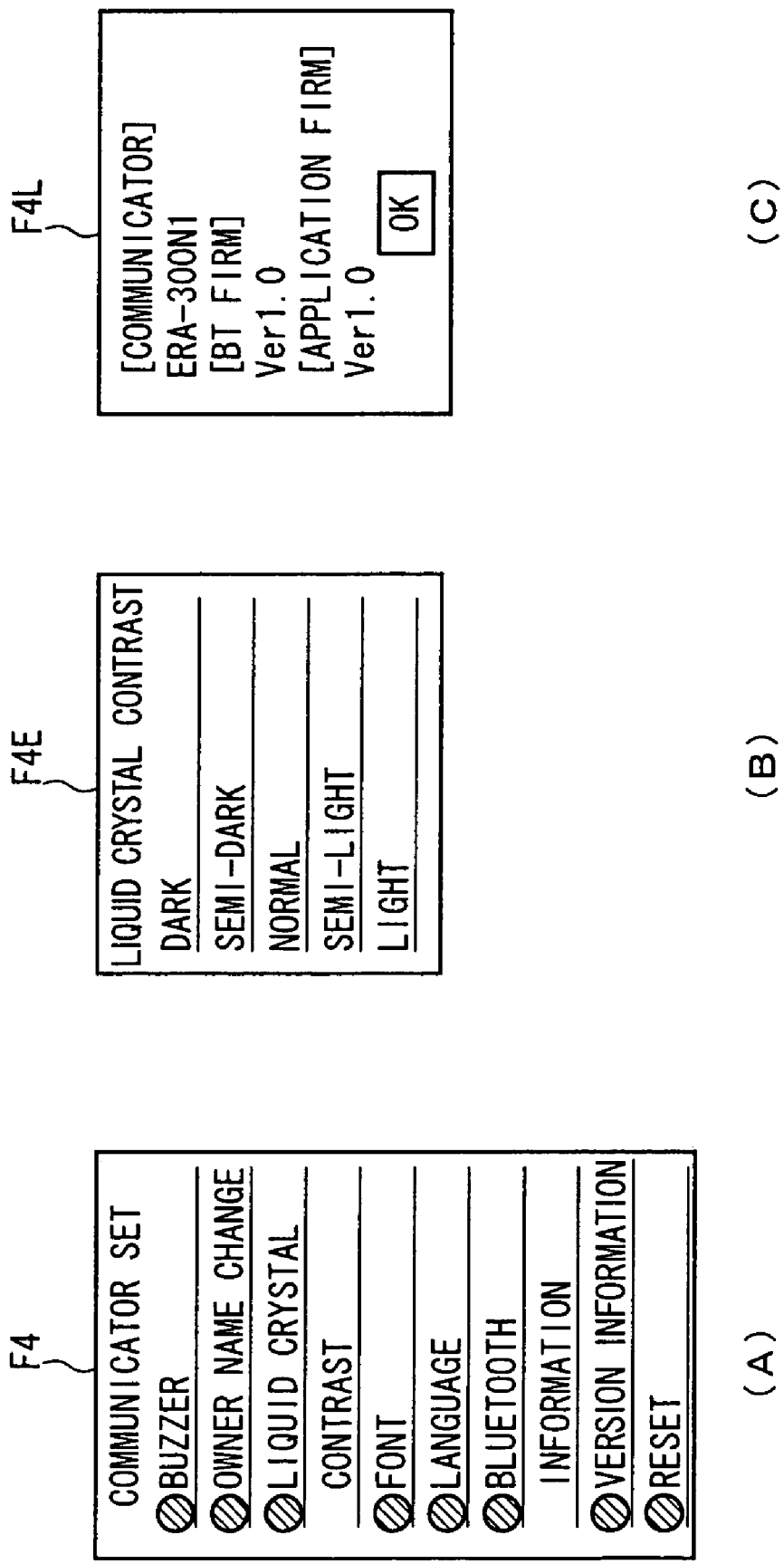
FIG. 19 is a schematic plane diagram showing the scrollable range of each display.

In the version information display F4L, as shown in FIG. 19 (C), "Version Information" is display as a title bar, and a model number (for example ERA-300N1) representing "Communicator", version number (for example Ver 1.0) representing "BT Firm", and version number (for example Ver. 1.0) representing "Application Firm" are displayed in the middle while a mark showing "OK" to which the decision key 52A is assigned is the displayed under those numbers. The display contents at the bottom of the version information display F4L are the same as those of the communicator set display F4.

As described above, in the version information display F4L, when the decision key 52A corresponding to "OK" is operated and pressed after the display of various version information by user's operation, the display is transited from the version information display F4L to the former communicator set display F4.

Still further, when "Reset" is selected among the menu items of the communicator set display F4, the display is transited from the communicator set display F4 to a reset display F4M.

In the reset display F4M, "Reset" is displayed as a title bar, and a message "setting value of communicator 50 to be reset to factory preset mode" is displayed in the middle while a mark showing "OK" to which a decision key is assigned is displayed under the message. The display contents at the bottom of the reset display are the same as those of the communicator set display.

In the reset display F4M, when the decision key 52A is operated and pressed, a message "Reset" is displayed in the place of the message in the middle, and the mark showing "Back" in the lower part is deleted (a reset display F4N). At the same time, various settings of the CPU 58 of the communicator 50 are reset to the factory present mode.

Following above, in the reset display F4N, when the decision key 52A corresponding to "OK" is operated and pressed by user's operation, the display is transited from the reset display F4L to the communicator set display F4.

(8) Robot Menu Display (8-1) Communicator Registration or Deletion

When a desired robot name in "Robot List" among the menu items is selected, and the communicating state between the selected robot becomes on-line state with the main menu display displayed on the display part 51, the communicator 50 transits the display to the connection idling display F5 and judges whether the communicator 50 installed in the robot 1 corresponding to the robot name is registered.

Figure 24:
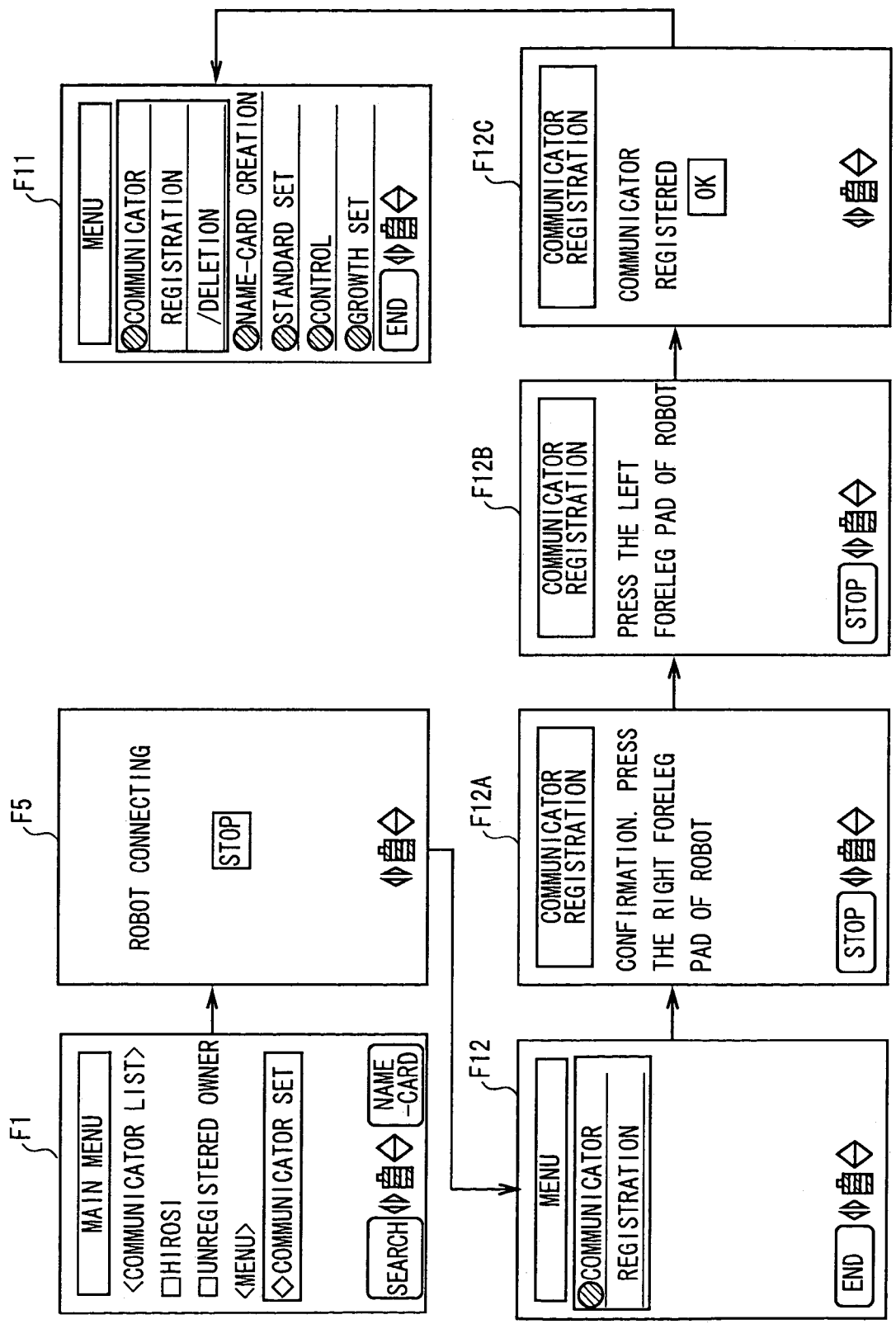
FIG. 24 is a plane diagram applying the explanation of the display transition state at the communicator registration.

As a result, as shown in FIG. 24, when the communicator 50 is not registered in the robot 1, the communicator 50 transits the display to a communicator registration display F12 via the connection idling display F5. In the communicator registration display F12, "Menu" is displayed as a title bar and only "Communicator Registration" is listed and displayed as a menu item.

At the left bottom of the communication registration display F12, a mark showing "End" is displayed in the place of the mark showing "Search", the mark showing "Name-Card" at the right is deleted, and the reserved key 52C corresponding to the mark showing "End" is assigned a function for transiting the display from the robot menu display F11 to the former main menu display F1, which are different from the main menu display F1.

In the communicator registration display F12, when "Communicator Registration" is selected, a message "Confirmation Press the right foreleg pad of Robot 1" is displayed in the place of the menu item, and a mark showing "Cancel" whose function assigned to the corresponding reserved key 52C is the same as displayed in the place of the mark showing "End" at the left bottom (a communicator registration display F12A).

Then the communicator 50, when a valid detection result of the touch sensor 14 corresponding to the pad of the right foreleg pad of the robot 1 is obtained by the user with the communicator registration display F12A displayed, transits the display to a display F12B whose display contents in the middle of the communicator registration display are replaced with a message "Press the left foreleg pad of Robot 1".

When a valid detection result of the touch sensor 14 corresponding to the pad of the left foreleg of the robot 1 is obtained by the user with the communicator registration display F12B displayed, the displayed is transited to a display F12C whose display contents in the middle of the communicator registration display F12B are replaced with a mark showing "OK" to which a message "Communicator Registered" and a decision key are assigned is displayed.

As described above, the user can register the self communicator 50 to the robot 1 by executing the operation based on the instruction provided from the robot 1 under communicating state using the self communicator 50.

Accordingly, in the communicator registration display F12C, when the decision key 52A corresponding to "OK" is operated and pressed after the registration of the self communicator 50 to the robot 1 under communicating state, the display is transited from the communicator registration display F12C to the after-mentioned robot menu display F11.

Figure 25:
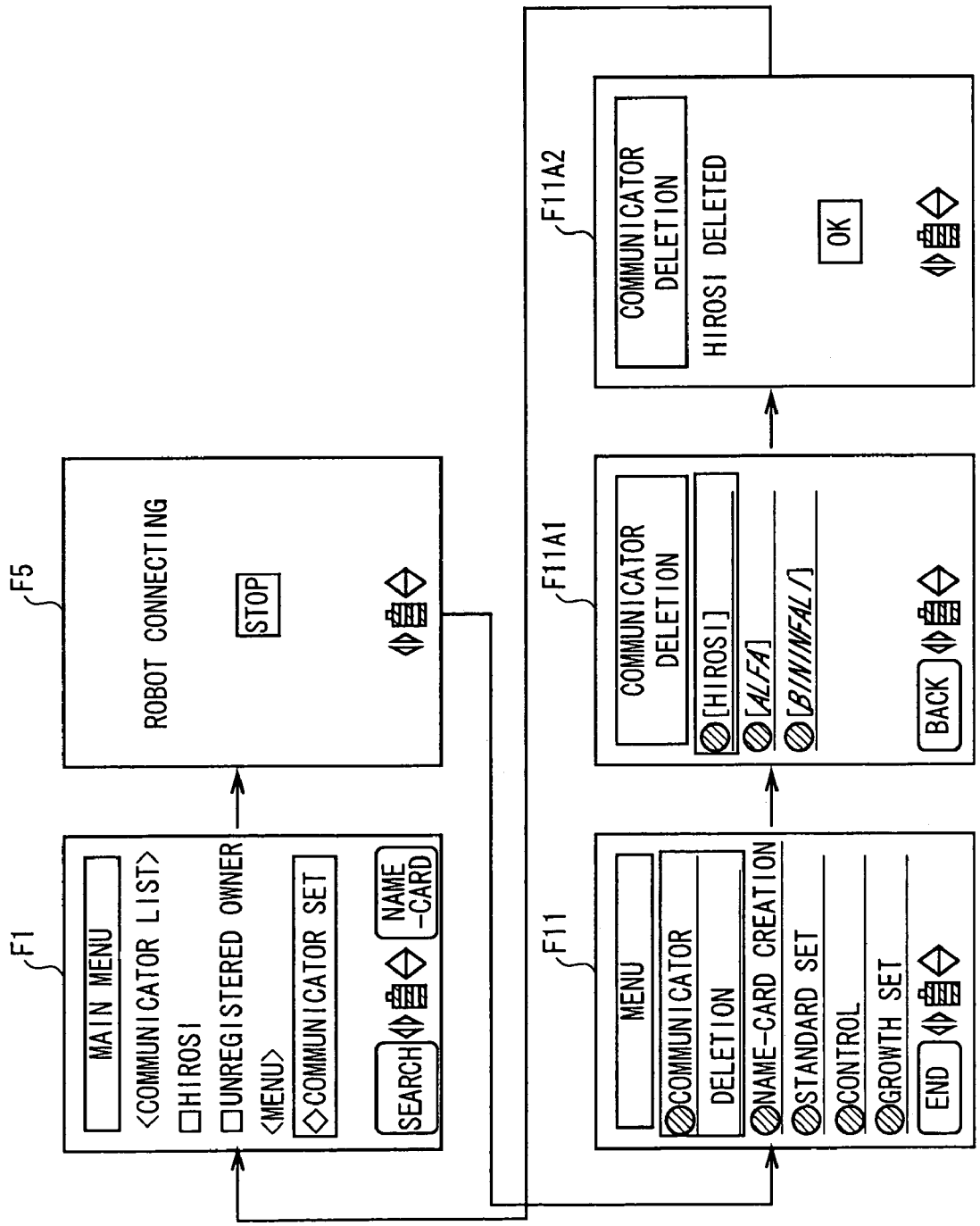
FIG. 25 is a plane diagram applying the explanation of the display transition state at the communicator deletion.

On the other hand, when the communicator 50 is already registered in the robot 1 under communicating state, the communicator 50, as shown in FIG. 25, transits the display to the robot menu display F11 via the connection idling display F5.

In the robot menu display F11, "Menu" is displayed as a title bar, and "Communicator Deletion", "Name-Card Creation", "Standard Set", "Control", "Mode Selection", and "Growth Set" are sequentially listed and displayed as menu items.

At the left bottom of the robot menu display F11, a mark showing "End" is displayed in the place of the mark showing "Search", the mark "Name-Card" on the right is deleted, and a function for transiting the display from the robot menu display F11 to the former main menu display F1 is assigned to the reserved key 52 corresponding to the mark showing "End", which are different from the main menu display F1.

In the robot menu display F11, when "Communicator Deletion" is selected among the menu items, the display is transited from the robot menu display F11 to a communicator deletion display F11A1.

In the communicator deletion display F11A1, "Communicator Deletion" is displayed as a title bar, and the names of all the communicator 50 presently registered in the robot 1 under the communicating state are displayed in the middle, such as "HIROSI", "ALFA", and "PININFALI".

Furthermore, when the communicator 50 for example showing "HIROSI" is selected among the list items in the communicator deletion display F11A1, the display is transited to a display F11A2 where the display contents in the middle of the communicator deletion display F11A1 are replaced with a message "HIROSI Deleted" and a mark showing "OK" to which the decision key is assigned.

As described above, the user can deleted the registration of the desired communicator 50 among the communicators 50 presently registered in the robot 1 under communicating state by using the self communicator 50 if necessary.

Accordingly, when the decision key 52A corresponding to "OK" is operated and pressed after the deletion of the registration of the selected communicator 50 among the communicators 50 presently registered in the robot 1 under communicating state, the display is transited from the communicator deletion display F11A2 to the former robot menu display F11.

(8-2) Name-Card Creation

Figure 26:
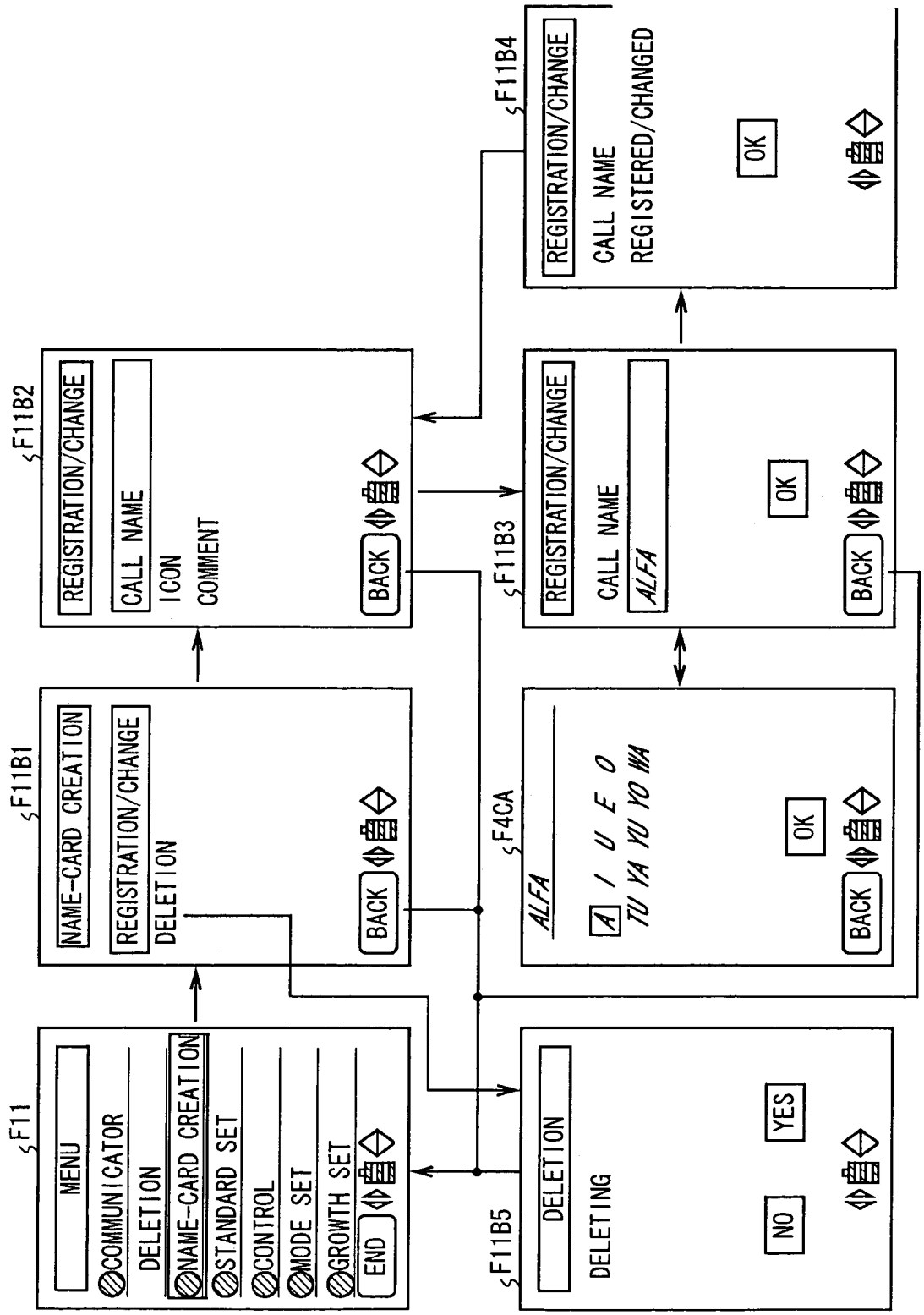
FIG. 26 is a plane diagram applying the explanation of the display transition state at the name-card creation.

Further, when "Name-Card Creation" is selected among the menu items with the robot menu display F11 displayed on the display part 51 under the communicating state with the registered robot 1, the communicator 50, as shown in FIG. 26, transits the display from the robot menu display F11 to a name-card creation display F11B1.

In this name-card creation display F11B1, "Name-Card Creation" is displayed as a title bar, two options, "Registration/Change" and "Deletion" are displayed in the middle, and a mark showing "Back" is displayed whose function is the same as the function assigned to the corresponding reserved key 52C in the place of the mark showing "End" at the left bottom.

In the name-card creation display F11B1, with the selection of "Registration/Change", the display is transited to a registration/change display F11B2. In the registration/change display F11B2, "Registration/Change" is displayed as a title bar, and "Call Name", "Icon", and "Comment" are listed and displayed in the middle. The display contents at the bottom of this registration/change display F11B2 are the same as those of the name-card creation display F11B1.

The contents of each of the menu items of the registration/change display F11B2 will be explained in order. At first, when "Call Name" representing the name of the robot is selected among the menu items of the registration/change display F11B2, an input field to which "Call Name" is input as character and a mark showing "OK" to which the decision key 52A is assigned are displayed in the place of the list items in the middle (a registration/change display F11B3). When the cursor is put on the head of this input field, the display is transited to the above-mentioned character-input display F4CA (FIG. 20).

Then in the character-input display F4CA, when the decision key 52A is operated and pressed with the former registration/change display F11B3 displayed after the call name representing the robot name such as "ALFA" is decided, a message "Call name registered/changed" is displayed in the place of the input field in the middle as well as the mark showing "Back" in the lower part is deleted (a registration/change display F11B4).

As described above, in the registration/change display F11B4, when the decision key 52A corresponding to "OK" is operated and pressed after the registration of the call name as a robot name by user's selection, the display is transited to the registration/change display F11B2 which was displayed at first.

On the other hand, in the above-mentioned name-card creation display F11B1, when "Deletion" is selected, the display is transited to a deletion display F11B5. In this deletion display F11B5, "Deletion" is displayed as a title bar, a message "Deleting" is displayed in the middle, and marks showing "No" and "Yes" to which the cursor key 52B and the decision key 52A are assigned respectively are displayed under the message, as well as the mark showing "Back" in the lower part is deleted.

Then in the deletion display F11B5, when the decision key 52A is operated and pressed with the cursor key 52B being tilted to the left, the display is transited to the former robot menu display F11 without deleting the call name, icon, and comment. On the other hand, when the decision key 52A is operated and pressed with the cursor key 52B being tilted to the right, the display is transited to the former robot menu display F11 with deleting the call name, icon, and comment.

When the reserved key 52C corresponding to "Back" is operated and pressed in the above-mentioned name-card creation display F11B1 and the registration/change display F11B2, the display is transited to the former robot menu display F11.

Figure 27:
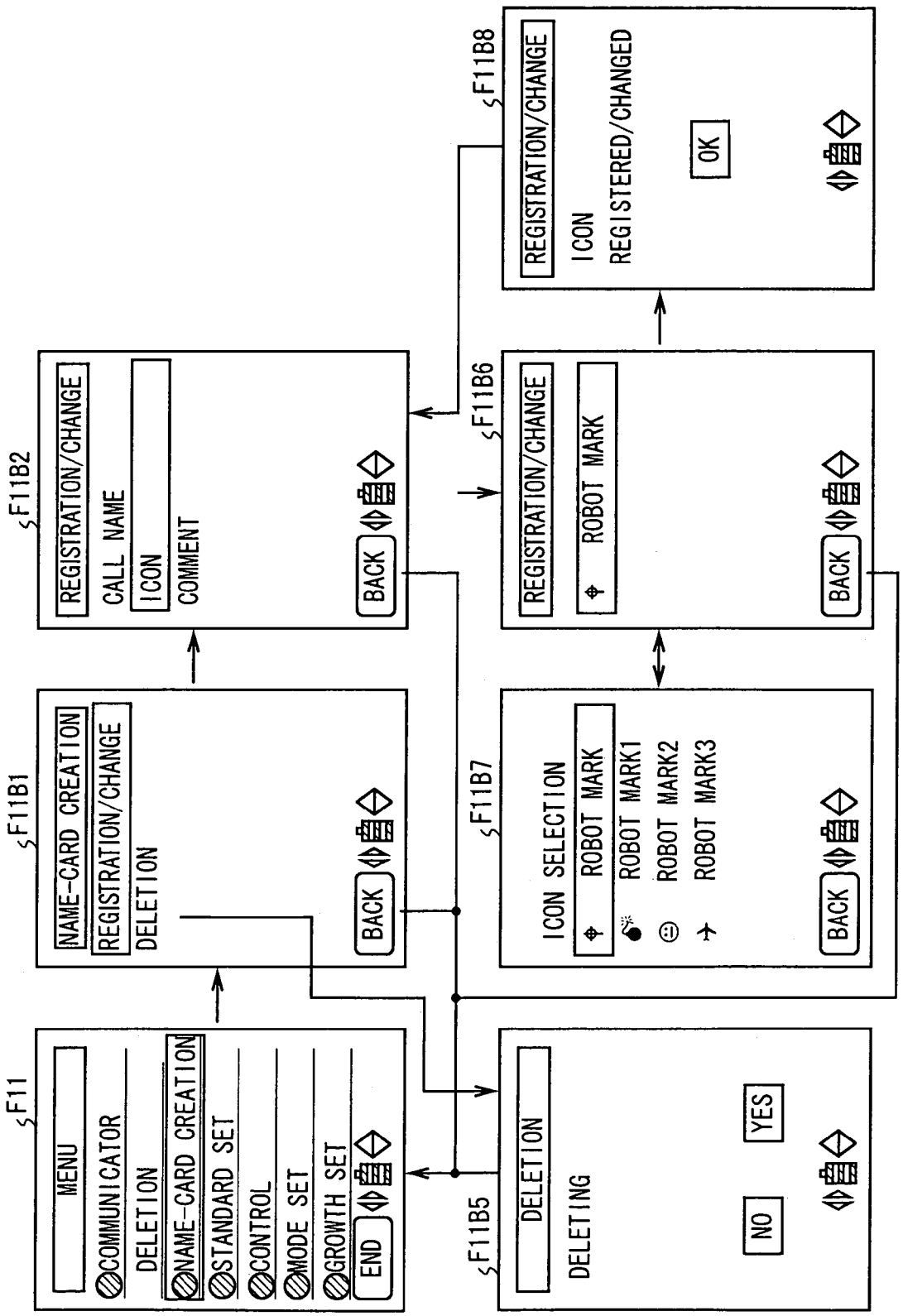
FIG. 27 is a plane diagram applying the explanation of the display transition state at the name-card creation.

Following above, as shown in FIG. 27, in the registration/change display F11B2 displayed at first, when "Icon" is selected, a selection field for selecting "Icon" and a mark showing "OK" to which the decision key 52A is assigned are displayed in the place of the list items in the middle. When the cursor in put on the head of this selection field, the display is transited to an icon. selection display F11B7 (a registration/change display F11B6).

In this icon selection display F11B7, "Icon Selection" is displayed as a title bar, and a variety kinds of selectable pictographic characters are listed and displayed with the name thereof (for example, the robot 1 mark 1–4) in the middle.

Then in the icon selection display F11B7, when the decision key 52A is operated and pressed with the former registration/change display F11B6 displayed after the selection of the desired pictographic character and its name as an icon, a message "Icon registered/changed" is displayed in the place of the selection field in the middle while the mark showing "Back" in the lower part is deleted (a registration/change display F11B8).

As described above, in the registration/change display F11B8, when the decision key 52A corresponding to "OK" is operated and pressed after the registration or change of the icon as an pictographic character and its name unique to the robot 1 by user's selection, the display is transited to the registration change display F11B2 displayed at first.

Figure 28:
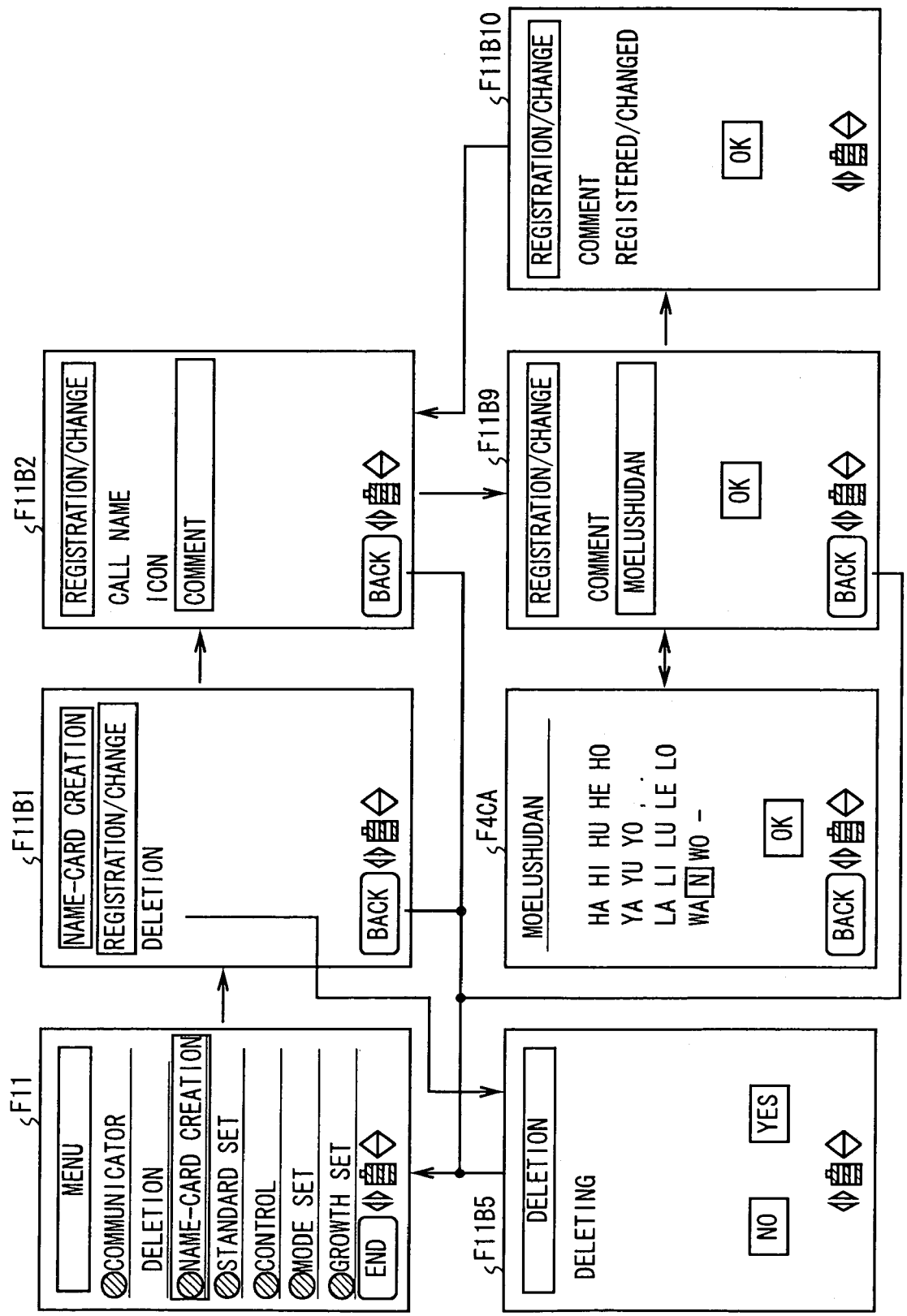
FIG. 28 is a plane diagram applying the explanation of the display transition state at the name-card creation.

Furthermore, as shown in FIG. 28, when "Comment" is selected in the registration/change display F11B2 displayed at first, an input field for inputting "Comment" with character and a mark showing "OK" to which the decision key 52A is assigned (a registration/change display F11B9) are displayed in the place of the list items in the middle. When the cursor is put on the head of this input field, the display is transited to the above-mentioned character-input display F4CA. At this time, in the character-input display, the input mode is set as a mode showing "HIRAGANA".

Then in the character-input display F4CA, when the decision key 52A is operated and pressed with the registration/change display F11B9 displayed after the decision of the comment such as "MoELuShuDaN",a message "Comment Registered/Changed" is displayed in the place of the input field in the middle as well as the mark showing "Back" in the lower part is deleted (a registration/change display F11B10).

As described above, in the registration/change display F11B10, when the decision key 52A corresponding to "OK" is operated and pressed after the registration or change of the comment by user's selection, the display is transited to the registration/change display F11B2 displayed at first.

(8-3) Standard Set

Figure 29:
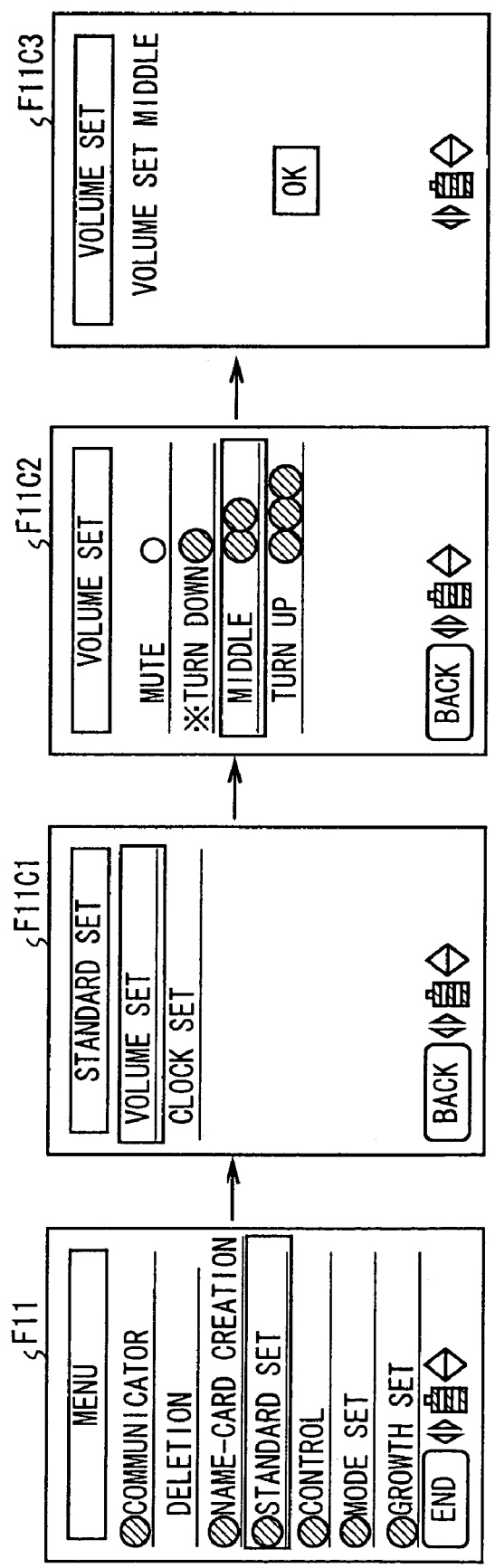
FIG. 29 is a plane diagram applying the explanation of the display transition state at the standard set.

Furthermore, when "Standard Set" is selected among the menu items with the robot menu display F11 displayed on the display part 51, as shown in FIG. 29, under the communicating state with the registered robot 1, the communicator 50 transits the display from the robot menu display to a standard set display F11C1.

In this standard set display F1C, "Standard Set" is displayed as a title bar, "Volume Set" and "Clock Set" are listed and displayed in the middle, and a mark showing "Back" whose function is the same as the function assigned to the corresponding reserved key 52C is displayed at the left bottom in the place of the mark showing "End".

In this standard set display F11C1, when "Volume Set" is selected, the display is transited to a volume set display F11C2. In this volume set display F11C2, "Volume Set" is displayed as a title bar, and four steps of set level , "Mute", "Turn down", "Middle", and "Turn up" are listed and displayed. The display contents at the bottom of this volume set display F11C2 are the same as those of the standard set display F11C1.

In this volume set display F11C2, for example with the selection of "Middle", a message "Volume set middle" is displayed in the place of the list items in the middle as well as a mark showing "OK", to which the decision key 52A is assigned, is displayed, while the mark showing "Back" in the lower part is deleted (a volume set display F11C3). At the same time, in the robot 1, the sound volume is set to the set level corresponding to "Middle", at which the robot 1 makes pronunciation.

As described above, in the volume set display F11C3, when the decision key 52A corresponding to "OK" is operated and pressed after the pronounced sound volume is set to the desired level by user's selection, the display is transited from the volume set display F11C3 to the former standard set display F11C1.

Figure 30:
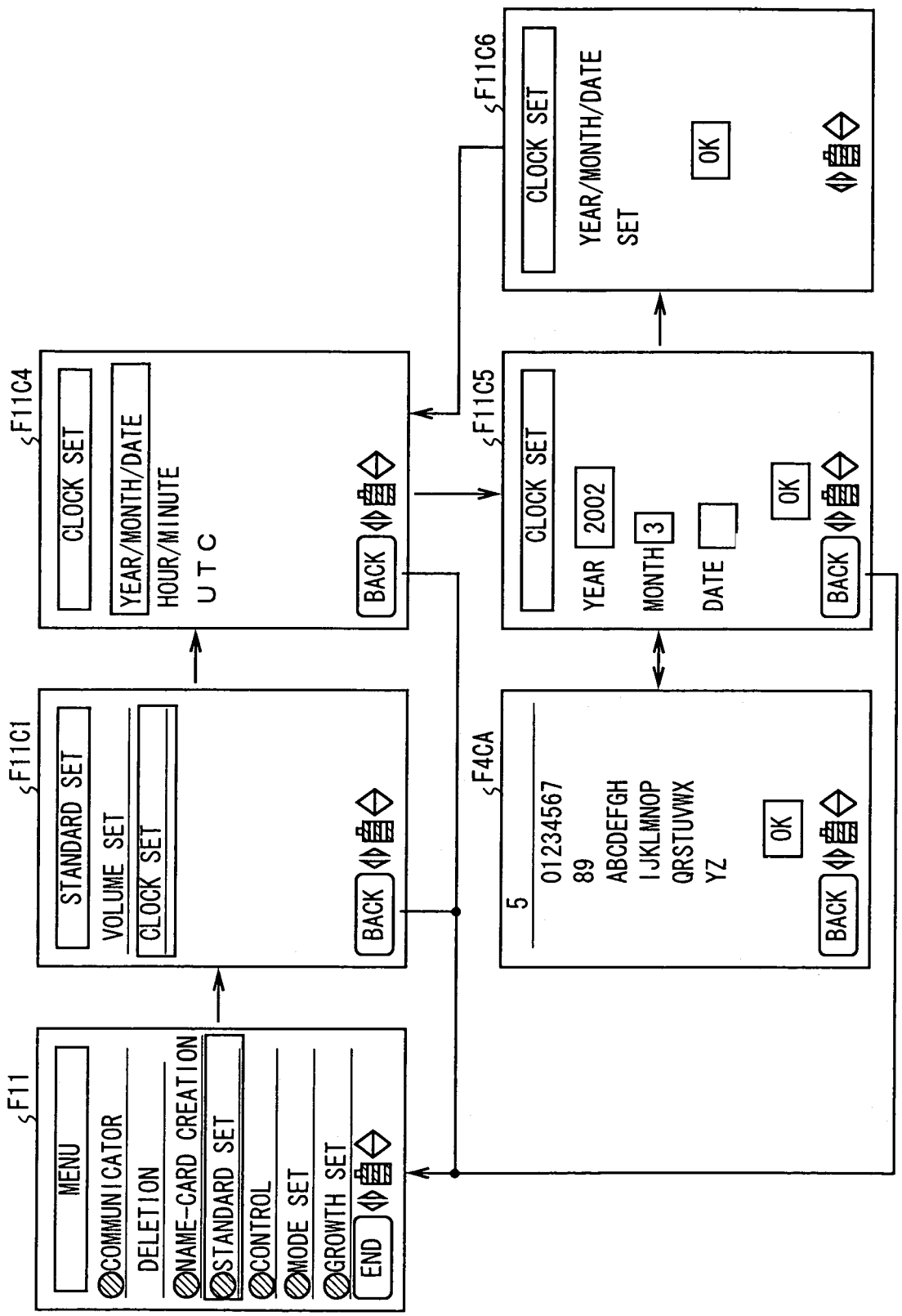
FIG. 30 is a plane diagram applying the explanation of the display transition state at the standard set.

On the other hand, as shown in FIG. 30, when "Clock Set" is selected in the standard set display F11C1, the display is transited to a clock set display F11C4. In this clock set display F11C4, "Clock Set" is displayed as a title bar, and three types of clock set contents, "Year/Month/Day", "Hour Minuets", and "Universal Time Count (UTC)" are listed and displayed. The display contents at the bottom of this clock set display F11C4 are the same as those of the standard set display F11C1.

In this clock set display F11C4, when for example "Year/Month/Day" is selected, an input field for inputting three types of clock contents, year, month and day, and a mark showing "OK" to which the decision key 52A is assigned are displayed in the place of the list items in the middle (a clock set display F11C5). When the cursor is put on the head of each of these input fields, the display is transited to the above-mentioned character-input display F4CA. At this time, the input mode is set to the mode representing "Alphanumeric Symbol" in the character-input display F4CA.

Then in the character-input display F4CA, when the decision key 52A is operated and pressed with the former clock set display F11C5 displayed after the input of the current date regarding year, month and day, a message "Year/Month/Day set" is displayed in the place of the three types of input fields in the middle while the mark showing "Back" in the lower part is deleted (a clock set display F11C6)

As described above, in the clock set display F11C6, when the decision key 52A corresponding to "OK" is operated and pressed after the year, month and day for the date are set by user's selection, the display is transited to the clock set display F11C4 displayed at first.

Figure 31:
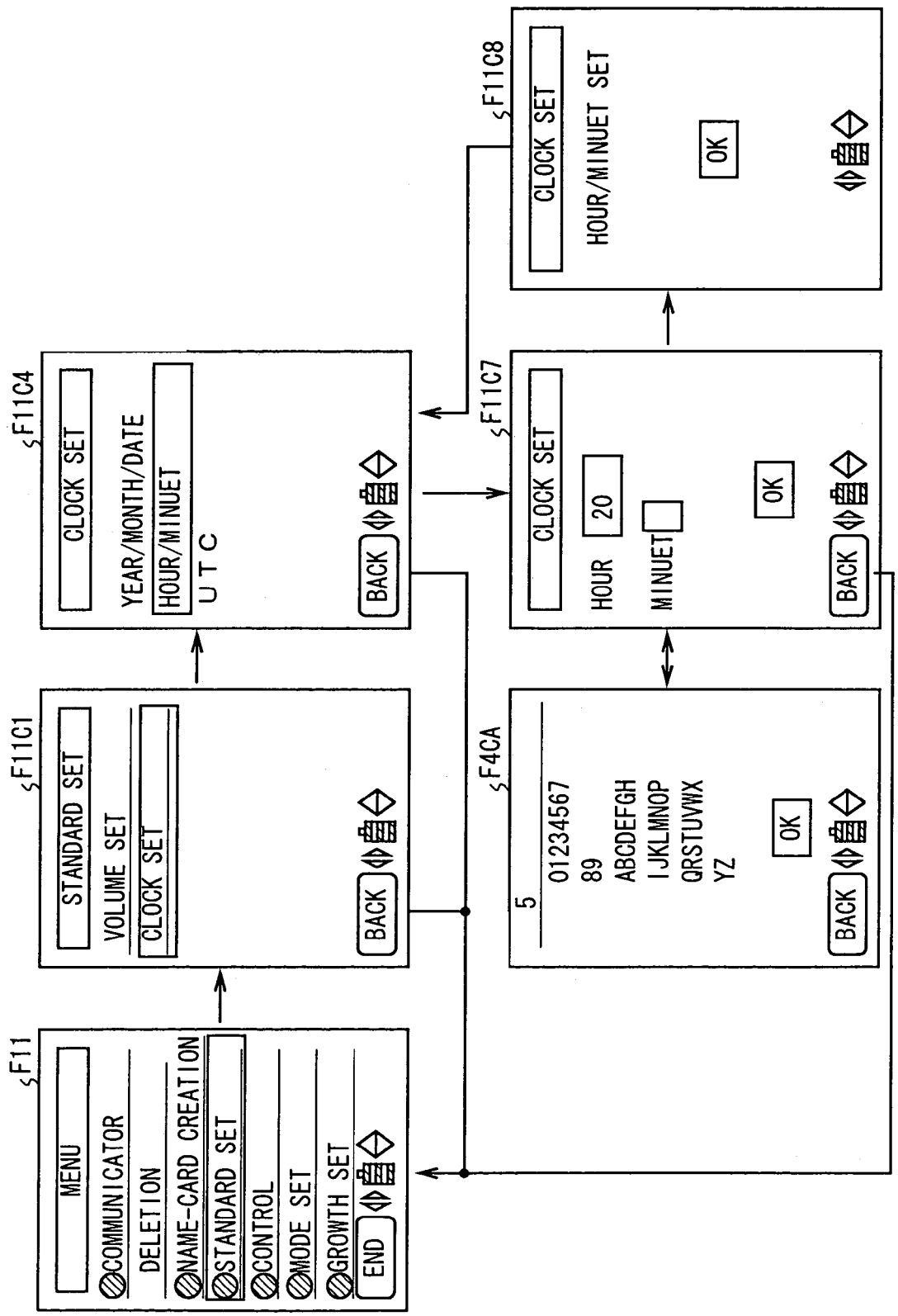
FIG. 31 is a plane diagram applying the explanation of the display transition state at the standard set.

Following above, as shown in FIG. 31, when "Hour/Minuet" is selected in the clock set display F11C4 displayed at first, an input field for inputting two types of clock set contents, hour and minuet, and a mark showing "OK" to which the decision key 52A is assigned are displayed in the place of the list items in the middle (a clock set display F11C7). When the cursor is put on the head of each of these input fields, the display is transited to the above-mentioned character-input display F4CA. At this time, the input mode is set to the mode representing "Alphanumeric Symbol" in the character-input display F4CA.

Then in the character-input display F4CA, when the decision key 52A is operated and pressed with the former clock set display F11C7 displayed after the input of the hour and minuet of the current time, a message "Hour/Minuet set" in the place of the three types of input field in the middle, while the mark showing "Back" in the lower part is deleted (a clock set display F11C8).

As described above, in the clock set display F11C8, when the decision key 52A corresponding to "OK" is operated and pressed after the set of year, hour, and minuet by user's selection, the display is transited to the clock set display F11C4 displayed at first.

Figure 32:
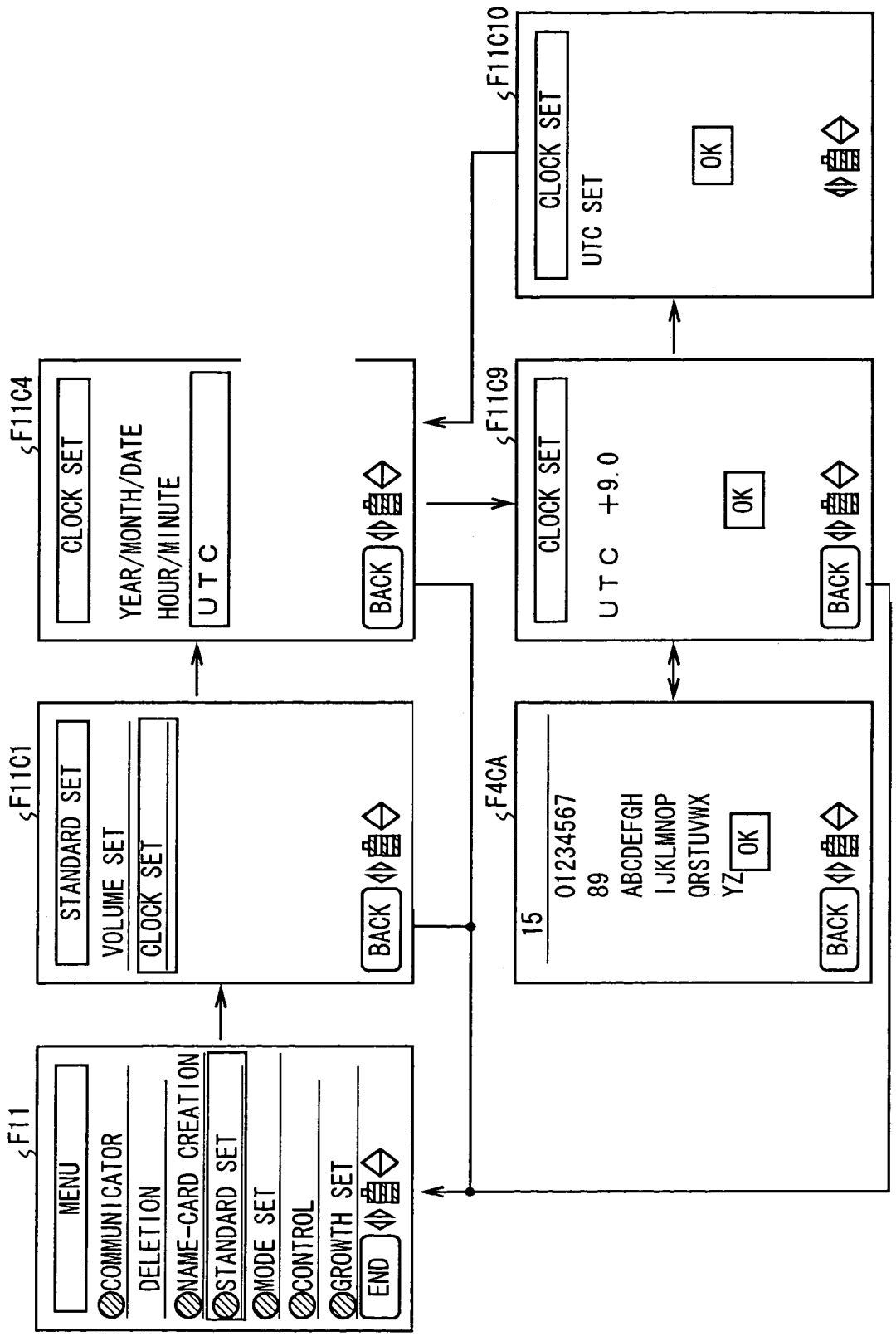
FIG. 32 is a plane diagram applying the explanation of the display transition state at the standard set.

Furthermore, as shown in FIG. 32, when "UTC" is selected in the clock set display F11C4 displayed at first, an input field for inputting the time difference between the UTC, i.e. universal time (Greenwich mean time), and a mark showing "OK" to which the decision key 52A is assigned (a clock set display F119) are displayed in the place of the list items in the middle. When the cursor is put on the head of this input field, the display is transited to the above-mentioned character-input display F4CA. At this time, the input mode is set to the mode representing "Alphanumeric Symbol" in the character-input display F4CA.

Then in the character-input display F4CA, when the decision key 52A is operated and pressed with the former clock set display F11C9 displayed after the input of the time difference between the universal time (for example +9 for Japan), a message "UTC set" is displayed in the place of the UTC input field in the middle, while the mark showing "Back" in the lower part is deleted (a clock set display F11C10).

As described above, in the clock set display F11C10, when the decision key 52A corresponding to "OK" is operated and pressed after the set of the time difference between the universal time, the display is transited to the close set display F11C4 displayed at first.

(8-4) Robot Control

Furthermore, when "Control" is selected among the menu items with the robot menu display F11 displayed on the display part 51 under the communicating state with the registered robot 1, the communicator 50 transits the display from the robot menu display F11 to a control display F11D1.

Figure 33:
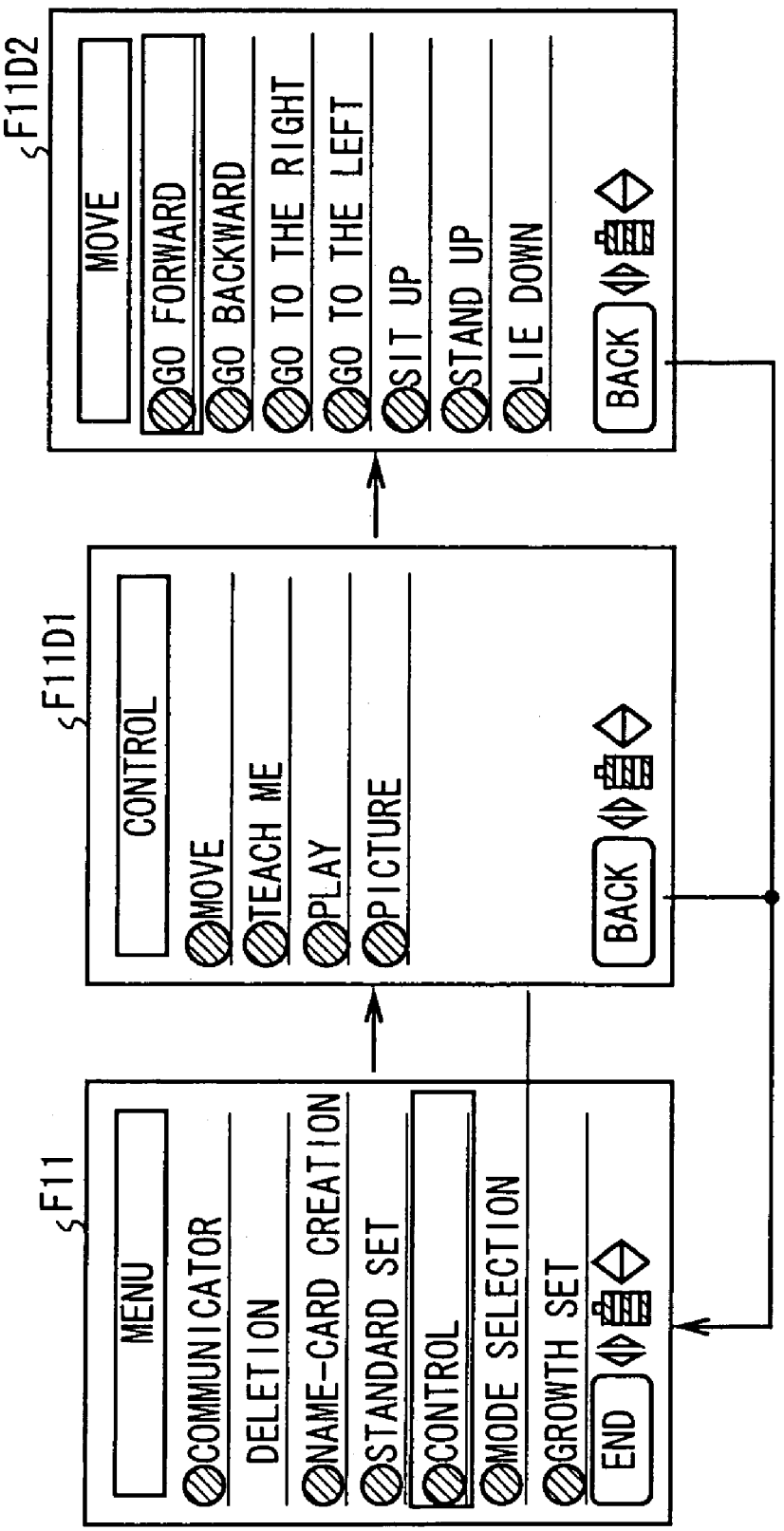
FIG. 33 is a plane diagram applying the explanation of the display transition state at the robot control.

In this control display F11D1, as shown in FIG. 33, "Control" is displayed as a title bar, four kinds of control contents "Move", "Teach me", "Play", and "Picture" are displayed in the middle, and a mark showing "Back" whose function is the same as the function assigned to the reserved key 52C in the place of the mark showing "End" at the left bottom.

In this control display F11D1, when "Move" is selected, the display is transited to a motion selection display F11D2. In this motion selection display F11D2, "Move" is displayed as a title bar, and seven kinds of motion contents "Go Forward", "Go Backward", "Go to the Right", "Go to the Left", "Sit up", "Stand up", and "Lie down" are listed and displayed in the middle. The display contents at the bottom of this motion selection display F11D2 are the same that of the control display F11D1.

In this motion selection display F11D2, when for example "Go Forward" is selected, the display is not transited and remained, and the communicator 50 transmits a control signal for making the robot 1 execute the motion of going forward to the robot 1.

As described above, in the motion selection display F11D2, when the reserved key 52C corresponding to "Back" is operated and selected after the execution of various kind of motion on the robot 1 by user's selection, the display is transited from the motion selection display F11D2 to the former control display F11.

Figure 34:
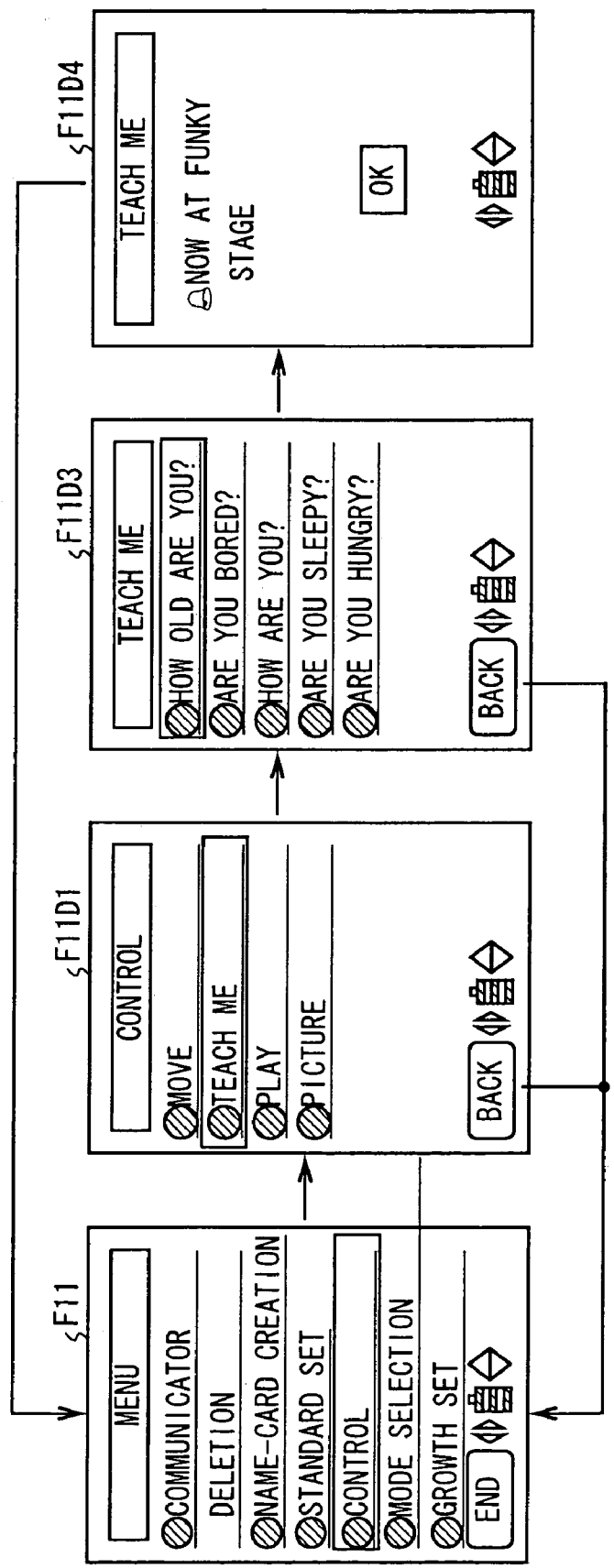
FIG. 34 is a plane diagram applying the explanation of the display transition state at the robot control.

Following above, as shown in FIG. 34 in the control display F11D1, when "Teach me" is selected, the display is transited to a question selection display F11D3. In this question selection display F11D3, "Teach me" is displayed as a title bar, five kinds of question contents "How old are you?", "Are you bored?", "How are you?", "Are you sleepy?", and "Are you hungry?" are listed and displayed in the middle. The display contents at the bottom of this motion selection display F11D3 are the same that of the control display F11D1.

In this question selection display F11D3, when for example. "How old are you?" is selected, the communicator 50 transmits a control signal corresponding to the selected question to the robot 1, and with a response form the robot 1 obtained (for example adolescence) a message "Now at funky stage" representing adolescence following the head icon corresponding to the robot 1 is displayed and the mark showing "Back" in the lower part is deleted (a question selection display F11D4).

As described above, in the question selection display F11D3, the decision key 52A corresponding to "OK" is operated and pressed after the reception of the responses to the various questions given to the robot 1, the display is transited from the question selection display F11D3 to the former robot menu display F11.

Figure 35:
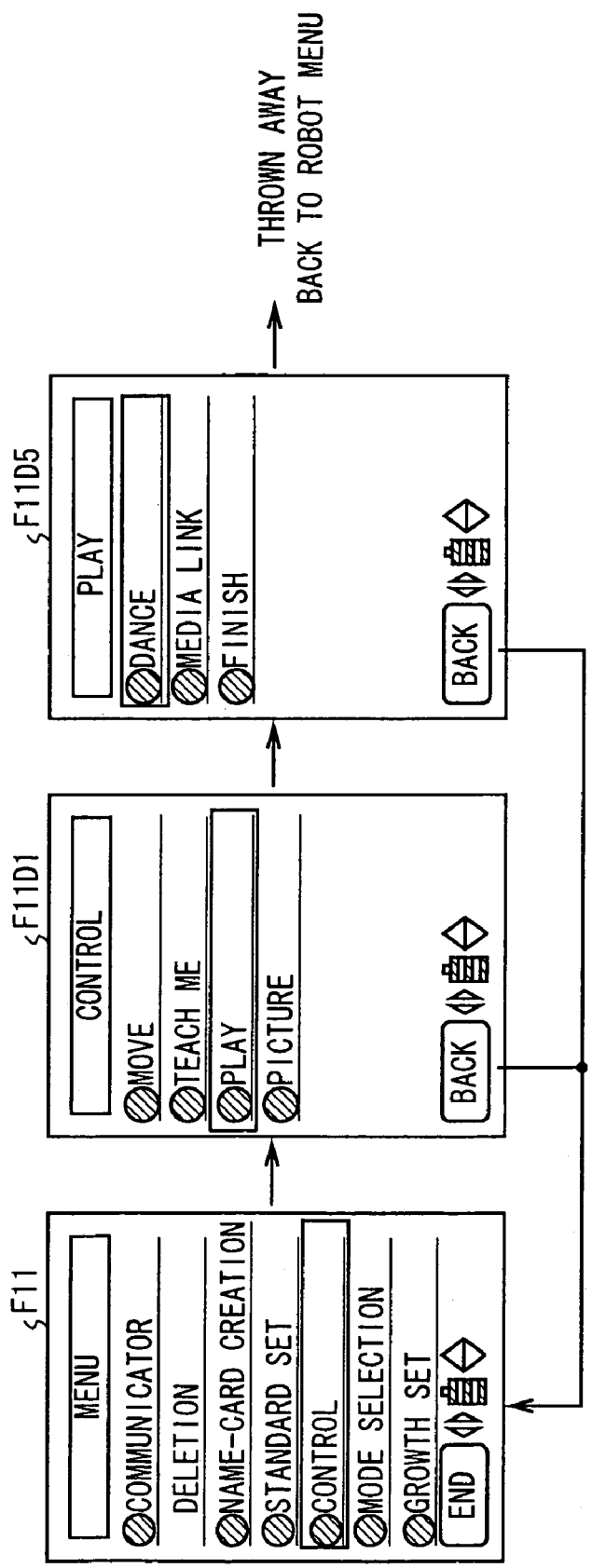
FIG. 35 is a plane diagram applying the explanation of the display transition state at the robot control.

Furthermore, as shown in FIG. 35, when "Play" is displayed in the control display F11D1, the display is transited to a play selection display F11D5. In this play selection display F11DS, "Play" is selected as a title bar, and three kinds of question contents "Dance", "Media Link", and "Finish" are listed and displayed in the middle. The display contents at the bottom of this play selection display F11D5 is the same as that of the control display F11D1.

In this play selection display F11D5, when for example "Dance" is selected, the communicator transmits a control signal corresponding to the request to the robot 1, then the display is transited from the play selection display F11D5 to the former robot menu display F11.

Figure 36:
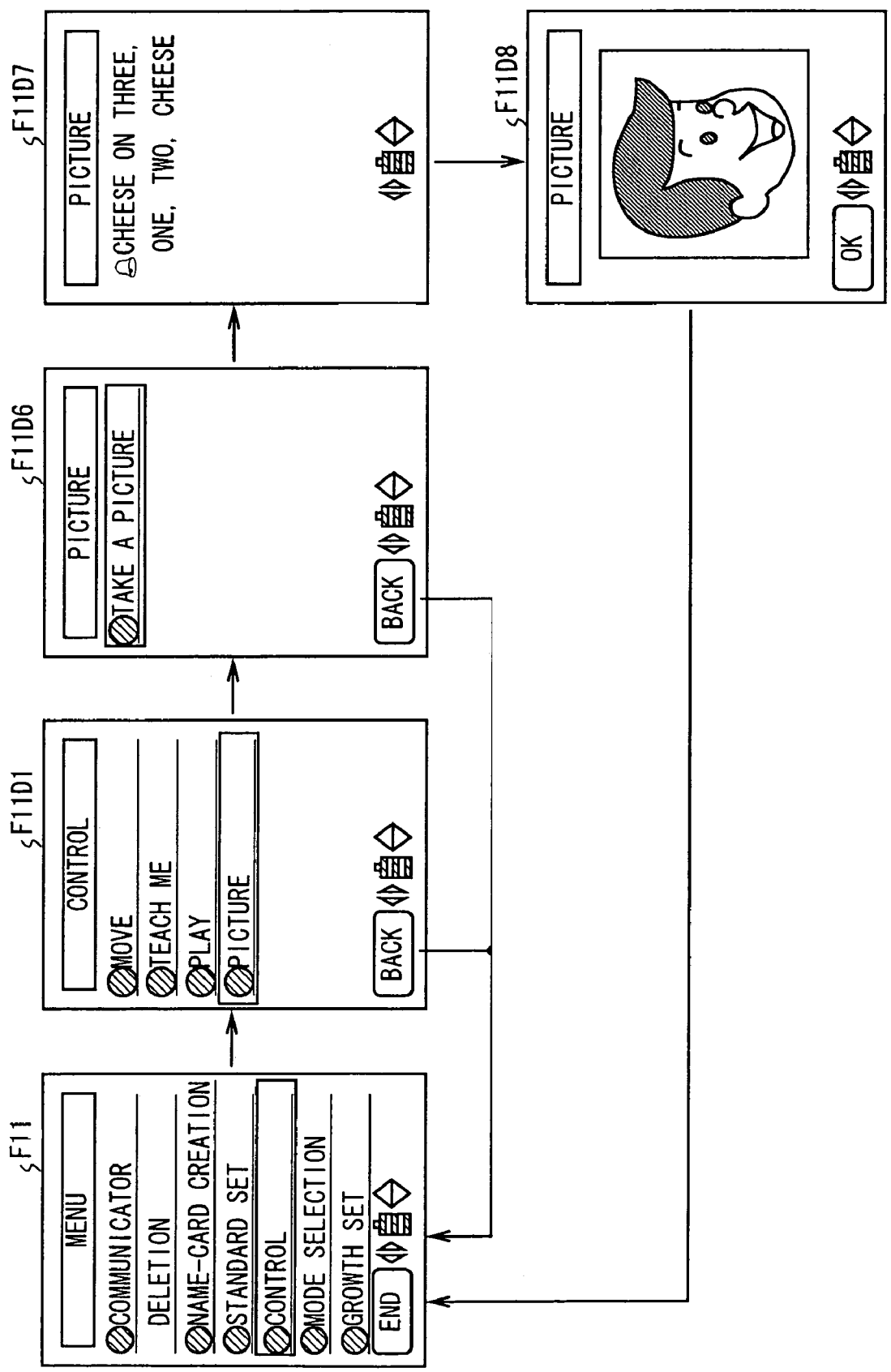
FIG. 36 is a plane diagram applying the explanation of the display transition state at the robot control.

Furthermore, as shown in FIG. 36, when "Picture" is selected in the control display F11D1, the display is transited to a picture display F11D6. In this picture F11D6, "Picture" is displayed as a title bar, a message "Take a picture" is displayed in the middle. The display contents at the bottom of this picture display F11D6 are the same that of the control display F11D1.

In this picture F11D6, when "Take a picture" is selected, the communicator 50 transmits a control signal corresponding to the request to the robot 1, then displays a message such as "Cheese on three, One, two, cheese" following the head icon corresponding to the robot 1 in the place of the message in the middle as well as the mark showing "Back" in the lower part is deleted (a picture display F11D7).

At this time, the robot 1 takes a picture focusing on the face of the user owning the communicator 50, then returns the picture result to the communicator 50. As a result, the communicator 50 displays the picture image obtained from the robot 1 in the place of the message in the middle of the picture display F11D7 (a picture display F11D8).

As described above, in the picture display F11D8, when the decision key 52A corresponding to "OK" is operated and pressed by the user, the display is transited to the former robot menu display F11.

(8-5) Change of Motion Mode

Furthermore, when "Mode Selection" is selected among the menu items with the robot menu display F11 displayed on the display part 51 under the communicating state between the registered robot 1, the communicator 50 transits the display from the robot menu display F11 to a mode selection display F11E1.

Figure 37:
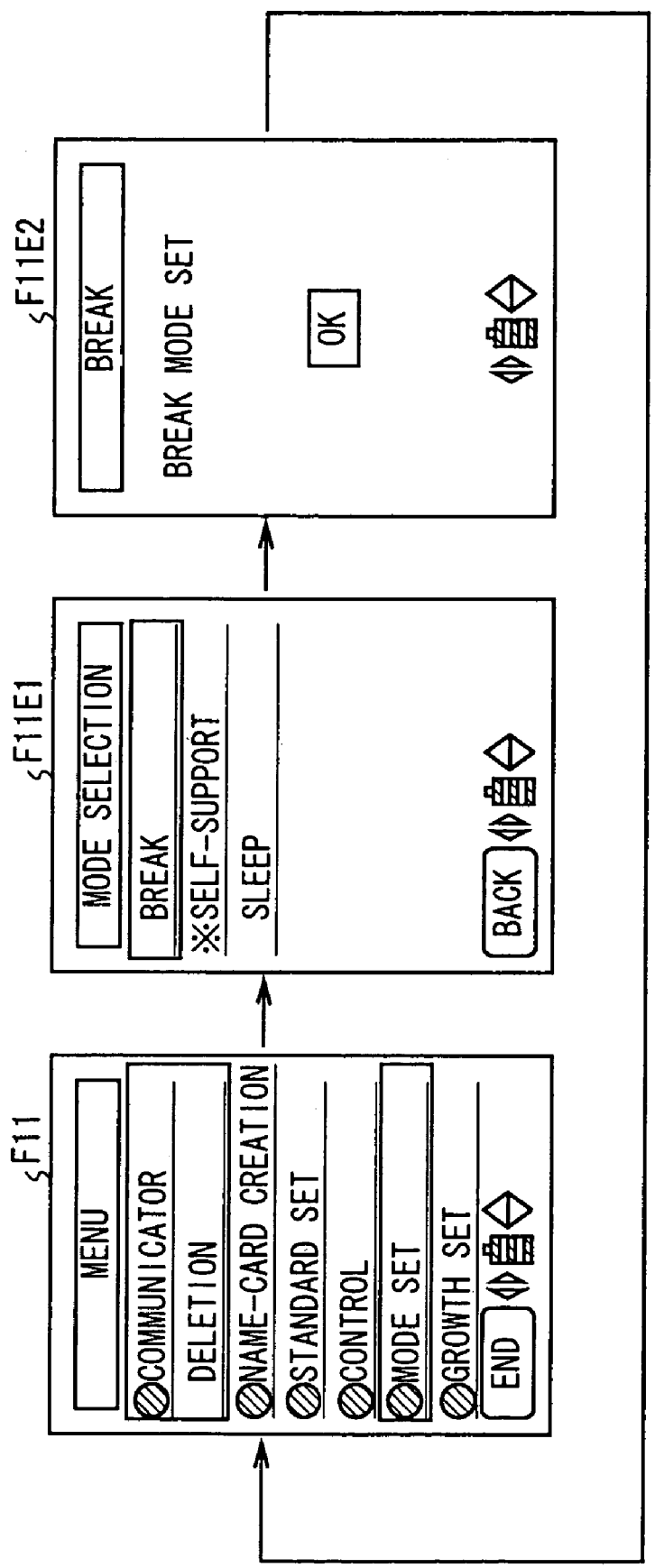
FIG. 37 is a plane diagram applying the explanation of the display transition state at the mode set.

In this mode selection display F11El, as shown in FIG. 37, "Mode Selection" is displayed as a title bar, three kinds of mode "Break", "Autonomous", and "Sleep" are listed and displayed in the middle, and a mark showing "Back" whose function is the same as the function assigned to the reserved key 52C in the place of the mark showing "End" at the left bottom.

In this mode selection display F11E1, a mark "X" is added to the head of the mode corresponding to current state among "Break", "Autonomous", and "Sleep", so that the user can visually recognize the current mode easily (a mode selection display F11E2).

In this mode selection display F11El, when "Break" is selected, the communicator transmits a control signal corresponding to the request to the robot 1, then the display is transited to a break mode confirmation display F11E2.

In this break mode confirmation display F11E2, "Break" is displayed as a title bar, a message "Break mode set" is displayed in the middle, and a mark showing "OK" to which the decision key 52A is assigned is displayed under the message, as well as the mark showing "Back" in the lower part is deleted.

As described above, in the break mode confirmation display F11E2, when the decision key 52A corresponding to "OK" is operated and pressed by the user, the display is transited to the former robot menu display F11.

Figure 38:
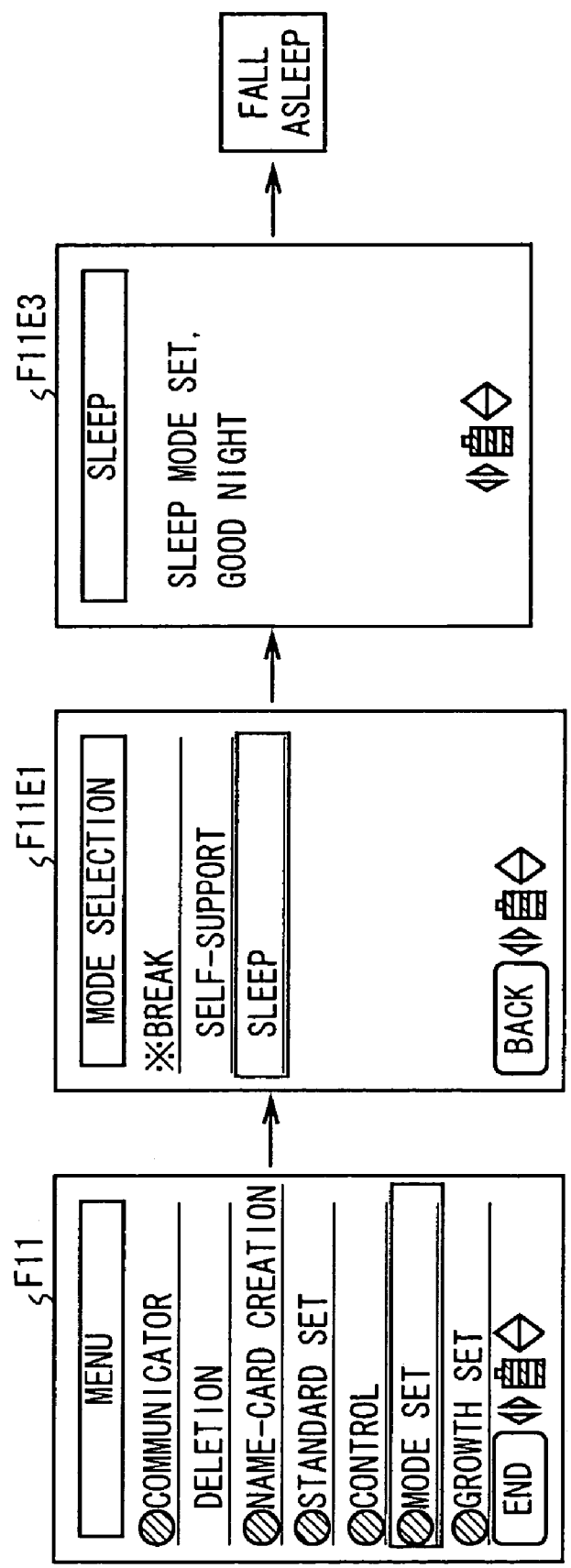
FIG. 38 is a plane diagram applying the explanation of the display transition state at the mode set.

Furthermore, as shown in FIG. 38, when "Sleep" is selected in the mode selection display F11E1, the communicator 50 transmits a control signal corresponding to the request to the robot 1, then the display is transited to a sleep mode confirmation display F11E3.

In this sleep mode confirmation display F11E3, "Sleep" is displayed as a title bar, a message "Sleep mode set, Good night" is displayed in the middle, and the mark showing "Back" in the lower part is deleted.

As described above, in the sleep mode confirmation display F11E3, after the prescribed time passed, the display is automatically transited to the former robot menu display F11. Here, the robot 1 can select only sleep mode among above-mentioned motion modes when the robot 1 is mounted on a buttery. charge device dedicated to the robot 1 (hereafter, it is referred as a station) since the posture is kept at a prescribed position.

Furthermore, the robot 1 can only either of select autonomous mode and sleep mode during being lifted in user's arms since the four leg units 3A–3D are not on the ground.

(8-6) Growth Set

Furthermore, when "Growth Set" is selected with the robot menu display F11 displayed on the display part 51 under the communicating state with the registered robot 1, the communicator 50 transits the display from the robot menu display F11 to a growth set display F11F1.

Figure 39:
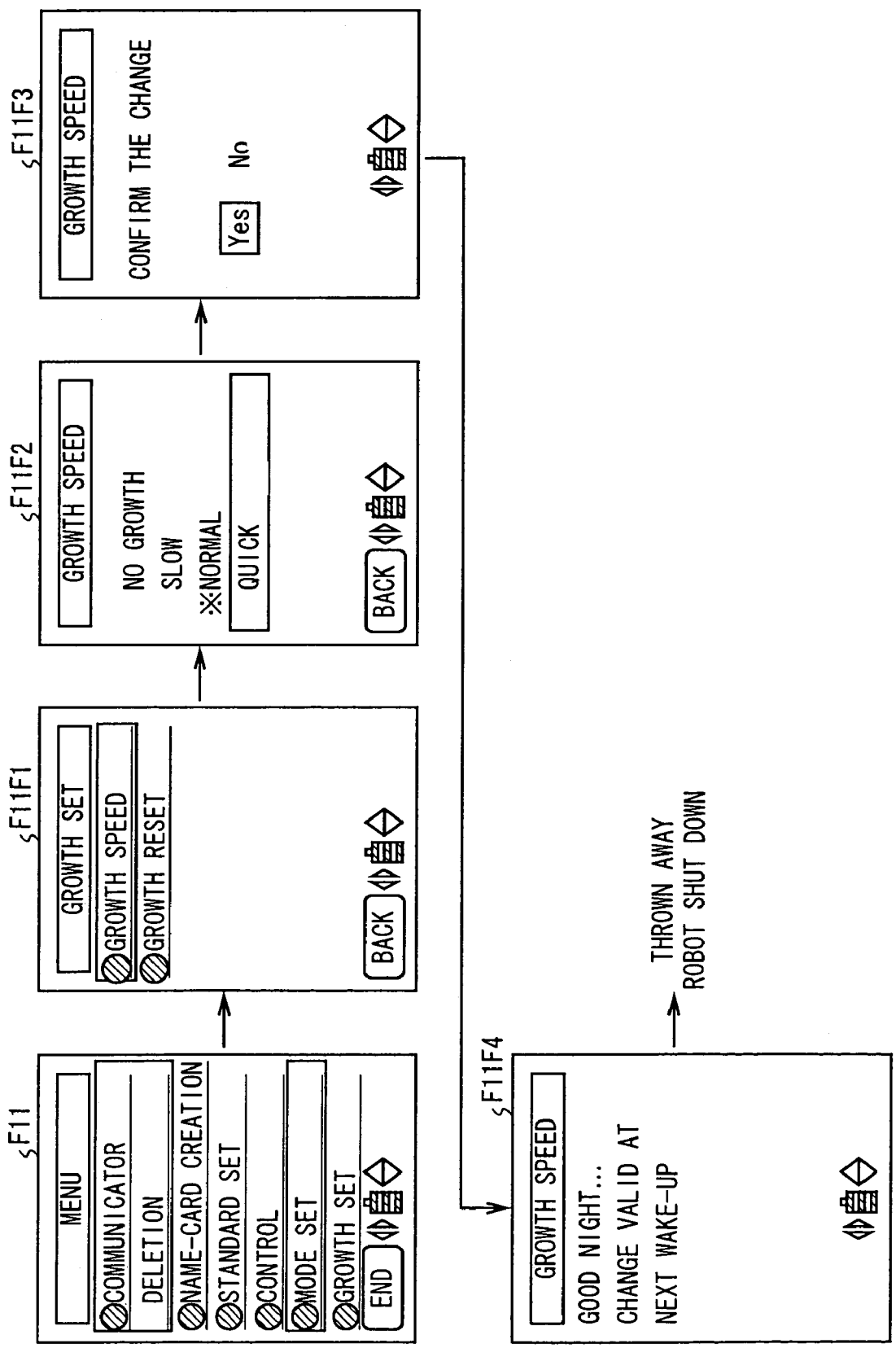
FIG. 39 is a plane diagram applying the explanation of the display transition state at the growth set.

In this growth set display F11F1, as shown in FIG. 39, "Growth Set" is displayed as a title bar, two options, "Growth Speed", and "Growth Reset" are displayed in the middle, and a mark showing "Back" whose function is the same as the function assigned to the corresponding reserved key 52C is displayed in the place of the mark showing "End" at the left bottom.

In this growth set display F11F1, when "Growth Speed" is selected, the display is transited to a growth speed display F11F2. In this growth speed display F11F2, "Growth Speed" is displayed as s title bar, and four steps of speed level, "Normal", "Quick", "Slow", and "Stop" are listed and displayed. The display contents at the bottom of this growth speed display F11F2 are the same as those of the growth set display F11F1.

Among these speed levels, provided that "Normal" is the usual growth speed, "Quick" is set three times quicker than "Normal" and "Slow" is set three times slower than "Normal". "Stop" means no growth, and in this case, it is configured that sideling growth (type change) does not happen as well.

In this growth speed display F11F2, when for example "Quick" is selected, the communicator 50 transmits a control signal corresponding to the speed level to the robot 1, then displays a message "confirm the change" in the place of the list display in the middle on the display and displays marks showing "No" and "Yes" to which the cursor key 52B and the decision key 52A are assigned under the message, while the mark showing "Back" in the lower part is deleted (a growth speed display F11F3).

Then in the growth speed display F11F3, when the decision key 52A is operated and pressed with the cursor key 52B being tilted to the left, a message "Good night . . . Change valid at next wake-up" is displayed, while the marks showing "No" and "Yes" are deleted (a growth speed display F11F4).

In this case, the robot 1 is configured to shutdown the communication with the communicator 50 after changing the growth speed to the speed selected by the communicator 50, then reflect the growth speed changed after the reboot. On the other hand, when the decision key 52A is operated and pressed with the cursor key 52B being tilted to the right, it is judged that there is no growth speed change requested, and the display is transited to the former robot menu display F11 as it is.

Figure 40:
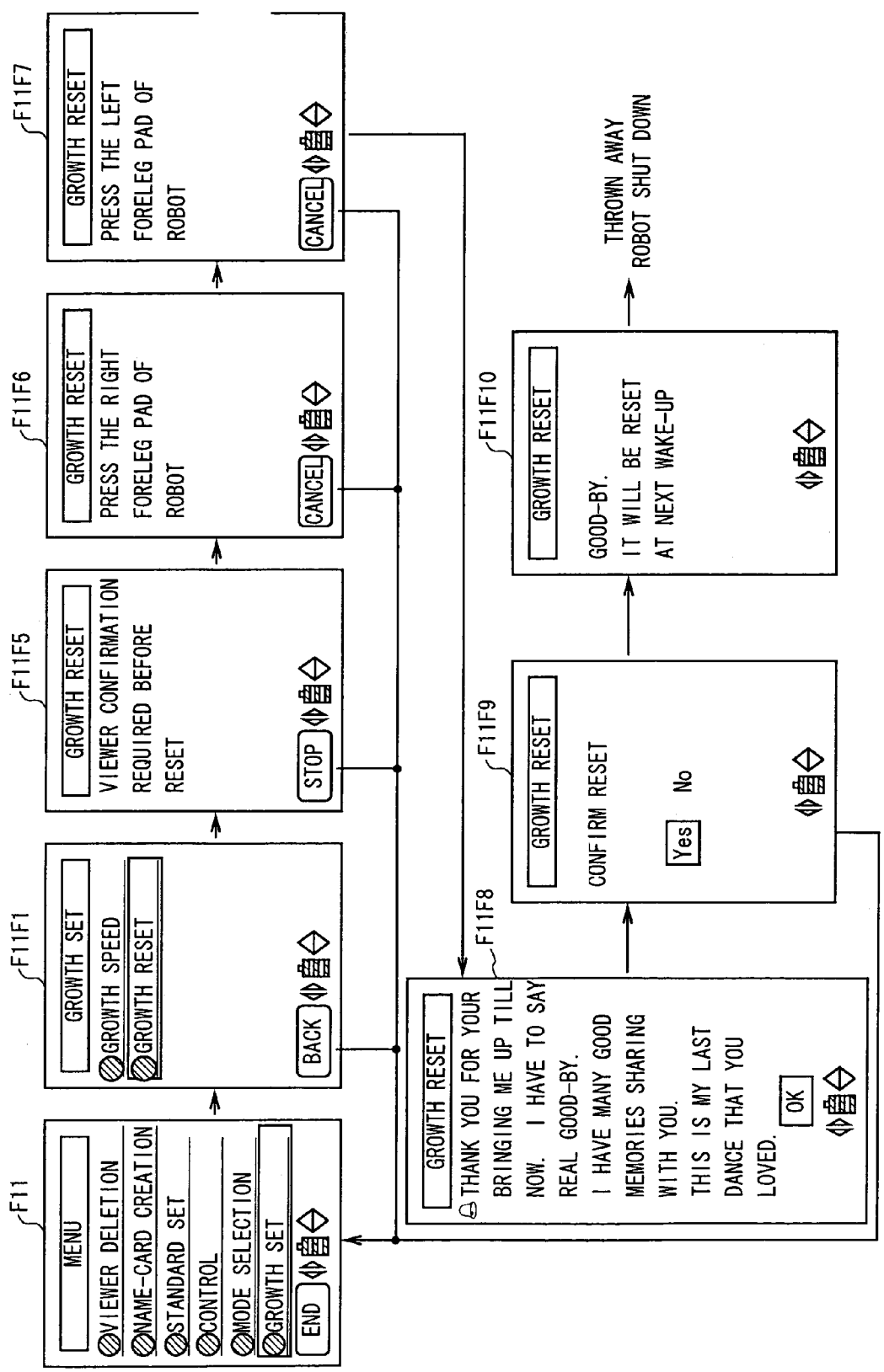
FIG. 40 is a plane diagram applying the explanation of the display transition state at the growth set.

In this growth set display F11F1, as shown in FIG. 40, when "Growth Reset" is selected, the display is transited to a growth reset display F11F5. In this growth reset display F11F5, "Growth Reset" is displayed as a title bar, a message "Communicator 50 Confirmation Required before Reset" is displayed in the middle, and a mark showing "OK" to which the decision key 52A is assigned is displayed under the message, as well as a mark showing "Cancel" whose function is the same as the function assigned to the corresponding reserved key 52C is displayed in the place of the mark showing "Back" at the left bottom.

In this growth reset display F11F5, when the decision key 52A is operated and pressed, a message "Press the right foreleg pad of Robot 1" is displayed in the place of the message in the middle (a growth reset display F11F6).

Next, when a valid detection result of the touch sensor corresponding to the right foreleg pad of the robot 1 is acquired by the user with the growth reset display F11F6 displayed, the communicator 50 transits the display to a display F11F7 where the display contents in the middle of the growth reset display are replace with a message "Press the left foreleg pad of Robot 1".

When a valid detection result of the touch sensor corresponding to the left foreleg pad of the robot 1 is acquired by the user with the growth reset display F11F7 displayed, the display is transited to a display F11F8 where the display contents in the middle of the growth reset display F11F7 are replaced with a message "Thank you for your bringing me up till now. I have to say real good-by. I have many good memories sharing with you. This is my last dance that you loved" following the head icon corresponding to the robot 1 and a mark showing "OK" to which the decision key 52A is assigned.

Then at the beginning of the dance of the robot 1, when the decision key 52A is operated and pressed in this growth reset display F11F8, a message "Confirm Reset" is displayed in the place of the message in the middle, and marks showing "No" and "Yes" to which the cursor key and the decision key 52A are assigned are displayed under the message as well as the mark showing "Back" in the lower part is deleted (a growth reset display F11F9).

Then, in the growth speed display F11F9, when the decision key 52A is operated and pressed with the cursor key 52B being tilted to the left, a message "Good-by. It will be reset at next wake-up" is displayed in the place of the message in the middle and marks showing "No" and "Yes" are deleted (a growth speed display F11F10)

In this case, the robot 1 shuts down the communication between the communicator 50 as well as resets various data contents after the end of the dance, so that the growth starts from a new growth process (starting from "Birth" of the growth steps" at the reboot by the user.

At this time, the robot 1 resets the data contents such as growth result, learning result, emotion/instinct value, and name-card information, and does not reset the data contents such as picture result taken and communicator registration.

On the other hand, when the decision key 52A is operated and pressed with the cursor key 52B being tilted to the right, it is judged that the growth reset is not requested, and the robot 1 stops dancing and the display is transited to the robot menu display F11 as it is.

(9) Relation between Emotion and Instinct, and Display Contents of Communicator 50

Next, the relation between the expression of the emotion and the instinct of the robot 1, and the contents of the pictographic characters P1 (FIG. 41(B)) displayed on the display part 51 of the communicator 50.

In this communicator 50, pictographic character data representing approximately one hundred kinds of unique pictographic characters are previously stored in the ROM and the RAM for program 57, the pictographic character data corresponding to the most suitable pictographic character P1 is selectively read out based on the action decision information S21 (FIG. 7), and the pictographic character based on the pictographic character data is displayed on the display of the display part 51.

In other words, in this robot 1, as above-mentioned, in the action selection part 72, which is one of the functions of the controller 10, the following action and motion are decided based on the corresponding sate transition table 76 (FIG. 9).

The action selection part 72, when a recognized result "I'm pat (PAT)" is provided from the condition recognition part 70, as above-mentioned, decides the probability of the following action and motion using the state transition table 76, and outputs the decided action and motion as the action decision information S21 to the command conversion part 74 while the action selection part 72 reads the parameter value of "Joy" in the instinct emotion part 71 and notifies it to the command conversion part 74.

Accordingly, the command conversion part 74 makes action expressing designated "Joy" by indirectly driving the necessary actuators $24_1$–$24_n$ (FIG. 2) based on the action decision information S21 provided from the action selection part 72, as well as it displays a pictographic character P1 representing smile corresponding to "Joy" on the display part of the communicator 50 by transmitting the action decision information S21 to the communicator 50. Accordingly, the communicator 50 can express emotion "Joy" as a look as if the robot 1 is laughing in accordance with displaying the emotion "Joy" on the display part.

Furthermore, the action selection part 72, when a recognized result "I'm hit (HIT)" is provided from the condition recognition part 70, as above-mentioned, decides the probability of the following action and motion using the state transition table 76, and outputs the decided action and motion as the action decision information S21 to the command conversion part 74 while the action selection part 72 reads the parameter value of "Anger" in the instinct emotion part 71 and notifies it to the command conversion part 74.

Accordingly, the command conversion part 74 makes action expressing designated "Anger" by indirectly driving the necessary actuators $24_1$–$24_n$ (FIG. 2) based on the action decision information S21 provided from the action selection part 72, as well as it displays a pictographic character P1 representing fierce face corresponding to "Anger" on the display part of the communicator 50 by transmitting the action decision information S21 to the communicator 50.

Accordingly, the communicator 50 can express emotion "Anger" as a look as if the robot 1 is getting angry in accordance with displaying the emotion "Anger" on the display part 51.

As described above, in the communicator 50, it is configured that the robot 1 expresses the motion such as "Joy" to "I'm pat" or "Anger" to "I7m hit" as action or motion as well as the most suitable pictographic character expressing the emotion corresponding to "Joy" or "Anger" is displayed on the display of the display part 51.

The above embodiment describes the case where a pictographic character P1 corresponding to two emotion "Joy" and "Anger" is displayed on the display part of the communicator 50, however, the present invention is not only limited to this and also other emotion such as "Sadness", "Surprise", "Fear", and "Dislike" may be displayed with the most suitably corresponding pictographic characters, in addition, instinct such as "Kinetic drive", "Desire for adoration", "Appetite" and "Curiosity" may be displayed as a most suitably corresponding pictographic character P1.

(10) Exchange of Name-Card Information

The method for exchanging the name-card information between the robots 1 or between the robot 1 and the communicator 50 when a short distance wireless communication such as Bluetooth is used for wireless communication between the robots 1, or between the robot 1 and the communicator 50 will be explained.

For example, in the wireless communication between the robot 1 and the communicator 50, the master robot 1 is configured to exchange the name-card information between the slave communicator 50 as a connect sequence through a synchronization establishment phase and a communication connection phase complying with the connection procedure of Bluetooth.

Figure 42:
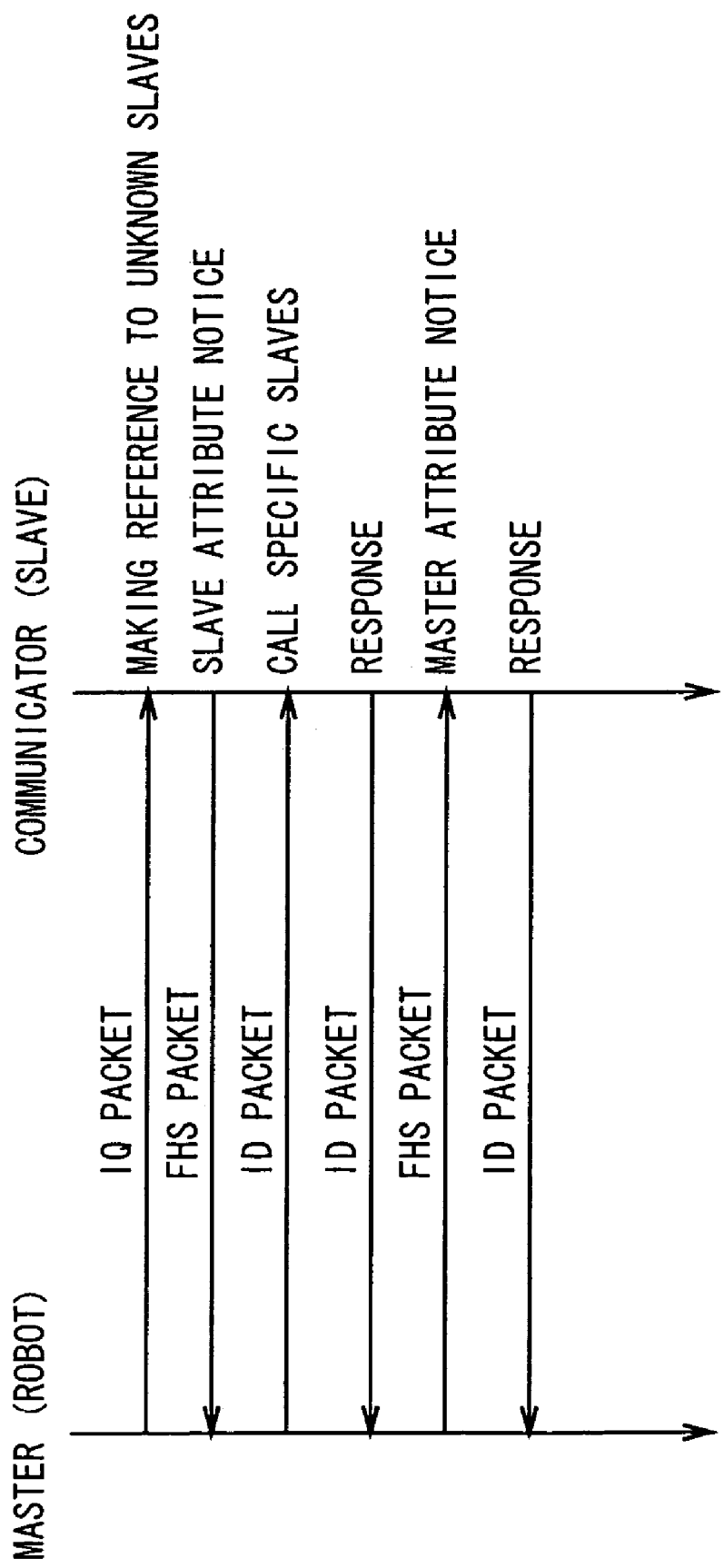
FIG. 42 is a timing chart applying the explanation of the synchronization establishment phase.

At first, at the synchronization establishment phase, as shown in FIG. 42, the master robot 1 transmits an IQ packet to non-specific targets. The communicator 50 to be a slave transmits a frequency hopping sequence (FHS) packet to the master robot 1 as an attribute notice at the reception of the IQ packet.

The master robot 1 transmits an ID packet for confirmation to specify the communicator 50 to be a slave at the reception of the FHS packet.

As a result, the master robot 1 transmits the FHS packet as an attribute notice to the slave communicator 50 when the ID packet is transmitted from the slave communicator 50 as the response.

Then, the master robot 1 can realize so-called synchronization establishment which synchronizes the change timing of the frequency hopping in the spread spectrum system adopted in Bluetooth between the slave communicator 50 at the reception of the ID packet returned from the slave communicator 50.

Figure 43:
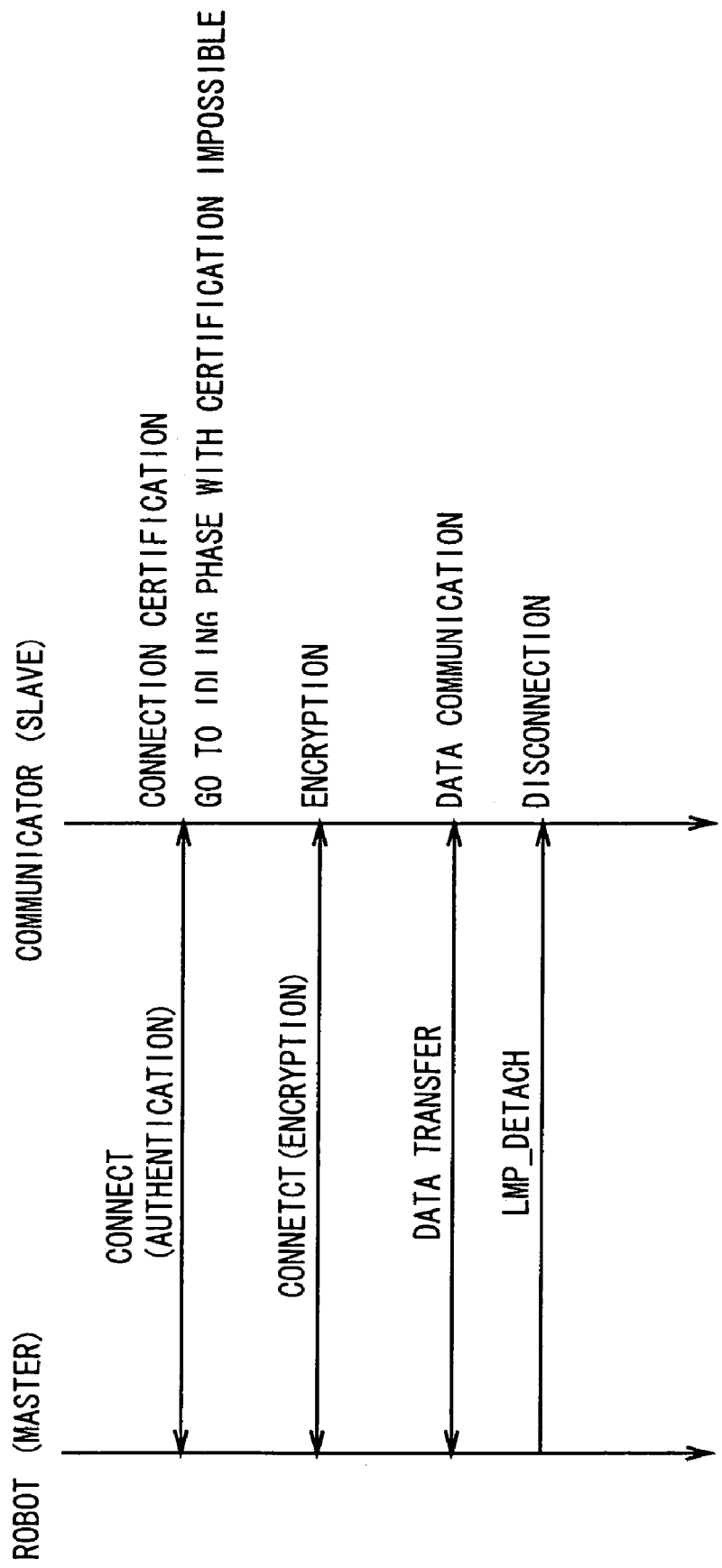
FIG. 43 is a timing chart applying the explanation of the communication connection phase.

Following above, in the communication connection phase, as shown in FIG. 43, the master robot 1 makes encryption each other according to the prescribed encryption procedure when the certification is possible between the slave communicator 50, while it moves to the idling phase when the certification is impossible.

Figure 44:
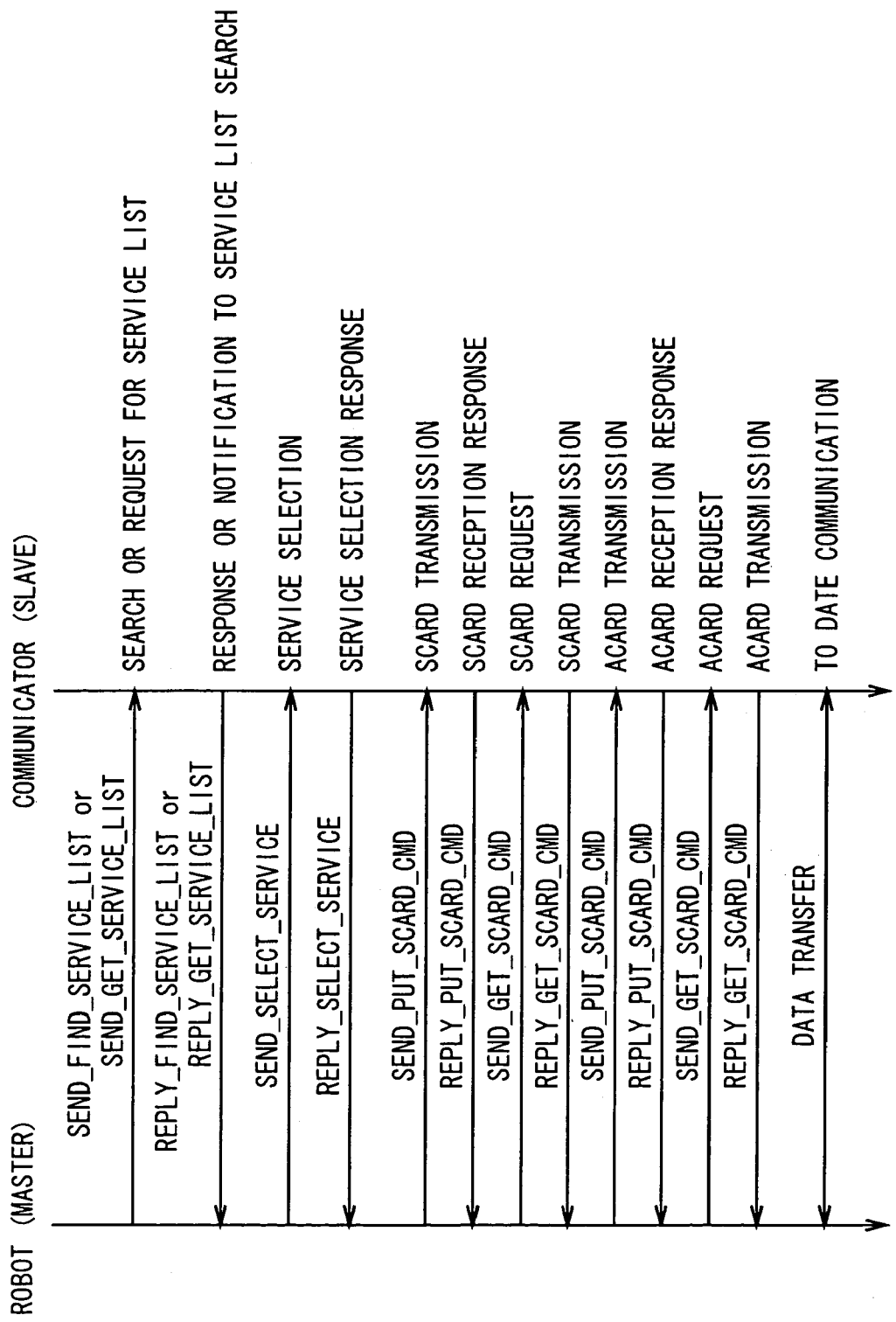
FIG. 44 is a timing chart applying the explanation of the connect sequence.

Then after the encryption, the master robot 1 becomes data transmission-able state between the slave communicator 50, and executes the connect sequence as shown in FIG. 44 focusing on the exchange of the name-card information.

In this connect sequence, the master robot 1 at first searches or requests a service list (a list of available functions) on or to the slave communicator 50, then waits for the notification from the slave communicator 50 notifying the list of available functions.

Following above, the master robot 1 selects the desired service in the service list obtained from the slave communicator 50, and transmits a service request to the slave communicator 50. The slave communicator 50, based on the request from the master robot 1, responses to tell whether the service is available or not.

Then, the master robot 1 exchanges the name-card information of the robots between the slave communicator 50.

The name-card information is comprised on a SCARD where the information for the connection and control in the system layer is described in binary format, and a ACARD where the name-card contents of the robot 1 determined for each application is described in text format (XML).

In specific, in the SCARD, a device category of Bluetooth represented by "BtDeviceCategory", a Bluetooth address represented by "BtAddress", a name represented by "Btname", a type of icon represented by "icon ID", and a language represented by "BtLang" are described in binary format. In the ACARD, "ERF-310AW10" representing the type of the robot 1, "New Born Robot" representing the information, and "Sweet Latte" representing the comment are described in text format.

In practice, the master robot 1 transmits the self SCARD to the slave communicator 50, and waits for the response from the slave communicator 50 notifying of the reception.

Following above, the master robot 1 requests the SCARD of the communicator 50 to the slave communicator 50, and waits for the transmission of the SCARD from the communicator 50.

Furthermore, the master robot 1 transmits the self ACARD to the slave communicator 50, and waits for the response from the slave communicator 50 notifying of the reception.

Following above, the master robot 1 requests the ACRAD of the communicator 50 to the slave communicator 50, and waits for the transmission of the ACARD from the communicator 50.

As described above, the master robot 1 makes data communication between the slave communicator 50 corresponding to various applications after exchanging the name-card information, then returns to FIG. 43 and disconnects the communication between the slave communicator 50 when the communication is requested to be end.

(11) Conversation Sequence between Robots 1

Figure 45:
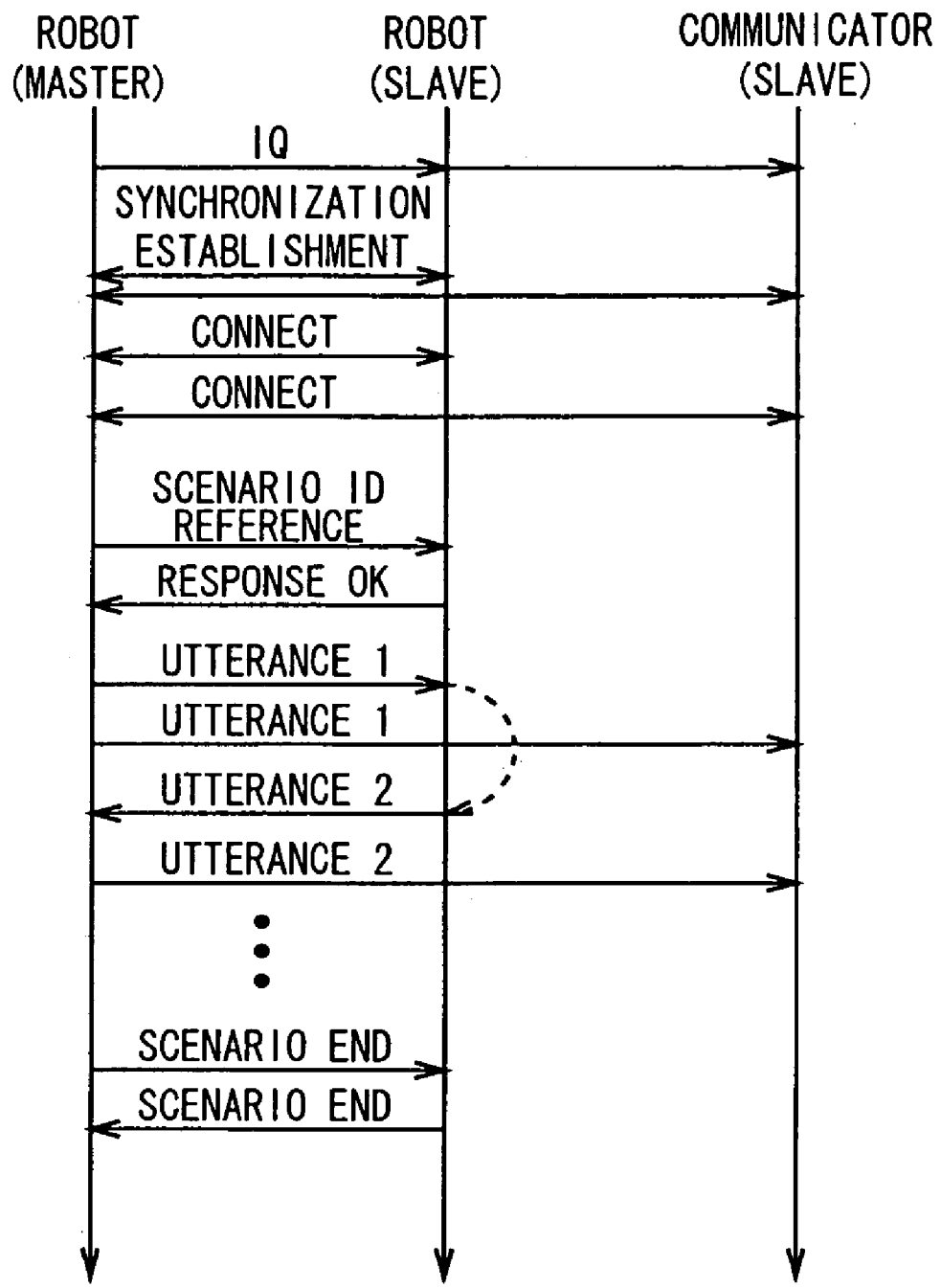
FIG. 45 is a timing chart applying the explanation of the conversation sequence between the robots.

In FIG. 45, the robot 1 confirms whether there are other robots 1 or communicators 50 in the neighborhood by transmitting IQ packets at prescribed intervals (for example every thirty seconds). When there is a robot 1 or a communicator 50 responding to the IQ packet, the master robot makes synchronization establishment with the robot 1 and the communicator 50 treating them as a slave.

Following above, the robot 1 executes a connect sequence including the exchange of the name-card information after the connection certification followed by the encryption with the slave robot 1 and the slave communicator 50.

Then the master robot 1 requests a scenario ID representing a conversation request only to the slave robot 1 (the communicator 50 is not targeted). The slave robot 1 searches into the self scenario database (the above-mentioned knowledge information part 85 in FIG. 7) whether the scenario ID obtained from the master robot 1 is responsible or not, and makes a response indicating OK if responsible.

Then,the master robot 1 transmits the scenario for example "Utterance 1" to the slave robot 1 as a text data as well as transmits the same to the slave communicator 50 when the slave communicator 50 is communication connected.

The slave robot 1 and the slave communicator 50 select "Utterance 2" in accordance with the scenario based on the text data provided from the master robot 1, and transmits the selected "Utterance 2" to the master robot 1 in the form of text data.

The master robot 1 transmits the "Utterance 2" based on the received text data to the communicator 50 when the slave communicator 50 is communication connected. Then, the master robot 1 transmits a request for end of the conversation by a scenario to the slave robot 1, so as to end the current connect sequence at the reception of the response from the slave robot 1.

As described above, when the robots 1 are communication connected each other, the conversation sequence by a scenario becomes possible, and there is a communicator 50 which is connected between the robots 1, the communicator 50 can receive from the master robot 1 and display the contents of the conversation by a scenario on the display part.

(12) Scenario Execution by Voice Recognition

When the master robot 1 autonomously connects and communicates with the other slave robots 1 and the slave communicators 50, the master robot 1 executes the scenario and communication connects to the slave robots 1 and the slave communicators 50 based on the user's operation result on the communicator 50, the recognized result of the user's voice, and the recognized result of the user's face, so that the interaction (interactive action) between the user using the communicator 50 and the robot 1 is enhanced.

(12-1) Execution of Scenario between Robots 1

At first, when two robots 1 are communication connected, the master robot 1 autonomously executes a scenario corresponding to the external circumstances after executing a scenario such as greetings toward the slave robot 1.

At this time, when the user pronounces the word "Friend" aiming to see the conversation scenario between the robots 1 by using the communicator 50, the master robot 1 can display the scenario on the display part 51 of the user's communicator 50 by autonomously executing the scenario toward the slave robot 1 based on the voice collected through the microphone 16.

On the other hand, when the word "Friend" is pronounced from the user with the robot 1 whose communication is unconnected each other, the master robot 1 transmits an IQ packet to search a slave robot 1 around, and when a slave robot 1 is not searched within a prescribed time (for example in thirty seconds), the master robot 1 notifies the result by making action for notifying the result.

As described above, the user can see the scenario in the display part of the self communicator 50 by making the master robot 1 execute the scenario by ejaculating a specific word when the user wants to see the scenario conversation between the robots 1. In addition, even when the communication between the robots 1 are not connected, the user can easily recognize that the robot 1 is not connected since the master robot 1 makes the action for notifying that fact.

In practice, in the master robot 1 under the communication connection state with other, robots in the above-mentioned FIG. 7, when the condition recognition part 70 in the controller 10 recognizes the command sound "Friend" and provides the recognized result to the conversation control part 75, the conversation control part 75 generates the scenario data based on the recognized result using the knowledge information part 85, so as to execute the scenario.

Then the conversation control part 75 can display the scenario based on the scenario data on the display of the communicator 50 by transmitting the scenario data through the session service control part 83 and the wireless communication control part 84 to the communicator 50.

On the other hand, in the master robot 1 under the communication disconnected state with other robots, the condition recognition part 70 in the controller 10 recognizes the command sound "Friend" and provides the recognized result to the conversation control part 75, and the conversation control part 75 transmits the IQ packet to outside through the session service control part 83 and the wireless communication control part 84.

Then, when the communication connection result cannot be obtained from the condition recognition part 70 after prescribed time passed, the conversation control part 75 notifies that fact to the action selection part 72, so that the action selection part 72 can decide the prescribed action or motion representing the communication disconnected and makes the robot express the corresponding action or motion.

(12-2) Execution of Interaction Scenario

The scenario with which the robot 1 talks to the user using the communicator 50, such as "How are you? <Yes> <No>", is called as an interaction scenario. A case where the voice from the user is recognized, a case where the face image of the user is recognized, a case where the user's hand is detected, and a case where there is an input from the communicator 50 can be a trigger for making the robot 1 execute the interaction scenario since the high possibility of user existence is preferable as a trigger.

Particularly, when the interaction scenario is executed by a voice recognition, it is convenient that the voice from the user is decided to a specific language such as "Let's talk", which allows the user to use it consciously.

In specific, in the robot 1, in the above-mentioned FIG. 7, when the state recognition part in the controller 10 recognized the command sound "Let's talk" and provides the recognized result to the conversation control part 75, the conversation control part 75 generates a scenario data representing the interaction scenario based on the recognized result using the knowledge information part 85, so as to execute the interaction scenario.

Then in the conversation control part 75, the scenario data is transmitted to the communicator 50 through the session service control part 83 and the wireless communication control part 84, so that the interaction scenario based on the scenario data can be displayed on the display of the communicator 50.

(12-2) Connection to Communicator

When the robot 1 autonomously acts, the user may want the self communicator 50 to display the soliloquy of the robot 1 by connecting the communicator 50 with the robot 1. Therefore, when the user pronounces the voice "Robot Chat" and the robot 1 recognizes this voice, the communication connection between the communicator 50 is established as well as the soliloquy from the robot 1 is displayed on the display part of the communicator 50, so that the user can easily make communication with the robot 1 to strengthen a sense of community.

In practice, in the robot 1, in the above-mentioned FIG. 7, the state recognition part in the controller 10 recognizes the command sound "Robot Chat" and provides the recognized result to the conversation control part 75, the conversation control part 75 transmits the text data corresponding to the utterance text added to the LMS command through the session service control part 83 and the wireless communication control part 84 to the communicator 50, so that the contents of utterance of the utterance text based on the text data can be displayed on the display of the communicator 50.

(13) Battery Save

The communicator 50 is a mobile equipment and the battery charge amount is consumed quickly if it is always connected, and it can be considered that the communication connection between the robot 1 is automatically disconnected after, for example, five minuets no operation by the user due to user's disregard.

However, it is not desirable to disconnect the communication connection between the robot 1 because the user doe not operate the communicator 50 for prescribed time, which is the operation against the user's intention, since it may be the case that the user only sees the robot 1 and not disregards the robot 1.

Figure 46:
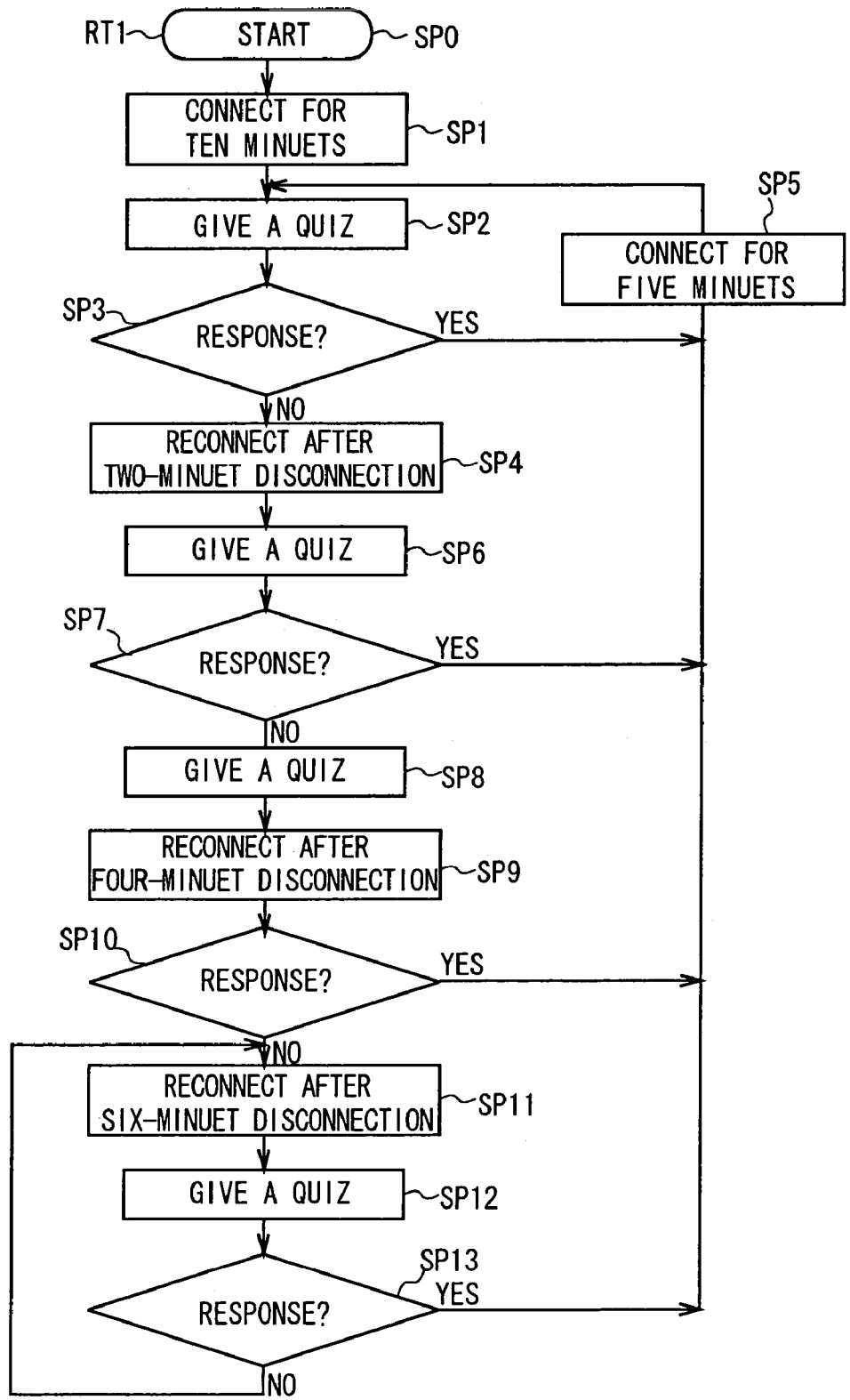
FIG. 46 is a flow chart applying the explanation of the battery save processing procedure.

Therefore, the controller 10 of the robot 1 can minimize the consumption amount of the battery of the communicator 50 under the communication connection and at the same time can deal with the user's intention by executing the battery save processing procedure RT1 as shown in FIG. 46.

In specific, in the battery save processing procedure RT1, the controller 10 of the robot 1 enters step SP0 at the end of the operation of the communicator 50 by the user under the communication connection between the communicator 50, and waits first ten minuets continuation of the connection in the following step SP1.

Then the controller goes to step SP2 and displays contents of utterance such as "Are you bored? <Yes> <No>" on the display part 51 of the communicator 50 by executing the above-mentioned interaction scenario, then goes to step SP3.

In this step SP3, the controller 10 judges whether there is a response from the communicator 50 or not, and, with a negative judged result, goes to step SP4 where the communication connection between the communicator 50 is reconnected after two minutes disconnection.

On the other hand, the controller 10 regards a positive result at step SP3 as a response from the user, and returns to step SP2 and repeats the same process with extending the connection for five more minutes.

Following above, at step SP6, the controller 10 displays the contents of utterance based on the above-mentioned interaction scenario on the display part of the communicator 50 right after the reconnection, then goes to step SP7.

At this step SP7, the controller 10 judges whether there is a response from the communicator 50 or not, and goes to step SP8 with a negative judged result and reconnects the communication connection between the communicator 50 after four minutes disconnection.

On the other hand, the controller 10 regards a positive result at step SP7 as a response from the user, and returns to step SP2 and repeats the same process with extending the connection for five more minuets.

Following above, at step SP10, the controller 10 judges whether there is a response from the communicator 50 or not right after the reconnection, then, with a negative results goes to step SP11 where the communication connection between the communicator 50 is reconnected after six minuets disconnection.

On the other hand, the controller 10 regards a positive result at step SP10 as a response from the user, and returns to step SP2 and repeats the same process with extending the connection for five more minuets.

Following above, at step SP12, the controller 10 displays the contents of utterance based on the above-mentioned interaction scenario on the display part of the communicator 50 right after the reconnection, then goes to step SP13.

At this step SP13, the controller 10 judges whether there is a response from the communicator 50 or not with a negative judged result, and returns to step SP11, and repeats the loop SP11-SP12-SP13 until acquisition of a positive result at step SP13.

In practice, when the communicator 50 is not operated at all for five minutes, it is configured that the power is automatically shut down. When the robot 1 keeps disconnection of the communication connection between the communicator 50 for six minutes at the above-mentioned step SP11, the process is ended.

However, when the user requests the display of the communicator 50 during the robot 1's disconnection of the communication connection between the communicator 50, for example when the user pronounces the voice "Robot Chat", the communication connection between the robot 1 and the communicator 50 is established.

In the manner as described above, even when the communicator 50 is under the communication connection state between the robot 1, the consumption amount of the battery can be minimized while the user's intention is regarded based on the robot 1's talking to.

(14) Wireless Communication between Robots (14-1) Communication Target Direction Specifying Method During Wireless Communication When the robots 1 make wireless communication each other, and for example when one of or both robots 1 use a non-directional antenna terminal, it is difficult for a third party to specify the direction in which the communication target exists. Also, even under wireless communication, it is difficult to recognize whether they are under communication or not.

To solve above, the direction in which the communication target exists can be specified and the face can be turned to that direction, with arrangement to receive the sound and infrared radiation obtained from the surroundings under communicating state after the establishment of the communication. For example, the sound collection condition of the microphone 16 (FIG. 2) can be changed by turning the self neck with the communication target making a sound.

(14-2) Distance to Communication Target Specifying Method During Wireless Communication Furthermore, when the robots 1 make wireless communication each other, the distance to the robot 1 can be specified by the way where one of the robots 1 generates a prescribed sound with enough strength for practical use and the other robot 1 measures the time difference and the damping degree of the sound and executes a prescribed computing processing under communicating state.

(14-3) Communication between Multiple Languages

Furthermore, in the communication between the robots 1, the robot 1 which receives data transmitted as common data representing a command and/or a semantics having meanings as communication contents from the other robot 1, so as to recognize the contents transmitted from the other robot 1 based on the data.

As described above, between the robots 1, a command and/or a semantics independent to language are exchanged, which is different from the simple exchange of sound, so that it can pretend as if the communication between different languages (in other words, multiple languages) is established.

(14-4) Method for Recognizing Conversation between Robots

Furthermore, when the robots 1 make conversation each other, not only the wireless communication, but also the pronunciation of the voice in ordinary language is made so that the contents of the conversation can be notified to both users of the robots 1.

In other words, the actual conversation between robots 1 is made by exchanging the text data representing the contents of the conversation, the common data representing the above-mentioned command and/or semantics, and the action decision information S21 (FIG. 5) representing the emotion and/or instinct using the wireless communication means (wireless LAN card 41) which both robots 1 have, while with synchronizing the timing of transmitting and receiving each data, in each of the robots 1, a prescribed sound is pronounced from the speaker 21 (FIG. 2) of the head unit 4, the LED 15 and 23 (FIG. 2) of the head unit 4 and the body unit 2 are lightened with a prescribed pattern, and the head unit 4 and the leg units 3A–3D are moved with a desired pattern.

At this time, sound information is not used for the recognition of the conversation between robots 1, but the recognition of the contents of the conversation is made based on the data of wireless communication, and sound information and other information are used for notification to the user.

(14-5) Reception of Motion Data via Wireless Communication

When the robots 1 make wireless communication each other, when the communicating robot 1 has motion files representing motion patterns and action patterns which the self robot 1 does not have, those motion patterns and action patterner based on those motion files can be regularly used if those motion files are stored in the memory card for autonomous mode 26A by those motion files transmitted from the communicating robot 1.

In other words, when conversation in accordance with a specific scenario is made between multiple robots 1, and the robot 1 of conversation target does not have the corresponding scenario, and motion, the scenario and motion are transmitted to the target before the start of the conversation via wireless communication. As a result, by exchanging scenarios and motions between the robots 1, trendy words, relation between a teacher and a student, and growth resulted by communication can be simulated in a group composed of multiple robots 1.

Here, the above-mentioned scenario is a script or a playbook in which the order of the situation, words, and motions are described under the communicating state among multiple robots 1, and the conversation contents are prescribed according to the number of the conversation participants.

(14-6) Name-Card Exchange between Robots

When the robots 1 make conversation each other, each of the robots 1 is required to have a mechanism for recognizing each unit, therefore, when the robots 1 are communication-able state via wireless communication each other, the robots 1 exchange the name-cards in which the name, character, and the owner name are described, as a preparation step before the conversation, so that they can recognize whether it is the first meet or they meet often (friends) as well as changes can be given to the communication between the robots 1.

(15) Communication between Robot and Wireless Terminal Device (15-1) Recognition of Owner In the wireless communication between the robots 1, for example when a short distance wireless communication such as Bluetooth is used, the existence of the communicator 50 corresponding to the robot 1 can be known as well as the user having the communication 50 (hereafter, it is referred as an owner) can be specified at the establishment of communication between the robots 1.

Therefore, in each robot 1, if the communicator 50 connected most frequently and for the longest time is memorized together with the owner's name, and the learning effect that the owner is automatically recognized for each communication from the next time is given, the communication more close to the human relations can be realized.

In specific, the robot 1 acts a motion making the owner happy with the owner's approaching, while the robot 1 acts a motion of hesitating a little bit and a motion of having a great curiosity with an unknown user's approaching, so that the robot 1 can recognize the owner as a special person as if the robot 1 is a real animal, and the bonds between the owner can be strengthened.

(15-2) Owner Registration

In the registration system which requires password input from the communication 50 for the registration of the user under the situation where only the communication 50 can control the corresponding robot 1, when the password is leaked, it is very difficult to protect an illegal registration by a third part having no usage right.

Therefore, in the robot 1, the registrator transmits a motion approaching to the robot 1 as command contents to the communicator 50, and displays the same on the display part 51 of the communicator 50. The registrator makes the corresponding reaction approach to the robot 1 according to the displayed command contents, and only when the fact that the right reaction is executed is transmitted from the robot 1 to the communicator 50, the registrator of the communicator 50 is officially registered as an owner.

For example, when a command to touch the touch sensors 14,19,20 (FIG. 2) or a sound command is transmitted from the robot 1 to the communicator 50 as command contents, the fact that a right reaction has taken is transmitted from the robot 1 to the communicator 50 with the registrator's approaching to the robot 1 right away and touching the robot 1 or reading the sound based on the sound command, then the registrator is officially registered as an owner.

As a result, the user making the owner registration always needs to approach the robot 1 close enough to touch the robot 1, so that an illegal registration by a third party can be prevented. In addition, the user officially registered as an owner is periodically required to update the registration as occasion demands by changing the command contents transmitted from the robot 1 to the communicator 50, so that the security can be enhanced.

(15-3) Device for Displaying Conversation between Robots

When the robots 1 makes conversation (exchanges information) via wireless connection, it is very difficult to know the contents of the conversation from outside. To solve the problem, the contents of the conversation are displayed on the communicator 50 carried by the user with synchronizing the timing of the information exchange between the robots 1 as a readable text data, so that the user can know the contents of the conversation between the robots 1 by using the communicator 50.

(16) Communication with Robot 1 Using Personal Computer (16-1) Method for Synchronizing Motions of Multiple Robot Units At first, the motion sequence is transmitted to each of the multiple robots 1 via wireless communication using the personal communicator 31 (FIG. 3) owned by the user. In the motion sequence, the timing at which the motion after the reception of the prescribed synchronization signal, and the motion are described.

Next, the personal computer 31 transmits the synchronization signal to each robot 1 via wireless communication corresponding to the timing of music played, then each robot 1 received this synchronization signal can execute the motion based on the motion sequence, so that the motion of each of the multiple robot 1 can be synchronized.

Here, as an another method, when one of the robots 1 transmits the synchronization signal to the other robots 1 around corresponding to the timing of music played with multiple robots 1 under wireless communication-able state, each robot 1 received this synchronization signal can execute the motion based on the motion sequence same as the transmitting source robot 1, so that the motion of each of the multiple robot 1 can be synchronized.

(16-2) Method for Making Narration by Synchronizing Robot with Personal Computer At first, the sound data representing the narration is transmitted to the personal computer 31 (FIG. 3) via wireless communication to multiple robots 1. The narration based on the sound data is comprised of sound information such as general contents of conversation and a call.

Next, the personal computer 31 transmits a synchronization signal to the robot 1 at the same time as outputs the same voice as the sound output from the robot 1, so as to make the robot 1 output the voice. As a result, the personal computer 31 can output the voice which is the same as the voice output from the robot 1 with a high quality thanks to the no motion noise of the robot 1 mixed, comparing with the case where the voice output from the robot 1 is collected directly through the microphone.

(16-3) Notification of Mode at Robot

When the robot 1 has a plurality of motion modes, the user can select a motion mode through the personal computer 31. At that time, the robot 1 can notify the reception of the motion mode to the user having the personal computer 31 by changing the data of the motion mode transmitted from the personal computer 31 to the robot 1 via wireless communication to audio data and by outputting voice based on the audio data.

As a result, the user having the personal computer 31 can recognize that the robot 1 received the motion mode selected by the user by the voice pronounced from the robot 1 even when the motion mode display function is not installed in the personal computer 31 or the display ability is low.

(16-4) Method for Chat with Picture by Multiple Robots

When each of the multiple robots 1 has the CCD camera 17 (FIG. 2) and these multiple robots 1 and the personal computer 31 (FIG. 3) are connected via network each other, the persona computer 31 can display the picture image which the robots 1 are seeing on the display can be displayed. In addition, a desired conversation sentence can be input from the personal computer 31 through the keyboard or the mouse, so that the above-mentioned chat between the robots 1 can be executed with picture images.

(17) Operation and Effects of the Embodiments

According to the foregoing construction, the above-mentioned communicator 50 for remote-control is provided corresponding to the robot 1, and the communicator 50 is configured to be connectable to the robot 1 via short distance wireless communication such as Bluetooth.

When the multiple robots 1 make conversation each other under communication-able state, when one of the robots 1 transmits a common data representing a command and/or a semantics as the contents of the conversation to other robot 1, the robot 1 which received the data can recognize the contents transmitted from the other robot 1 based on the data, and can easily exchange the contents of the conversation as well as the communication can be established even between different languages.

Figure 47:
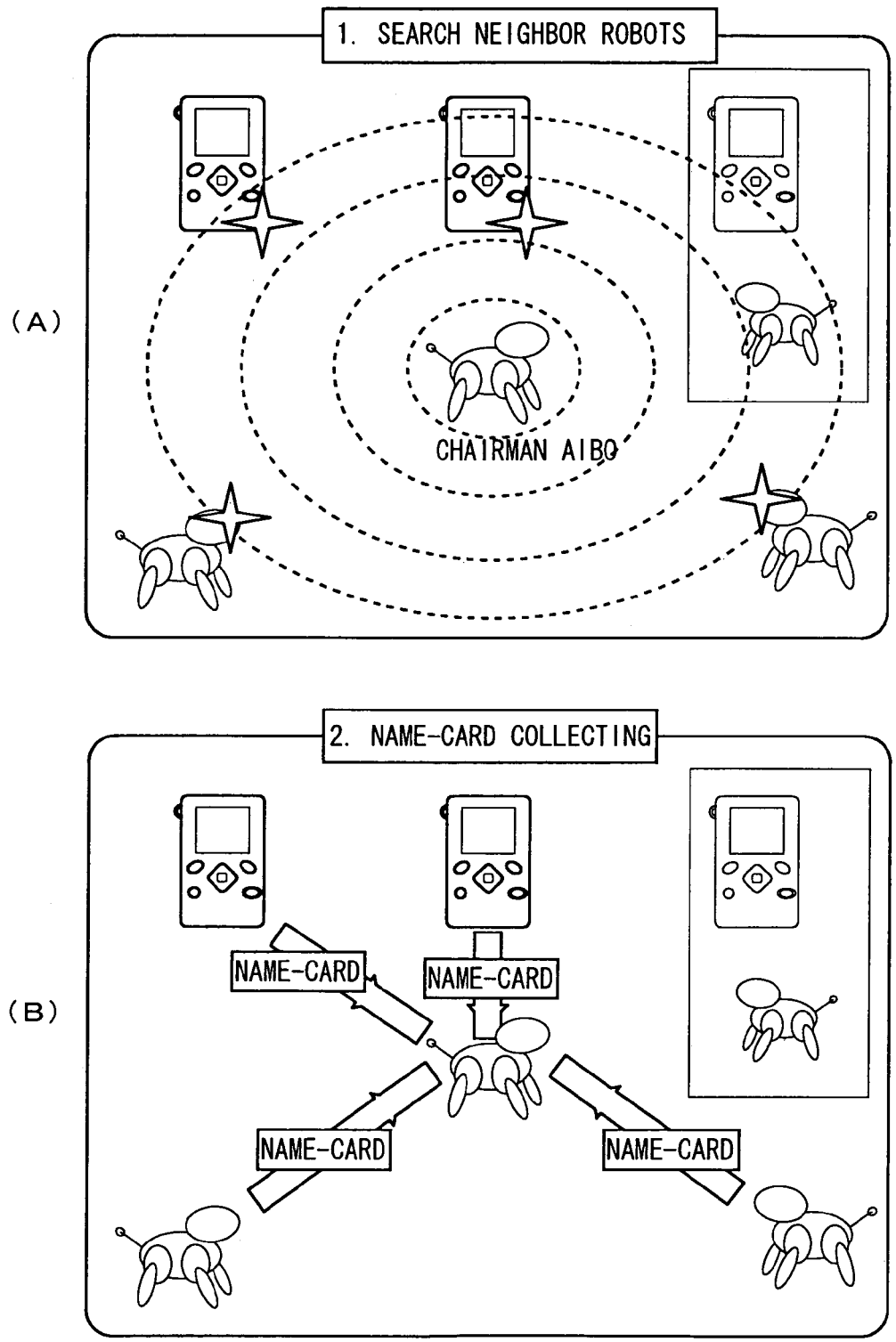
FIG. 47 is a schematic diagram applying the explanation of the communication execution.
Figure 48:
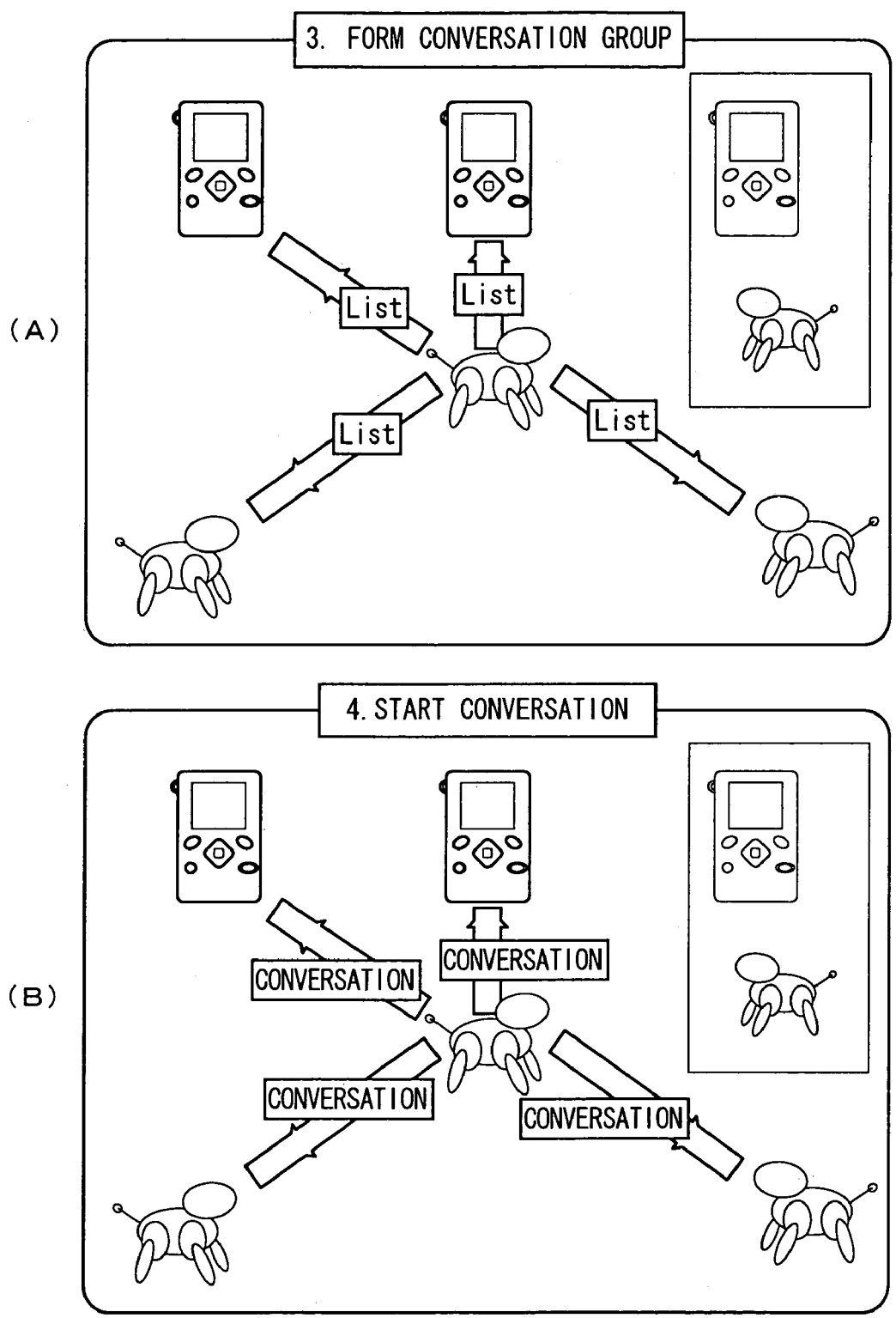
FIG. 48 is a schematic diagram applying the explanation of the communication execution.
Figure 49:
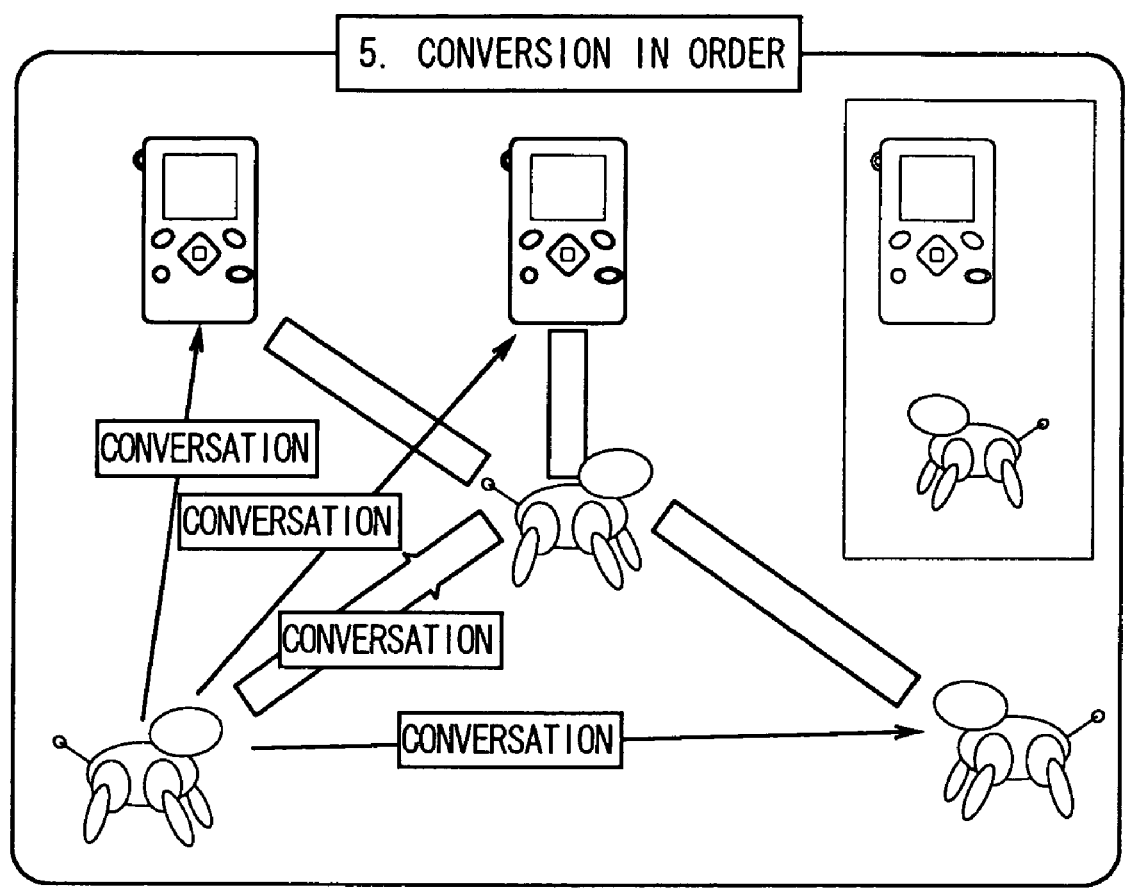
FIG. 49 is a schematic diagram applying the explanation of the communication execution.

In practice, when the multiple robots 1 execute the communication, as shown in FIG. 47(A)–FIG. 49, the central robot 1 (such as a chairman) searches a communicatable robot 1 or a communicator 50 around (FIG. 47(A)). Then the chairman robot 1 collects the name-card (the name of the owner, name and character of the robot 1 itself) of the communicating robot 1 and the communicator 50 (FIG. 47(B)). Then the chairman robot 1 lists up the name-card, and distributes the list to the member robots 1 and communicators 50 contributing to the conversation (FIG. 48(A)). Then the chairman robot 1 starts the conversation between the member robots 1 and communicators 50 (FIG. 48(B)). Here, the chairman robot 1 can decide the order of the conversation if necessary (FIG. 49). For example, whether they want to talk to or not can be asked sequentially at a prescribed time interval.

In this manner, natural communication such as enjoying conversation between the robots 1 and the owner's understanding the thoughts and body languages of the robot 1 by using the communicator 50, can be realized.

Furthermore, with multiple robots 1, community making, such as the owner's getting together bringing their own robots 1, and the owner's making friends with the other owners, can be enjoyed.

Furthermore, as the expression of the robot 1 is displayed on the display of the communicator 50 owned by the owner, much more variations can be realized comparing with the expression by sound. In this case, the robot 1 itself can make soliloquy, be on the scrounge, can complain to the owner, response to the action of the owner, and send a quiz, riddle, fortune telling, and word of the day.

Furthermore, when the robots 1 make conversation each other, the contents of the conversation are transmitted and received not only as above-mentioned command and/or semantics but also as text data via wireless communication as well as the action decision information representing the emotion or instinct synchronizing the same,so that the contents of the conversation can be displayed as text sentence on the communicator 50 as well as the degree of the emotion and/or instinct can be displayed as pictographic characters.

Still further, under the communicating state between the robots 1, the motion files representing the motion patterns and action patterns hold by one of the robots 1 can be transmitted to the other robots 1 via wireless communication with synchronization, the robot 1 can regularly use the motion patterns and the action patterns based on the motion files as its own. As a result, in multiple robots 1, cooperating motion such as dance or imitating can be executed.

Still further, when short distance wireless communication such as Bluetooth is used as wireless communication between the robots 1, or between the robot 1 and the communicator 50, the master robot 1 exchanges the name-card information between the slave robot 1 or the slave communicator 50 as a connect sequence through the phases of the synchronization establishment phase and the communication connection phase in accordance with the Bluetooth connection procedure, so that the name-card information exchange between the robots 1 or between the robot 1 and the communicator 50 in the area of communication can be easily and naturally conducted with no user's operation.

Furthermore, when there is a communicator 50 connected those coupled robots 1 which are communication connected each other and are under the conversation sequence-able condition based on a scenario, the communicator 50 receives the contents of the conversation based on the scenario from the master robot and displays the same on the display part, so that the joy of giving a glimpse into the world of the robots 1 can be obtained.

Furthermore, when the master robot 1 autonomously connects to and communicates with the other slave robot 1 or the slave communicator 50, the master robot 1 exercises a scenario on or makes communication connection with the slave robot 1 or the slave communicator 50 based on the user's operation on the communicator 50 or the recognized result of the sound which user uttered or the recognized result of the user's face, so that the interaction (interactive action) between the user using the communicator 50 and the robot 1 can be enhanced.

For example, when the user wants to see the scenario conversation between the robots 1, the user only needs to pronounce a specific word to make the master robot 1 autonomously execute the scenario which is displayed on the display part of the self communicator 50, so that the user can easily obtain the joy of giving a glimpse into the world of the robots 1 by the user's own intention at any time.

Furthermore, the robot 1 makes the communication 50 used by the user display the interaction scenario when the robot 1 recognizes the user by the recognized result of the face image, voice, and hand contact of the user, and input from the communicator, the user can obtain surprise and joy as if a human is talking to the user.

Still further, the user connects self communicator 50 to the robot 1 by approaching with a prescribed utterance and operation on the communicator 50 on which the soliloquy of the robot 1 is displayed during the robot 1's autonomously operating, so that the user can easily make communication with the robot 1 to strengthen the sense of community.

When the robot 1 transmits the text data of the contents of utterance to the communicator 50, if the robot 1 itself pronounces the contents of utterance through the speaker 21 based on the audio data related to the text data, the user having the communicator 50 can not only see the contents of utterance displayed on the display part 51, but also hear the voice which the robot 1 pronounces, so that sense of satisfaction and community can be given to the robot 1 all the more.

Furthermore, the robot 1 under the communication connection state with the communicator 50 repeats disconnection or reconnection of the operation condition of the communicator 50 at prescribed intervals and displays the operation state on the communicator 50 for each time, so that the battery consumption of the communicator 50 can be minimized while the user's intention is regarded.

Still further, the communicator 50 is registered on the robot 1 one on one, so that the operational security and easy. connection of wireless communication can be ensured as for the communicator 50.

Furthermore, the robot 1 conducts three types of utterance, "soliloquy utterance" representing that the robot 1 is autonomously operating, "sentence utterance" corresponding to the sate transition of the robot 1, and continuing utterance "scenario utterance" based on the prescribed scenario when the robot 1 displays the utterance text on the communicator 50 under communicating state, as well as the contents of the utterance correspond to the action of the robot 1, so that a sense of satisfaction can be given to the user by expressing the robot 1 as a life like thing all the more.

At that time, in the communicator 10 of the robot 1, a command is generated with the contents of utterance being set in accordance with the state transition table 76 which is used for selecting the action of the robot 1, so that the contents of utterance corresponding to the action of the robot 1 can be easily provided to the communicator 50 without a complicated hard ware newly installed.

Furthermore, a plurality of contents of utterance corresponding to the action of the robot 1 are prepared, and these contents of utterance are randomly selected, so that different contents of utterance can be provided to the communicator 50 for each time even when the same action of the robot 1 is repeated. Therefore the user is not made lose interest or made bored.

According to the foregoing construction, in the robot 1 system, the communication 50 for remotely controlling the robot 1 is provided, and the contents of the conversation comprised of commands and semantics are exchanged between multiple robots 1 under communication-able state via wireless communication as well as the motion of motion and/or action is exchanged to be executed by itself and the contents of the communication are displayed on the communicator 50 if necessary, so that communication such as human relations can be realized between the robots 1, and an improved entertainment property can be provided.

(18) Other Embodiments

In the aforementioned embodiments, this invention is applied to the robot 1 so configured as shown in FIG. 1 and the robot system 30 so configured as shown in FIG. 3 including the robot 1. However, this invention is not only limited to this but also can be widely applicable to robot apparatus having various other configurations and robot systems including the robot apparatus.

Figure 6:
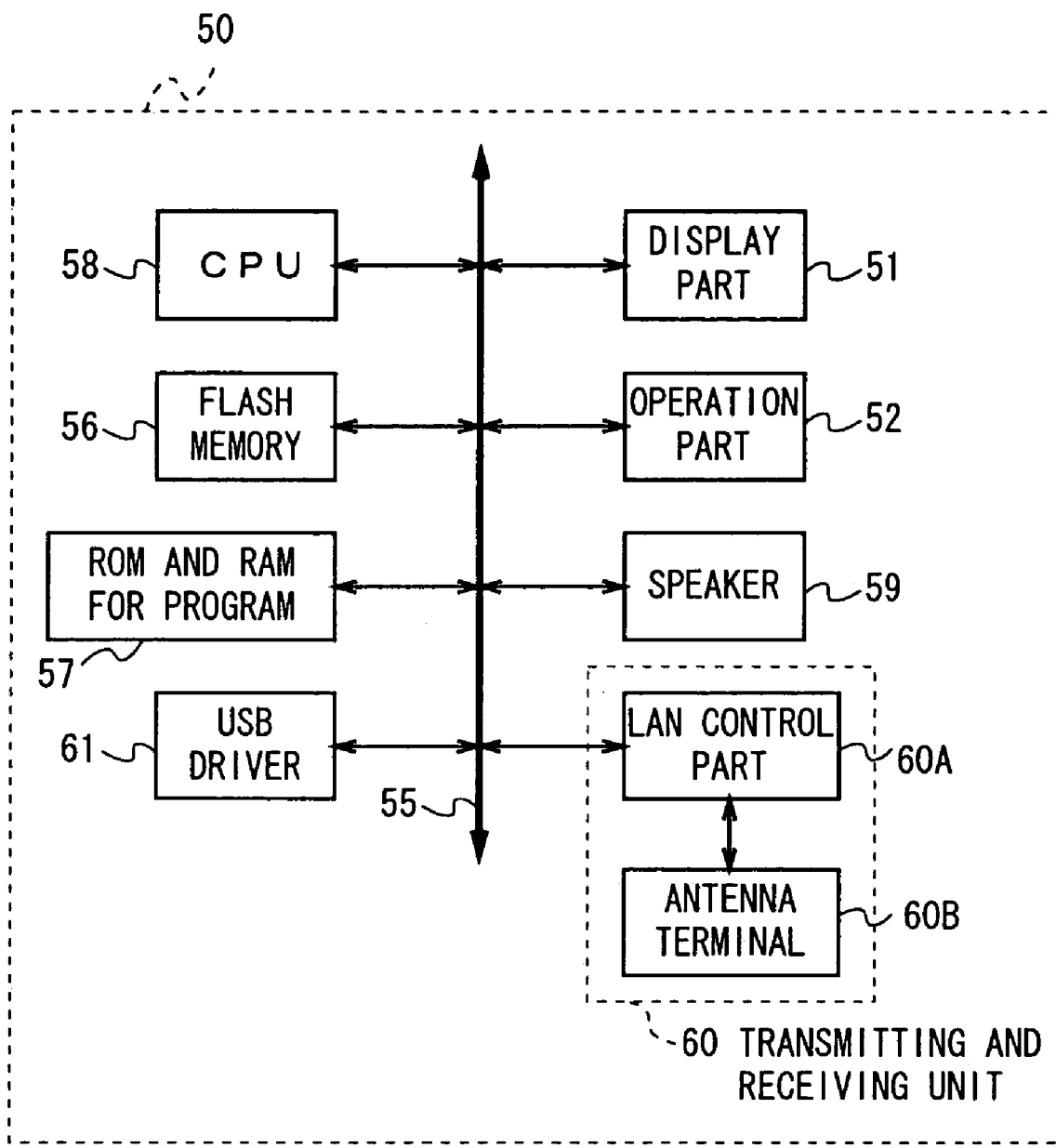
FIG. 6 is a block diagram showing the internal construction of the communicator.

Furthermore, in the aforementioned embodiments, this invention is applied to the remote-control device for remotely controlling the robot 1 and the communicator 50 shown in FIGS. 5 and 6 as a wireless terminal device making wireless communication between the robots 1 based on the wireless communication standard. However, this invention is not only limited to this but also can be widely applicable to a remote-control device or a wireless terminal device having various other configurations. In this case, the remote-control device or the wireless terminal device may be a dedicated device.

In the above case, the remote-control device or the wireless terminal device is corresponding to the robot apparatus one on one. However, this invention is not only limited to this but also one remote-control device or one wireless terminal device can be corresponding to multiple robot apparatus as a target for remote-control or wireless communication. In addition, multiple remote control devices or multiple wireless terminal devices can be used for remotely controlling or wirelessly communicating with single robot apparatus simultaneously or in order of priority.

Furthermore, in the aforementioned embodiments, the wireless communication standard of wireless LAN system based on Bluetooth standard as the wireless communication standard used for wireless communication between the robot (robot apparatus) 1 and the communicator (the wireless terminal device) 50. However, this invention is not only limited to this but also various other wireless communication standard can be widely applicable as long as the robot 1 and the communicator 50 can be wirelessly communicated with keeping enough distance for a practical use.

Still further, in the aforementioned embodiments, in the robot 1, the memory for a mode for a remote-control 26B (FIG. 3) is applied as the terminal means for making wireless communication based on the wireless communication standard, and the controller 10 (the conversation control part 75, the session service control part 83, and the wireless communication control part 84) (FIG. 7) is applied as the utterance output means for outputting the character data representing the contents of utterance. However, this invention is not only limited to this but also is widely applicable to various other configurations.

Still further, in the aforementioned embodiments, in the communicator (the wireless terminal device) 50, the transmitting and receiving unit 60 (FIG. 6) is applied as the terminal means for making wireless communication based on the wireless communication standard, and the display part 51 is applied as the display means for displaying the contents of utterance of the robot 1 based on the character data obtained through the terminal means. However, this invention is not only limited to this but also is widely applicable to various other configurations.

Furthermore, in the aforementioned embodiments, the robot 1 applies various sensor groups 13, 14, 19, 20, the CCD camera 17, and the microphone 16 as the sensor means for detecting the user existence in the outside state. However, this invention is not only limited to this, but also various other sensor means can be widely applied as fur as the robot 1 can detect the existence of the user with the sensor means.

Furthermore, in the aforementioned embodiments, the controller 10 in the robot 1 transmits the text data (character data) representing the contents of utterance when the various sensor groups (sensor means) of the robot 1 detect the user during the wireless communication connection establishment between the communicator 50 and the robot 1. However, this invention is not only limited to this, but also various other configurations can be applied as fur as the contents of utterance can be transmitted at the detection of the user.

Furthermore, in the aforementioned embodiments, in the robot 1, the controller 10 as control means controls the disconnection or reconnection of the wireless communication based on the detection result of various sensor groups (sensor means) of the robot 1. However this invention is not only limited to this, but also various other configurations can be applied as fur as the disconnection or reconnection of wireless communication can be repeated at prescribed intervals when a user is not detected within prescribed time during the establishment of the wireless communication between the communicator 50 and the robot 1.

Furthermore, in the aforementioned embodiments, in the robot 1, the motion expression means (the action control part 72, the command conversion part 74, the output contents control part 77, the sound reproduction part 79, a LED reproduction part 80, and the motion reproduction part 81 of the controller 10) for expressing the physical, optical and/or acoustic motion express the motion in accordance with the contents of utterance based on the text data (character data) output from the utterance output means (the conversation control part 75, the session service control part 83 and the wireless communication control part 84 of the controller 10). However, this invention is not only limited to this, but also various other configurations can be widely applied as fur as the robot 1 can express the motion in accordance with the contents of the utterance.

Furthermore, in the aforementioned embodiments, the controller (the utterance output means) 10 of the robot 1 sets the contents of utterance based on the text data (character data) in accordance with the action decision information comprised of the regulations for deciding the following output action corresponding to the action of the robot 1 generated according to the external and/or internal environment, and the state transition table 76 (FIG. 9) stored in the memory 10A as the act in decision information is applied. However, this invention is not only limited to this, but also various other method can be set as fur as the action decision and the contents of utterance can be easily related.

In the above case, the contents of utterance based on the text data (character data) have three types, "soliloquy utterance" representing that the robot 1 is autonomously operating, "sentence utterance" corresponding to the sate transition of the robot 1, and continuing utterance "scenario utterance" based on the prescribed scenario, and these three types of contents of utterance all can be executed in the controller 10 (FIG. 7). However, this invention is not only limited to this, but also the contents of utterance can be selectively switched to one of these three corresponding to the user's selection or the situation state.

Still further, in the aforementioned embodiments, when the robot 1 (robot apparatus) expressing an action autonomously and the communicator (the wireless terminal device) 50 make wireless communication based on the prescribed wireless communication standard, the communicator 50 is registered one on one with physical influence on the robot 1. However, this invention is not only limited to this,but also multiple units of communicator 50 within the limitation of the wireless communication standard (eight units as for Bluetooth) can be registered on one robot 1 as fur as the user's operational security can be ensured during the wireless communication.

As described above, according to this invention, in a robot system where a plurality of robot apparatus autonomously act, each robot apparatus has wireless communication means, and transmits and receives the contents of the conversation as a command and/or a semantics through the wireless communication means of both when making conversation between robot apparatus, so that communication between the robot apparatus just like human relations can be realized and a robot system where an improved entertainment property can be provided can be realized.

Furthermore, according to this invention, in a control method for robot apparatus autonomously acting , each robot apparatus transmits and receives the contents of the conversation as a command and/or a semantics through the wireless communication means when making conversation between robot apparatus, so that communication between the robot apparatus just like human relations can be realized and a control method for robot apparatus with which an improved entertainment property can be provided can be realized.

Furthermore, according to this invention, in a robot system and a control method for robot apparatus where and with which a plurality robot apparatus autonomously expressing actions make wireless communication between themselves based on the wireless communication standard, when either robot apparatus transmits a connection request at a prescribed timing, and the other robot apparatus which received the connection request returns a response, both robot apparatus transmit and receive unique name-card information each other after the connection establishment of the wireless communication. In addition, the wireless terminal device transmits the name-card information unique to the wireless terminal device to the robot apparatus after the connection establishment of the wireless communication, as well as the robot apparatus transmits the name-card information unique to the robot apparatus to the wireless terminal device, so that, as for between the robot apparatus in the area of communication and between the robot apparatus and wireless terminal devices, the name-card information can be exchanged easily and naturally without user operation and the robot system and the control method for robot apparatus where and with which an improved entertainment property can be provided can be realized.

Furthermore, according to this invention, in a robot system and a control method for robot apparatus where and with which robot apparatus autonomously expressing an action and a wireless terminal device make wireless communication based on the wireless communication standard, after the robot apparatus transmits the character data representing the contents of the utterance to the wireless terminal device, the wireless terminal device displays the contents of the utterance of the robot apparatus based on the character data obtained from the robot apparatus, so that the user using the wireless terminal device can easily communicate with the robot apparatus to strengthen the sense of community, accordingly the robot system and the control method for robot apparatus where and with which an improved entertainment property can be provided can be realized.

Furthermore, according to this invention, the robot apparatus transmits the character data representing the contents of utterance to the wireless communication device when the robot apparatus detects a user in the external circumstances during the establishment of the communication between the wireless terminal device and the robot apparatus, so that a user can enjoy surprise and amusement as if a man/woman is talking to the user, and the interaction between the user and the robot apparatus can be increased, accordingly the robot system and the control method for robot apparatus where and with which an improved entertainment property can be provided can be realized.

Furthermore, according to this invention, the robot apparatus repeats the disconnection or reconnection of the wireless communication between the wireless terminal device at prescribed intervals when the robot apparatus does not detect a user within prescribed time during the connection establishment of the wireless communication between the wireless terminal device and the robot apparatus, so that battery consumption can be minimized while the user's intention is regarded, accordingly the robot system and the control method for robot apparatus where and with which an improved entertainment property can be provided can be realized.

Furthermore, according to this invention, the robot apparatus expresses physical, optical, and/or acoustic motion, the user using the wireless terminal device can not only see the displayed contents of the utterance, but also experience the motion of the robot apparatus, a sense of satisfaction and a sense of community can be given to the robot apparatus all the more, accordingly the robot system and the control method for robot apparatus where and with which and an improved entertainment property can be provided, can be realized.

Furthermore, according to this invention, the robot apparatus sets the contents of the utterance based on the character data in accordance with the action decision information comprised of regulations for deciding the following output action corresponding to the action condition of the robot apparatus generated according to the external or internal circumstances, so that the robot apparatus can be expressed as a lifelike thing all the more by the contents of the utterance being fitted to the action of the robot apparatus, and a sense of satisfaction can be given to the user, accordingly, the robot system and the control method for robot apparatus where and with which an improved entertainment property can be provided, can be realized.

Furthermore, according to this invention, in the robot system and the control method for robot apparatus where and in which a plurality of robot apparatus autonomously expressing actions make wireless communication between themselves based on the wireless communication standard, the wireless terminal device displays the contents of utterance based on the character data output from both robot apparatus, so that the user using the wireless terminal device can enjoy giving a glimpse into the world of robot apparatus, accordingly the robot system and the control method for robot apparatus where and with which an improved entertainment property can be provided, can be realized.

Furthermore, according to this invention, in the robot system and the control method for robot apparatus where and with which in the robot apparatus autonomously expressing an action and the wireless terminal device make wireless communication based on the wireless communication standard, the wireless terminal device is registered with physical influence on the robot apparatus, so that the operational security and easy connection of the wireless communication can be ensured as for the wireless terminal device, accordingly the robot system and the control method for robot apparatus where and with which an improved entertainment property can be provided, can be realized.

INDUSTRIAL APPLICABILITY

This invention can be applied to various robot systems such as amusement robot system, in a robot system and a control method for robot apparatus.

The invention claimed is:

1. A robot system where a plurality of robot apparatus autonomously act, wherein each of said robot apparatus comprises wireless communication means, and, when said robot apparatus make conversation with each other, contents of said conversation are transmitted to and received by said robot apparatus as a command and/or a semantics through said wireless communication means of both, comprising:
  a remote control device for remotely controlling robot apparatus selected out of said plurality of robot apparatus by wireless communication, wherein said remote control device displays said contents of conversation transmitted from each of said robot apparatus being control target,
    wherein each of said robot apparatus comprises sensor means for detecting external circumstances and/or input from outside, update means for updating, based on said detection result, emotion and/or instinct model modeling emotion and/or instinct previously kept, and decision means for deciding emotion and/or instinct based on said updated emotion and/or instinct model, wherein the wireless communication device transmits a result decided by said decision means and name-card information unique to said robot apparatus to said remote control device; and
    said remote control device selects, based on emotion and/or instinct represented by said decided result transmitted from corresponding said robot apparatus, a corresponding pictographic character among a plurality of pictographic character data previously kept, and displays a pictographic character based on said selected pictographic character data on said display means,
    wherein said remote control device reproduces an LED file for each flash pattern of each LED situated on said robot apparatus and stores said each flash pattern in memory for control under said remote control device.

2. The robot system according to claim 1, wherein said remote control device displays a pictographic character based on pictographic character data selected based on emotion and/or instinct represented by said decided result transmitted from said corresponding robot apparatus, with being synchronized with said contents of conversation, on said display means.

3. The robot system according to claim 1, wherein: each of said robot apparatus comprises a speaker for outputting sound and a microphone for collecting said sound; and
  one of said robot apparatus collects, through said microphone, prescribed sound output from the other said robot apparatus through said speaker, and specifies direction of the robot apparatus having output said prescribed sound based on said sound collection result when said robot apparatus are under communicating state each other through said wireless communication means of both.

4. The robot system according to claim 1, wherein:
each of said robot apparatus comprises memory means for storing motion data representing prescribed motion and/or action patterns; and
one of said robot apparatus reads said motion data from said memory means to transmit to the other said robot apparatus when said robot apparatus are under communicating state each other through said wireless communication means of both.

5. The robot system according to claim 1, wherein
said decision means sets a plurality of contents of utterance based on said pictographic character to output action next to said decided result so as to randomly select one of said contents of utterance.

6. A control method for robot apparatus autonomously acting, wherein when said robot apparatus make conversation with each other, contents of said conversation are transmitted to and received by both said robot apparatus as a command and/or a semantics through wireless communication,
  wherein a remote control device for remotely controlling said robot apparatus by wireless communication is arranged to display said contents of conversation transmitted from said robot apparatus, said method comprising:
  a first step of making said robot apparatus update emotion and/or instinct model modeling emotion and/or instinct previously kept based on detection result of external circumstances and/or input from outside, decide emotion and/or instinct based on said updated emotion and/or instinct model, and transmitting said decided a result and name-card information unique to said robot apparatus to said remote control device; and
  a second step of making said remote control device select a corresponding pictographic character among a plurality of pictographic character data previously kept based on emotion and/or instinct represented by said decided result transmitted from corresponding said robot apparatus, and display a pictographic character based on said selected pictographic character data on said display means, wherein said remote control device reproduces an LED file for each flash pattern of each LED situated on said robot apparatus and stores said each flash pattern in memory for control under said remote control device.

7. The control method for robot apparatus according to claim 6, wherein
at said second step, said remote control device displays a pictographic character based on pictographic character data selected based on emotion and/or instinct represented by said decided result transmitted from said corresponding robot apparatus, with being synchronized with said contents of conversation, on said display means.

8. The control method for robot apparatus according to claim 6, wherein
one of said robot apparatus collects, through said microphone, prescribed sound output from the other said robot apparatus through said speaker and specifies direction of the robot apparatus having output said prescribed sound based on said sound collection result, when said robot apparatus are under communicating state each other through said wireless communication means of both.

9. The control method for robot apparatus according to claim 6, wherein
one of said robot apparatus reads said motion data representing prescribed motion and/or action patterns from said memory means to transmit to the other said robot apparatus when said robot apparatus are under communicating state each other through said wireless communication means of both.

10. The robot system according to claim 6, wherein
said first step sets a plurality of contents of utterance based on said pictographic character to output action next to said decided result so as to randomly seleot one of said contents of utterance.

11. A robot system where a plurality of robot apparatus autonomously expressing actions make wireless communication with each other based on a prescribed wireless communication standard, wherein:
each of said robot apparatus coniprises terminal means for making wireless communication based on said wireless communication standard; and
terminal means of one of said robot apparatus transmits a connection request at a prescribed timing, and, when terminal means of the other said robot apparatus having received said connection request returns a response, terminal means of both said robot apparatus transmit and receive name card information unique to said robot apparatus each other after connection establishment of said wireless communication, further comprising:
a wireless terminal device comprising terminal means for making wireless communication based on said wireless communication standard,
wherein when said wireless terminal device returns a response at reception of said connection request transmitted from terminal means of said robot apparatus, after connection establishment of said wireless communication, said terminal means transmits name-card information unique to said wireless terminal device to terminal means of said robot apparatus while terminal means of said robot apparatus transmits name card information unique to said robot apparatus to terminal means of said wireless terminal device,
wherein a remote control device reproduces an LED file for each flash pattern of each LED situated on said robot apparatus and stores said each flash pattern in memory for control under said remote control device.

12. A control method for robot apparatus making wireless communication based on a prescribed wireless communication standard between a plurality of robot apparatus autonomously expressing actions, wherein
one of said robot apparatus transmits a connection request at a prescribed timing, and, when the other said robot apparatus having received said connection request returns a response, both said robot apparatus transmit and receive name card information unique to said robot apparatus each other after connection establishment of said wireless communication; and
wherein as for a wireless tenninal device having returned a response at reception of said connection request transmitted from said robot apparatus, after connection establishment of said wireless communication with said robot apparatus, said wireless tenninal device transmits name card information unique to said wireless terminal device to said robot apparatus while said robot apparatus transmits name card information unique to said robot apparatus to said wireless terminal device,
wherein a remote control device reproduces an LED file for each flash pattern of each LED situated on said robot apparatus and stores said each flash pattern in memory for control under said remote control device.

* * * * *